US009884341B2

(12) United States Patent
Gleason et al.

(10) Patent No.: US 9,884,341 B2
(45) Date of Patent: Feb. 6, 2018

(54) METHODS OF COATING SURFACES USING INITIATED PLASMA-ENHANCED CHEMICAL VAPOR DEPOSITION

(75) Inventors: Karen K. Gleason, Cambridge, MA (US); Anna M. Coclite, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 553 days.

(21) Appl. No.: 13/571,814

(22) Filed: Aug. 10, 2012

(65) Prior Publication Data

US 2013/0040102 A1 Feb. 14, 2013

Related U.S. Application Data

(60) Provisional application No. 61/522,838, filed on Aug. 12, 2011.

(51) Int. Cl.

| | |
|---|---|
| ***C08F 2/46*** | (2006.01) |
| ***B05D 1/00*** | (2006.01) |
| ***B05D 7/00*** | (2006.01) |

(52) U.S. Cl.

CPC ................. *B05D 1/62* (2013.01); *B05D 7/52* (2013.01); *Y10T 428/24355* (2015.01)

(58) Field of Classification Search

CPC ...... B05D 1/62; B05D 7/52; Y10T 428/24355

USPC .......................................................... 427/488

See application file for complete search history.

(56) References Cited

U.S. PATENT DOCUMENTS

| | | | | |
|---|---|---|---|---|
| 2003/0017635 | A1 | 1/2003 | Apen et al. | |
| 2004/0050494 | A1* | 3/2004 | Ohmi et al. | 156/345.41 |
| 2009/0202739 | A1* | 8/2009 | O'Neill | B05D 1/62 427/562 |

FOREIGN PATENT DOCUMENTS

| | | |
|---|---|---|
| EP | 1 388 594 | 2/2004 |
| EP | 1 785 266 | 5/2007 |
| WO | WO-2006/046003 | 5/2006 |

OTHER PUBLICATIONS

Lewis et al. "Pulsed-PECVD Films from Hexamethylcyclotrisiloxane for Use as Insulating Biomaterials" Chem. Mater. 2000, 12, 3488-3494.*

O'Shaughnessy et al. "Initiated Chemical Vapor Deposition of Trivinyltrimethylcyclotrisiloxane for Biomaterial Coatings" Langmuir 2006, 22, 7021-7026.*

International Search Report dated Feb. 4, 2013 from PCT/US2012/050289.

Coclite et al., "Global and local planarization of surface roughness by chemical vapor deposition of organosilicon polymer for barrier applications," J. Appl. Phys., 111:073516-1-073516-7 (2012).

(Continued)

*Primary Examiner* — Robert S Walters, Jr.

(74) *Attorney, Agent, or Firm* — Foley Hoag LLP

(57) ABSTRACT

Disclosed is an organic coating with a high degree of global planarization. Further disclosed is an iPECVD-based method of coating a substrate with an organic layer having a high degree of global planarization. Disclosed is a flexible, alternating organic and inorganic multi-layer coating with low water permeability, a high-degree of transparency, and a high-degree of global planarization. Also disclosed is an iPECVD-based method of coating a substrate with the alternating organic and inorganic multi-layer coating.

24 Claims, 24 Drawing Sheets

(56) References Cited

OTHER PUBLICATIONS

Coclite et al., "Initiated PECVD of Organosilicon Coatings: A New Strategy to Enhance Monomer Structure Retention," Plasma Process. Polym., 9:425-434 (2012).
Coclite et al., "Single-Chamber Deposition of Multilayer Barriers by Plasma Enhanced and Initiated Chemical Vapor Deposition of Organosilicones," Plasma Process. Polym., 7:561-570 (2010).
Gupta et al., "Large-scale initiated chemical vapor deposition of poly(glycidyl methacrylate) thin films," Thin Solid Films, 515:1579-1584 (2006).
Im et al., "Solvent-free Modification of Surfaces with Polymers: The Case for Initiated and Oxidative Chemical Vapor Deposition (CVD)," AIChE Journal, 57(2):276-285 (2011).

* cited by examiner

| Set of experiments | TVTSO flow rate [sccm] | TBPO flow rate [sccm] | Power [W] | W/F | $T_{sub}$ [°C] | DC [%] |
|---|---|---|---|---|---|---|
| A | 4.8 | 6~30 | 50 | 4.6~1.4 | 60 | 100 |
| B | 4.8 | 30 | 150 | 4.3 | 60 | 100 |
| C | 6 | 6 | 50 | 4.2 | 15~60 | 100 |
| D | 12 | 6 | 50 | 2.8 | 15~60 | 100 |
| E | 12 | 18 | 50 | 1.7 | 15~60 | 100 |
| F | 18 | 30 | 50 | 1.04 | 15~60 | 100 |
| G | 4.8 | 6 | 50 | 4.6 | 60 | 10~100 |

| Process | TVTSO flow rate [sccm] | TBPO flow rate [sccm] | Pressure [mTorr] | Power [W] | $T_{fil}$ [°C] | $T_{sub}$ [°C] |
|---|---|---|---|---|---|---|
| iCVD | 4.8 | 6 | 320 | / | 280 | 60 |
| iPECVD | 4.8 | 6 | 320 | 50 | / | 60 |
| PECVD | 4.8 | / | 320 | 50 | / | 60 |

Figure 31

| Wavenumber polymer [$cm^{-1}$] | Wavenumber monomer [$cm^{-1}$] | Bond | Vibration mode |
|---|---|---|---|
| | 3050 | C–H in sp2-$CH_2$ | Asymmetric stretching |
| | 3010 | C–H in sp2-$CH_2$ | Symmetric stretching |
| 3000-2800 broad band | 2960 | C–H in sp3-$CH_3$ | Asymmetric stretching |
| | 2870 | CH in sp3-$CH_3$ | Asymmetric stretching |
| | | C–H in sp3-$CH_2$ | Asymmetric stretching |
| | | C–H in sp3-$CH_3$ | Symmetric Stretching |
| 2150 | | Si–H | Stretching |
| | 1922 | C–H in sp2-$CH_2$ | Symmetric wagging |
| | 1594 | C=C | Stretching |
| 1459 | | C–H in sp3-$CH_3$ | Asymmetric Stretching |
| 1400 | 1404 | C–H in Si-$(CH_2)_x$-Si and in vinyl | Bending |
| 1260 | 1260 | C–H in $SiO_x(CH_3)_y$ | Symmetric bending |
| 1105 | | C–O in Si–O–C | Bending |
| 1063 | 1088 | Si–O–Si | Asymmetric stretching |
| | 1008 | C=C | twisting |
| | 950 | C–H in sp2-$CH_2$ | wagging |
| 850 | 850 | Si–C in $Si(CH_3)_2$ | Asymmetric stretching |
| 780 | 780 | Si–O–Si | Bending |
| 740 | 750 | Si–C in $Si(CH_3)_3$ | Symmetric stretching |
| | 700 | Si–CH=$CH_2$ | wagging |

Figure 32

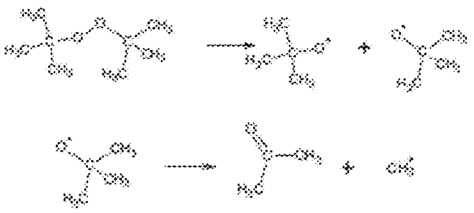

| Elemental ratio | iCVD | iPECVD at 50 W | iPECVD at 250 W | Monomer |
|---|---|---|---|---|
| C/Si | 4.7 | 4.3 | 3.1 | 3.7 |
| O/Si | 1.1 | 1.1 | 1.4 | 0.7 |

Figure 39

| DC (%) | E (GPa) | H (GPa) |
|---|---|---|
| 50 | 74.2 | 6.3 |
| 75 | 84.4 | 9.5 |
| 100 | 89.9 | 13.2 |
| Thermal $SiO_2$[15] | 80 | 12 |

Figure 40

| DC (%) | Thickness (nm) | Critical tensile strain (%) | Saturation crack density ($\mu m^{-1}$) | Critical bending radius (mm) |
|---|---|---|---|---|
| 50 | 40 | 3.08 | 0.74 | 1.62 |
| 50 | 55 | 2.28 | 0.51 | 2.20 |
| 50 | 100 | 1.13 | 0.47 | 4.43 |
| 100 | 30 | 3.37 | 0.74 | 1.35 |
| 100 | 55 | 1.99 | 0.52 | 2.51 |
| 100 | 100 | 0.88 | 0.49 | 5.69 |

Figure 41

| Coating thickness (nm) | Tension failure | | Compression failure | |
|---|---|---|---|---|
| | Critical bending radius (mm) | Critical Strain (%) | Critical bending radius (mm) | Critical Strain (%) |
| 25 | < 2 | > 2.50 | <2 | >2.50 |
| 50 | 2-3 | 2.50 - 1.67 | 1.9 - 2 | 2.50 -1.67 |
| 100 | 5-6 | 1.00 - 0.83 | 2.6 - 3 | 1.92 -1.67 |
| 200 | 11-12 | 0.42 - 0.45 | 3 - 4 | 1.67 - 1.25 |

METHODS OF COATING SURFACES USING INITIATED PLASMA-ENHANCED CHEMICAL VAPOR DEPOSITION

RELATED APPLICATIONS

This application claims the benefit of priority to U.S. Provisional Patent Application Ser. No. 61/522,838, filed Aug. 12, 2011.

BACKGROUND OF THE INVENTION

A polymer may be deposited on various substrates, such as glass, plastics, metals, and polymers, using chemical vapor deposition (CVD) techniques, which include plasma enhanced chemical vapor deposition (PECVD), atomic layer deposition (ALD), hot-wire chemical vapor deposition (HWCVD), and initiated chemical vapor deposition (iCVD) techniques.

In CVD, monomers are converted directly to desired polymeric films without the need for purification, drying, or curing steps. Custom copolymers can be created simply by changing the ratio of feed gases to the CVD reactor (Murthy, S. K.; Gleason, K. K. *Macromolecules* 2002, 35, 1967). CVD allows films of nanoscale thicknesses with macroscale uniformity to be produced, and the method can be applied to complex geometries. (Pierson, H. O. *Handbook of Chemical Vapor Deposition,* 2nd ed.; Noyes Publications: Norwich, N.Y., 1999). CVD can also be used to coat nanoscale features, as the technique is not subject to surface-tension and non-uniform-wetting effects that are typically associated with wet processes.

Protective coatings, which prevent the permeation of water into organic optoelectronic devices, including organic photovoltaic (OPV) devices fabricated on flexible plastic substrates, are essential to extend device lifetimes. (M. S. Weaver et al., *Appl. Phys. Lett.,* 2002, 81, 2929). Widely investigated barrier protective coatings are made of multi-layer stacks, wherein multiple dense, inorganic layers are alternated with soft, organic layers. Triads have shown water vapor transmission rates (WVTR) less than $10^{-4}$ g/cm$^2$/day.

Even though the permeability coefficient of a single thin inorganic layer of silicon dioxide or aluminum oxide would in theory be low enough to allow them to serve as perfect barriers, residual permeation through them is always detected. The experimentally observed permeability is due to the presence of unwanted but inevitable nano-, microscopic defects and pinholes that limit the minimum WVTR achievable by a single inorganic layer to $10^{-2}$ g/m$^2$/day. (Weaver, 2002; A. S. da Silva Sobrinho et al., *J. Vac. Sci. Technol. A,* 2000, 18, 2021). The pinholes may result from the presence of dust particles on the substrate surface during deposition, from geometric shadowing and stress during film growth at sites of high surface roughness, or from powder formation in the plasma phase during deposition. These defects lead to oxidation and corresponding shorter device lifetimes. The role of the organic layer is (i) decoupling the defects among two successive inorganic layers, thus forcing the permeant molecules to follow a tortuous and longer path (G. L. Graff et al., *J. Appl. Phys.,* 2004, 96, 1840); (ii) filling the pores of the inorganic underlayer, limiting the propagation of defects from one inorganic layer to the other (A. G. Erlat et al., *J. Phys. Chem. B,* 1999, 103, 6047); and (iii) smoothening the substrate surface roughness and covering dust or anti-blocking particles on the surface. (P. E. Burrows et al., *Displays,* 2001, 22, 65).

SUMMARY OF THE INVENTION

One aspect of the invention relates to a method of coating a substrate, comprising the steps of introducing into a partially evacuated vessel a gaseous initiator at a first flow rate, and a first gaseous monomer at a second flow rate, thereby forming a first mixture; and introducing energy into said first mixture at a first power, thereby depositing a first layer on the substrate at a first deposition rate, wherein the first layer is organic; the vessel further comprises a variable plasma source, a stage for holding a substrate, and a substrate positioned on said stage; and the first gaseous monomer is selected from the group consisting of acrylates, vinyl compounds, acetylenes, and organosilicons.

In certain embodiments, the present invention relates to any one of the aforementioned methods, wherein the method further comprises the step of introducing a first auxiliary gas at a third flow rate.

Another aspect of the invention relates to a method of coating a substrate, comprising the steps of introducing into a partially evacuated vessel a gaseous initiator at a first flow rate, and a first gaseous monomer at a second flow rate, thereby forming a first mixture;

introducing energy into said first mixture at a first power, thereby depositing a first layer on the substrate at a first deposition rate, wherein the first layer is organic;

introducing into the vessel a first auxiliary gas at a third flow rate, and a second gaseous monomer at a fourth flow rate, thereby forming a second mixture; and introducing energy into said second mixture at a second power, thereby depositing a second layer over the first layer at a second deposition rate, wherein the second layer is inorganic; the vessel further comprises a variable plasma source, a stage for holding a substrate, and a substrate positioned on said stage; the first gaseous monomer is selected from the group consisting of acrylates, vinyl compounds, acetylenes, and organosilicons; and the second gaseous monomer is an organosilicon.

In certain embodiments, the present invention relates to any one of the aforementioned methods, wherein the method further comprises the step of introducing a second auxiliary gas at a fifth flow rate.

In certain embodiments, the present invention relates to any one of the aforementioned methods, wherein the method further comprises the step of introducing a third auxiliary gas at a sixth flow rate.

In certain embodiments, the present invention relates to any one of the aforementioned methods, wherein the method further comprises introducing into a partially evacuated vessel a gaseous initiator at a first flow rate, and a first gaseous monomer at a second flow rate, thereby forming a first mixture;

introducing energy into said first mixture at a first power, thereby depositing an organic layer over the inorganic layer at a first deposition rate;

introducing into the vessel a first auxiliary gas at a third flow rate, and a second gaseous monomer at a fourth flow rate, thereby forming a second mixture; and introducing energy into said second mixture at a second power, thereby depositing an inorganic layer over the organic layer at a second deposition rate to form a multi-layered coating on a substrate, wherein said multi-layer coating comprises alternating organic and inorganic layers.

In certain embodiments, the gaseous initiator of the preceding sentence is different from or the same as the gaseous initiator described above. In certain embodiments, the first flow rate of the sentence in the preceding paragraph is different than or the same as the first flow rate described above. In certain embodiments, the first gaseous monomer of the sentence in the preceding paragraph is different from or the same as the first gaseous monomer described above. In certain embodiments, the second flow rate of the sentence in the preceding paragraph is different than or the same as the second flow rate described above. In certain embodiments, the first power of the sentence in the preceding paragraph is different than or the same as the first power described above. In certain embodiments, the first auxiliary gas of the sentence in the preceding paragraph is different than or the same as the first auxiliary gas described above. In certain embodiments, the third flow rate of the sentence in the preceding paragraph is different than or the same as the third flow rate described above. In certain embodiments, the second gaseous monomer of the sentence in the preceding paragraph is different than or the same as the second gaseous monomer described above. In certain embodiments, the fourth flow rate of the sentence in the preceding paragraph is different than or the same as the fourth flow rate described above. In certain embodiments, the second power of the sentence in the preceding paragraph is different than or the same as the second power described above.

In certain embodiments, the present invention relates to any one of the aforementioned methods, wherein the number of layers is from about 2 to about 8.

In certain embodiments, the present invention relates to any one of the aforementioned methods, wherein the number of layers is from about 4 to about 6.

In certain embodiments, the present invention relates to any one of the aforementioned methods, wherein the first gaseous monomer is selected from the group consisting of acrylate, diacrylate, perfluorodecyl acrylate, methacrylic acid-co-ethyl acrylate, methacrylate, ethylene glycol dimethacrylate, dimethacrylate, methacrylic and acrylic acid, cyclohexyl methacrylate, glycidyl methacrylate, propargyl methacrylate, pentafluorophenyl methacrylate, furfuryl methacrylate, styrene and styrene derivatives, dimethylaminomethyl styrene, 4-aminostyrene, maleic anhydride-alt-styrene, divinylbenzene, p-divinylbenzene, vinylimidazole, vinyl pyrrolidone, divinyloxybutane, N-isopropylacrylamide, diethylene glycol divinyl ether, phenyl acetylene, and siloxane.

In certain embodiments, the present invention relates to any one of the aforementioned methods, wherein the first gaseous monomer is siloxane.

In certain embodiments, the present invention relates to any one of the aforementioned methods, wherein the first gaseous monomer is 1,3,5-trivinyl-1,1,3,5,5-pentamethyltrisiloxane or trivinyltrimethyl cyclotrisiloxane.

In certain embodiments, the present invention relates to any one of the aforementioned methods, wherein the first gaseous monomer is 1,3,5-trivinyl-1,1,3,5,5-pentamethyltrisiloxane (TVTSO).

In certain embodiments, the present invention relates to any one of the aforementioned methods, wherein the gaseous initiator is selected from the group consisting of peroxides, aryl ketones, and alkyl azo compounds.

In certain embodiments, the present invention relates to any one of the aforementioned methods, wherein the gaseous initiator is selected from the group consisting of tert-butyl peroxide, tert-amyl peroxide, triethylamine, tert-butylperoxy benzoate, benzophenone, and 2,2'-azobis (2-methylpropane) (ABMP).

In certain embodiments, the present invention relates to any one of the aforementioned methods, wherein the gaseous initiator is tert-butyl peroxide.

In certain embodiments, the present invention relates to any one of the aforementioned methods, wherein the second gaseous monomer is a siloxane.

In certain embodiments, the present invention relates to any one of the aforementioned methods, wherein the second gaseous monomer is 1,3,5-trivinyl-1,1,3,5,5-pentamethyltrisiloxane or trivinyltrimethyl cyclotrisiloxane.

In certain embodiments, the present invention relates to any one of the aforementioned methods, wherein the second gaseous monomer is 1,3,5-trivinyl-1,1,3,5,5-pentamethyltrisiloxane.

In certain embodiments, the present invention relates to any one of the aforementioned methods, wherein the first gaseous monomer is 1,3,5-trivinyl-1,1,3,5,5-pentamethyltrisiloxane, the second gaseous monomer is 1,3,5-trivinyl-1,1,3,5,5-pentamethyltrisiloxane, and the gaseous initiator is tert-butyl peroxide.

In certain embodiments, the present invention relates to any one of the aforementioned methods, wherein the first, second, and third auxiliary gases are independently selected from the group consisting of carrier gases, inert gases, reducing gases, oxidizing gases, and dilution gases.

In certain embodiments, the present invention relates to any one of the aforementioned methods, wherein the pressure in the partially evacuated vessel is from about 0.1 Torr to about 200 Torr.

In certain embodiments, the present invention relates to any one of the aforementioned methods, wherein the pressure in the partially evacuated vessel is from about 0.15 Torr to about 100 Torr.

In certain embodiments, the present invention relates to any one of the aforementioned methods, wherein the pressure in the partially evacuated vessel is from about 0.2 Torr to about 0.9 Torr.

In certain embodiments, the present invention relates to any one of the aforementioned methods, wherein the pressure in the partially evacuated vessel is from about 0.25 Torr to about 0.7 Torr.

In certain embodiments, the present invention relates to any one of the aforementioned methods, wherein the pressure in the partially evacuated vessel is from about 0.3 Torr to about 0.5 Torr.

In certain embodiments, the present invention relates to any one of the aforementioned methods, wherein the first flow rate is from about 30 sccm to about 0.01 sccm.

In certain embodiments, the present invention relates to any one of the aforementioned methods, wherein the first flow rate is from about 20 sccm to about 0.05 sccm.

In certain embodiments, the present invention relates to any one of the aforementioned methods, wherein the first flow rate is from about 10 sccm to about 0.1 sccm.

In certain embodiments, the present invention relates to any one of the aforementioned methods, wherein the second flow rate is from about 30 sccm to about 0.01 sccm.

In certain embodiments, the present invention relates to any one of the aforementioned methods, wherein the second flow rate is from about 20 sccm to about 0.05 sccm.

In certain embodiments, the present invention relates to any one of the aforementioned methods, wherein the second flow rate is from about 10 sccm to about 0.1 sccm.

In certain embodiments, the present invention relates to any one of the aforementioned methods, wherein the third flow rate is from about 5 sccm to about 750 sccm.

In certain embodiments, the present invention relates to any one of the aforementioned methods, wherein the third flow rate is from about 10 sccm to about 600 sccm.

In certain embodiments, the present invention relates to any one of the aforementioned methods, wherein the third flow rate is from about 25 sccm to about 500 sccm.

In certain embodiments, the present invention relates to any one of the aforementioned methods, wherein the fourth flow rate is from about 30 sccm to about 0.01 sccm.

In certain embodiments, the present invention relates to any one of the aforementioned methods, wherein the fourth flow rate is from about 20 sccm to about 0.05 sccm.

In certain embodiments, the present invention relates to any one of the aforementioned methods, wherein the fourth flow rate is from about 10 sccm to about 0.1 sccm.

In certain embodiments, the present invention relates to any one of the aforementioned methods, wherein the fifth flow rate is from about 5 sccm to about 750 sccm.

In certain embodiments, the present invention relates to any one of the aforementioned methods, wherein the fifth flow rate is from about 10 sccm to about 600 sccm.

In certain embodiments, the present invention relates to any one of the aforementioned methods, wherein the fifth flow rate is from about 25 sccm to about 500 sccm.

In certain embodiments, the present invention relates to any one of the aforementioned methods, wherein the sixth flow rate is from about 5 sccm to about 750 sccm.

In certain embodiments, the present invention relates to any one of the aforementioned methods, wherein the sixth flow rate is from about 10 sccm to about 600 sccm.

In certain embodiments, the present invention relates to any one of the aforementioned methods, wherein the sixth flow rate is from about 25 sccm to about 500 sccm.

In certain embodiments, the present invention relates to any one of the aforementioned methods, wherein the method further comprises the step of adjusting the temperature of the stage.

In certain embodiments, the present invention relates to any one of the aforementioned methods, wherein the temperature of the stage is from about −20° C. to about 110° C.

In certain embodiments, the present invention relates to any one of the aforementioned methods, wherein the temperature of the stage is from about 0° C. to about 80° C.

In certain embodiments, the present invention relates to any one of the aforementioned methods, wherein the temperature of the stage is from about 20° C. to about 70° C.

In certain embodiments, the present invention relates to any one of the aforementioned methods, wherein the temperature of the stage is from about 40° C. to about 60° C.

In certain embodiments, the present invention relates to any one of the aforementioned methods, wherein the stage is moveable.

In certain embodiments, the present invention relates to any one of the aforementioned methods, wherein the speed of the moveable stage is from about 10 mm/min to about 100 mm/min.

In certain embodiments, the present invention relates to any one of the aforementioned methods, wherein the speed of the moveable stage is from about 15 mm/min to about 80 mm/min.

In certain embodiments, the present invention relates to any one of the aforementioned methods, wherein the speed of the moveable stage is from about 20 mm/min to about 60 mm/min.

In certain embodiments, the present invention relates to any one of the aforementioned methods, wherein the method further comprises the step of discharging the energy in timed pulses, thereby creating a duty cycle.

In certain embodiments, the present invention relates to any one of the aforementioned methods, wherein the duty cycle is from about 5% to about 80%.

In certain embodiments, the present invention relates to any one of the aforementioned methods, wherein the duty cycle is from about 10% to about 60%.

In certain embodiments, the present invention relates to any one of the aforementioned methods, wherein the duty cycle is from about 15% to about 40%.

In certain embodiments, the present invention relates to any one of the aforementioned methods, wherein the duty cycle is from about 20% to about 30%.

In certain embodiments, the present invention relates to any one of the aforementioned methods, wherein the time that the discharge of energy is active, $t_{ON}$, is from about 1 ns to about 10 s.

In certain embodiments, the present invention relates to any one of the aforementioned methods, wherein the time that the discharge of energy is active, $t_{ON}$, is from about 1 ρs to about 6 s.

In certain embodiments, the present invention relates to any one of the aforementioned methods, wherein the time that the discharge of energy is active, $t_{ON}$, is from about 1 ms to about 2 s.

In certain embodiments, the present invention relates to any one of the aforementioned methods, wherein the first deposition rate is from about 1 nm/minute to about 100 nm/minute.

In certain embodiments, the present invention relates to any one of the aforementioned methods, wherein the first deposition rate is from about 10 nm/minute to about 100 nm/minute.

In certain embodiments, the present invention relates to any one of the aforementioned methods, wherein the first deposition rate is from about 20 nm/minute to about 90 nm/minute.

In certain embodiments, the present invention relates to any one of the aforementioned methods, wherein the second deposition rate is from about 1 nm/minute to about 100 nm/minute.

In certain embodiments, the present invention relates to any one of the aforementioned methods, wherein the second deposition rate is from about 10 nm/minute to about 100 nm/minute.

In certain embodiments, the present invention relates to any one of the aforementioned methods, wherein the second deposition rate is from about 20 nm/minute to about 90 nm/minute.

In certain embodiments, the present invention relates to any one of the aforementioned methods, wherein the first power is from about 10 W to about 100 W.

In certain embodiments, the present invention relates to any one of the aforementioned methods, wherein the first power is from about 25 W to about 75 W.

In certain embodiments, the present invention relates to any one of the aforementioned methods, wherein the second power is from about 800 W to about 1000 W.

In certain embodiments, the present invention relates to any one of the aforementioned methods, wherein the second power is from about 900 W to about 1000 W.

One aspect of the invention relates to an article comprising a substrate, and a coating on said substrate, wherein said coating comprises at least a first layer; and the first layer is organic and has a degree of global planarization greater than about 95%.

Another aspect of the invention relates to an article comprising a substrate, and a coating on said substrate, wherein said coating comprises a plurality of alternating layers; said plurality of alternating layers comprises at least a first layer and a second layer; the first layer is organic; the second layer is inorganic; and the first layer has a degree of global planarization greater than about 95%.

In certain embodiments, the present invention relates to any one of the aforementioned articles, wherein the second layer is selected from the group consisting of SiOx, SiOxNy, and SiNy.

In certain embodiments, the present invention relates to any one of the aforementioned articles, wherein the first layer has a thickness in the range of about 800 nm to about 1.25 μm.

In certain embodiments, the present invention relates to any one of the aforementioned articles, wherein the second layer has a thickness in the range of about 10 nm to about 500 nm.

In certain embodiments, the present invention relates to any one of the aforementioned articles, wherein the second layer has a thickness in the range of about 20 nm to about 400 nm.

In certain embodiments, the present invention relates to any one of the aforementioned articles, wherein the first layer has a transmittance of light from about 400 nm to about 800 nm that is in the range of about 80% to 100%.

In certain embodiments, the present invention relates to any one of the aforementioned articles, wherein the second layer has a transmittance of light from about 400 nm to about 800 nm that is in the range of about 80% to 100%.

In certain embodiments, the present invention relates to any one of the aforementioned articles, wherein the second layer has water vapor transmission rate of less than about $5*10^{-2}$ g $m^{-2}d^{-1}$.

In certain embodiments, the present invention relates to any one of the aforementioned articles, wherein the second layer has a water vapor transmission rate of less than about $10^{-2}$ g/$cm^2$/day.

In certain embodiments, the present invention relates to any one of the aforementioned articles, wherein the second layer has water vapor transmission rate of less than about $10^{-3}$ g $m^{-2}$ $d^{-1}$.

In certain embodiments, the present invention relates to any one of the aforementioned articles, wherein the second layer has an elastic modulus from about 10 GPa to about 90 GPa.

In certain embodiments, the present invention relates to any one of the aforementioned articles, wherein the second layer has an elastic modulus from about 20 GPa to about 80 GPa.

In certain embodiments, the present invention relates to any one of the aforementioned articles, wherein the second layer has hardness from about 5 GPa to about 15 GPa.

BRIEF DESCRIPTION OF THE DRAWINGS

FIG. 31 depicts absorption band assignments for infrared spectra.

FIG. 32 depicts two different pathways to the thermal decomposition of TBPO.

FIG. 39 depicts mechanical properties (Elastic modulus, E, hardness, H) measured by nanoindentation as a function of the plasma duty cycle (% DC). Values in this range are in agreement with the mechanical properties of thermal deposited silicon dioxide layers, reported in the last row.

FIG. 40 depicts critical tensile strain, critical bending radius and saturation crack density calculated from the fragmentation test for the $SiO_x$ coating deposited at DC=100% and 50% as a function of the thickness. High critical tensile strain, high saturation crack density and low critical bending radius demonstrates the high flexibility of the coatings and good adhesion and cohesion to the substrate.

FIG. 41 depicts $SiO_x$ bending failure points as a function of the thickness after bending in compression and in tension. The radius indicated in the table is the bending radius at which cracks appear on the surface. The strain corresponding to each bending radius has been calculated.

DETAILED DESCRIPTION OF THE INVENTION

Overview

Figure 1A:
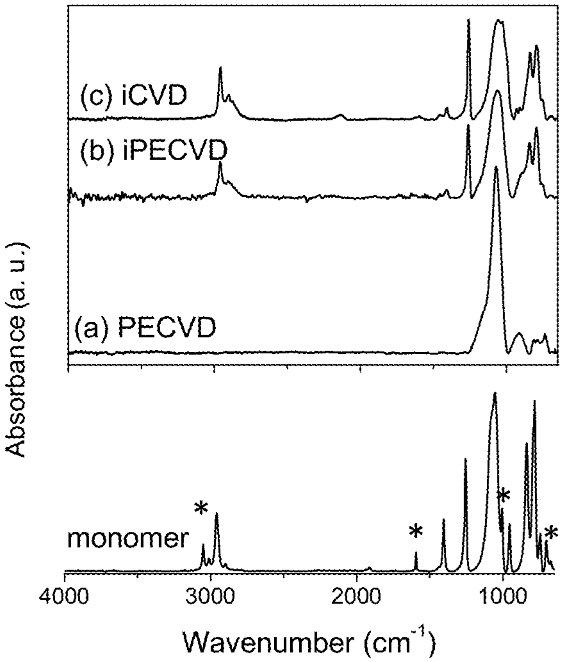
FIG. 1*a* depicts FTIR spectra of an organosilicon monomer, (a) a related inorganic coating deposited by PECVD, and related polymeric organic coatings deposited by (b) iPECVD and (c) iCVD.

Barrier coatings, which prevent the permeation of water into organic optoelectronic devices, including organic photovoltaic (OPV) devices fabricated on flexible plastic substrates, are essential to extend device lifetimes. Such protective coatings are made of multilayer stacks, in which multiple dense, inorganic layers are alternated with soft, organic layers. Inevitably, however, the inorganic layers contain pinholes and defects. The roles of the organic layer include (i) creating a tortuous and longer path among the defects of two successive inorganic layers, (ii) filling the pores of the inorganic layer onto which the organic layer is deposited, limiting the propagation of defects from one inorganic layer to the other, and (iii) smoothening the surface of the substrate, decreasing roughness. For smoothening the surface of the substrate (i.e., purpose (iii) above), the organic layer may be deposited directly on a substrate to achieve a surface that is less rough than the surface of the substrate itself. The resulting smooth organic surface may also find application as a low reflectivity optical coatings, a support layer for fabricating devices using processes which do not tolerate surface roughness, or for surfaces in contact with living cells, allowing control or influence of cell adhesion and differentiation.

Although it is possible to print many different kinds of electronic displays, in order for them to be commercially viable, they must be robust enough to survive conditions required of the display for the necessary period of time. This condition has been a limitation of many printable electronic displays. Beyond printability and functionality, one of the most important requirements is encapsulation. Many of the materials used in printed electronic displays are chemically sensitive, and will react with various environmental components. (H. Zervos, Barrier Films for Flexible Electronics 2011-2021: Needs, Players, and Opportunities, 2011), A significant commercial opportunity lies in the development of devices in a flexible form factor, allowing them to be more robust, lightweight and versatile in their uses. However, many of the materials currently used in OLED displays and organic photovoltaics are sensitive to the environment, limiting their lifetime. The materials can be protected using substrates and barriers, such as glass and metal, but this approach results in a rigid device that is not suitable for applications demanding flexibility. Additionally, the cost associated with current barrier strategies is too high for many envisioned applications. Thus, there is a need for alternative barrier coatings and methods of depositing them on a wide range of substrates using less-expensive materials, less materials overall, and fewer fabrication steps. Plastic substrates and transparent flexible encapsulation barriers can be used, but these offer little protection to oxygen and water, resulting in devices prone to rapid degradation.

In order to achieve device lifetimes on the order of tens of thousands of hours, water vapor transmission rates (WVTR) must be $10^{-6}$ g/m$^2$/day, and oxygen transmission rates (OTR) must be <$10^{-3}$ cm$^3$/m$^2$/day. For Organic Photovoltaics, the required WVTR is not as stringent as OLEDs require but is still very high at a level of $10^{-5}$ g/m$^2$/day. These transmission rates are several orders of magnitude less than what is possible using a plastic substrate, and they can also be several orders of magnitude less than what can be measured using common equipment designed for this purpose. For these (and other) reasons, there has been intense interest in developing transparent barrier materials with much lower permeabilities.

Organosilicon thin films are widely utilized for various applications, such as corrosion protection layers on metals, biomedical devices, anti-scratch coatings on plastic, optics, gas-barrier films on polymers for food and pharmaceutical packaging, low dielectric constant films and others. (A. M. Wròbel, and M. R. Wertheimer, "*Plasma Deposition, Treatment, and Etching of Polymers*," Academic Press, San Diego, Calif. 1990).

Organosilicon polymers can be deposited using CVD methods starting from a mixture of $SiH_4$ with reactive gases or starting from silicon-containing compounds (e.g., organosilicon monomers), which generally have the advantage of being volatile at room temperature, safe to handle, and relatively inexpensive. The choice of monomer is a fundamental step in the deposition process because it affects polymer growth rate, and film chemistry and structure.

Organosilicon coatings deposited by PECVD have the advantage of being highly cross-linked and adherent to the substrate, but often the organic content is reduced during the deposition process due to the collisions and substrate ion bombardment that remove the labile organic groups. (C. Rau, and W. Kulish, *Thin Solid Films* 1994, 249, 28). Recently, a new process, named initiated CVD (iCVD), has been developed to deposit polymers with high structure retention. (M. E. Alf, et al., *Adv. Mater.* 2010, 22). iCVD is an all-dry polymerization technique which involves reactions between radical-generating species and a monomer with unsaturated bonds to create monomer radicals which are adsorbed on the substrate surface where they polymerize. The polymerization mechanism generally involves three steps: initiation, propagation and termination. The process may be initiated when radicals are created by heating a filament array up to 200-300° C. Temperatures in this range are high enough to break only labile bonds, such as peroxide linkages contained in various initiator species, leaving intact the monomer molecule. The radicals initiate the polymerization by reacting with the unsaturated bonds of the adsorbed monomer, creating polymer chains with radical ends which then propagate by reacting with other monomer molecules. The substrate temperature is maintained below 100° C. to promote adsorption of the monomer. Finally, the termination step consists of capping the chain radical ends with the initiator radicals or by recombination of two polymeric chains. A schematic of the deposition mechanism is proposed by Lau et al., *Macromolecules* 2006, 39, 3688.

Organosilicon polymers have been deposited by iCVD from cyclic monomers (trivinyltrimethylcyclotrisiloxane, $V_3D_3$, and tetravinyltetramethylcyclotetrasiloxane, $V_4D_4$), linear monomers (hexavinyldisiloxane, HVDSO), and from a mixture of $V_3D_3$ and HVDSO. (O'Shaughnessy W. S. and Gleason K. K., Langmuir 2006, 22, 7021; N. J. Trujillo, et al., *Adv. Funct. Mater.* 2010, 20, 1; A. M. Coclite et al., *Macromolecules* 2009, 42, 8138; W. A. J. Achyuta et al., *Macromolecules* 2009, 42). The deposition of pure HVDSO, and mixed with $V_3D_3$, showed growth rates around 30 nm/min, but HVDSO is very expensive and not all the vinyl bonds react at the same time. The polymerization from the cyclic monomers resulted, instead, in deposition rates of <10 nm/min. The reason for such low deposition rates when compared to the iCVD of acrylate and methacrylate systems (growth rate around 70-100 nm/min) is that the vinyl bonds of the organosilicon monomer have a lower propagation rate constant, $k_p$, because they are less reactive. (M. E. Alf, et al., *Adv. Mater.* 2010, 22). Hence the slow kinetics of vinyl bond reaction is typically the rate limiting step for polymerization of the organosilicon monomers.

Good barrier properties (WVTR=$10^{-2}$ g/cm$^2$/day) have been obtained with a hexalayer prepared by coupling iCVD and plasma enhanced CVD (PECVD). iCVD layers resulted in effective defect decoupling and good planarization of the substrate. (Coclite et al., *Plasma Proc. Polym.*, 2010, 7, pp. 561).

iPECVD was used to deposit poly-2-hydroxyethyl methacrylate (pHEMA) with results comparable with pHEMA deposited by iCVD: high functional group retention due to the low plasma power (20 W) involved and to the initiator chemistry. (C. A. Pfluger, et al., *Macromol. Rapid Commun.* 2009, 30, 126). For the iPECVD of pHEMA, a capacitively-coupled radio frequency plasma (RF) was used.

One aspect of the present invention is a multilayer deposition in a large-area reactor (0.16 m$^3$), maintaining the same organosilicon precursor and the same reactor configuration for the deposition of both silica-like and organosilicon layers. The inorganic layer was deposited by conventional PECVD in high fragmentation regime, while the organic layer was deposited by iPECVD, a process similar to iCVD but which uses gentle plasma power to break down the initiator molecule, instead of a hot filament. $SiO_x$ layers were deposited through PECVD in MW plasma at high power and high oxygen dilution. The silanol and organic groups of the monomer were not detectable in the inorganic layers by IR spectroscopy.

One aspect of the invention is multilayer deposition in a large-area reactor (0.16 $m^3$), maintaining the same organosilicon precursor and the same reactor configuration for both deposition of silica-like and organosilicon layers. The possibility of a single-chamber system greatly simplifies the production and allows quicker and cheaper roll-to-roll deposition.

One aspect of the invention is the deposition of organic layers using iPECVD. The resultant organic layers have a high degree of both global and local planarization.

One aspect of the invention involves use of a pulsed discharge. In modulated discharges, the input power is delivered periodically to the reactor. Pulsing a plasma discharge may induce alterations of the discharge chemistry, which depend on the time the discharge is active, $t_{ON}$, the time it is unlit, $t_{OFF}$, and the duty cycle $DC=t_{ON}/(t_{OFF}+t_{ON})$, where $(t_{ON}+t_{OFF})$ is the period. A film deposited by pulsed plasma can have significantly different properties from one deposited by continuous plasma, as demonstrated in the field or fluorocarbon coatings. (H. G. P. Lewis, et al., *Chem Mater.* 2000, 12, 3488; A. K. H. Achyuta, et al., *Macromolecules* 2009, 42.) In PECVD processes with high fragmentation regimes, during the on-time the polymer growth is fast and the film is subject to positive ion bombardment, UV-radiation and to the interactions with many unstable species and fragments. The off-time, which is generally longer than the on-time, allows a slow growth of the polymer due to the long-lived radicals. Previous studies have shown that the deposition rate during the off-time may not be null, but appears to follow an exponential decay. (C. Charles, and R. W. Boswell, *J. Appl. Phys.* 1998, 84; A. Bousquet, et al., *Thin Solid Films* 2006, 514).

Figure 1B:
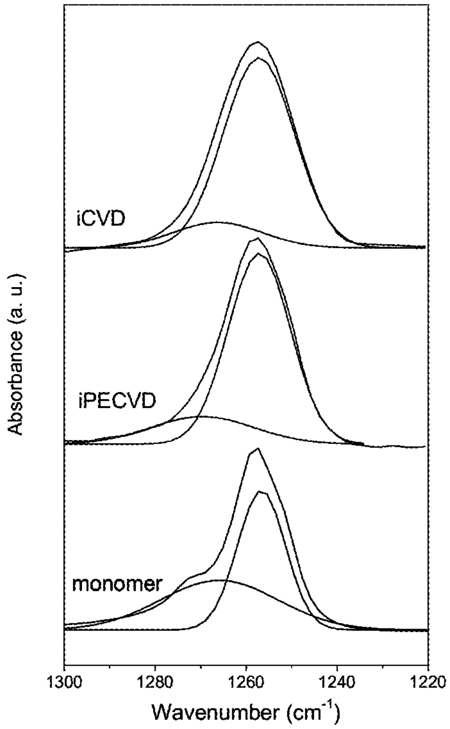
FIG. 1*b* depicts portions of FTIR spectra of an organosilicon monomer, and related polymeric organic coatings deposited by iPECVD and iCVD.

FIGS. 1*a* and 1*b* show the FTIR spectra of the organosilicon polymers obtained by iCVD and iPECVD and of the inorganic coating deposited by PECVD. The spectrum of the pure liquid monomer is included for comparison. Comparison of the three spectra shows that the absorption of the vinyl bonds present in the monomer spectrum, and evidenced with asterisks in FIG. 1*a*, are reduced in the polymer spectra, while the other absorptions are largely preserved. In fact, as previously demonstrated for iCVD, polymerization proceeds via the saturation of the vinyl bonds of the monomer, creating polymeric methylene chains. (A. M. Coclite, et al., *Macromolecules,* 2009, 42, 8138).

One aspect of the invention is an iPECVD process for the deposition of organosilicon polymers at improved deposition rates. The maximum deposition rate achieved by iPECVD was 30 nm/min compared to the maximum of 10 nm/min by iCVD. iPECVD used low plasma power density in order to have a quasi-selective fragmentation of the initiator molecule greater than that of the monomer molecule. The polymer obtained by iPECVD retained the organic functionalities. In fact, the C/Si ratio calculated from XPS data was 4.3, close to the 4.7 C/Si elemental ratio of the iCVD polymer. The observed carbon-to-silicon ratio in the polymers of the present invention is higher than the one calculated considering the monomer formula (C/Si=4). Similarly, the oxygen-to-silicon ratio of 1.4 in the polymers of the present invention is higher than 0.7 in the monomer. These differences are attributed to the initiation and termination reactions which result in the inclusion of tert-butoxy terminating groups in the polymer chain. The same reactor and the same monomer were used also to deposit inorganic $SiO_x$ layers. The organic content in these films was not detectable by IR spectroscopy, while a small OH bending absorption was detectable at 980 $cm^{-1}$. The inorganic layer was deposited with a deposition rate of 80 nm/min.

Figure 2:
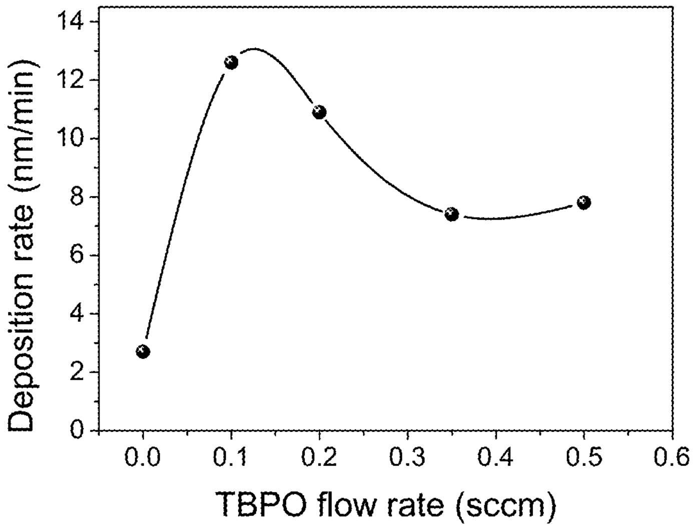
FIG. 2 depicts the deposition rate of a polymeric coating of the present invention as a function of the flow rate of the initiator (TBPO).
Figure 3:
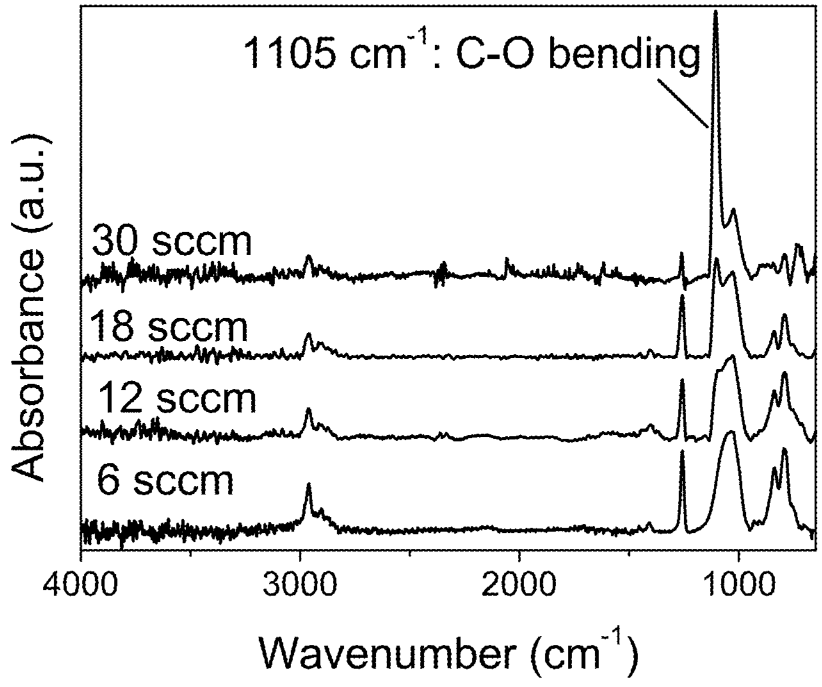
FIG. 3 depicts FTIR spectra of polymeric coatings of the present invention as a function of the flow rate of the initiator during their formation.

FIG. 2 shows the deposition rate of the iPECVD process as a function of the flow rate of the initiator. FIG. 3 shows FTIR spectra of polymeric coatings of the present invention as a function of the flow rate of the initiator. The marked increase in the deposition rate associated with initiator addition shows that the low plasma power density involved in the process just breaks the labile peroxide bond of the TBPO, and few active radicals are created by direct fragmentation of the monomer molecules. Therefore, we consider the initiator fragmentation to be the initiation step, similarly to iCVD. At high TBPO flow rate the deposition rate decreases due to the extensive end-capping reactions, which give rise to the formation of lightweight I-M-I or I-M-M-I oligomers.

iCVD is more promising than PECVD to reproduce the smoothening properties of liquid-phase polymerizations, since it is based on the absorption and polymerization of the reactive species without any bombardment of the substrate. Generally, plasma polymerization does not smooth a substrate well because the polymer layer grows atom-by-atom or molecule-by-molecule: the substrate is bombarded with the reactive species that generally hit and bond, reproducing or even increasing the substrate roughness through mechanisms such as grain boundary growth. (J. D. Affinito et al., *Thin Solid Film,* 1997, 308-9, 19).

Determining the Degree of Planarization

Figure 4:
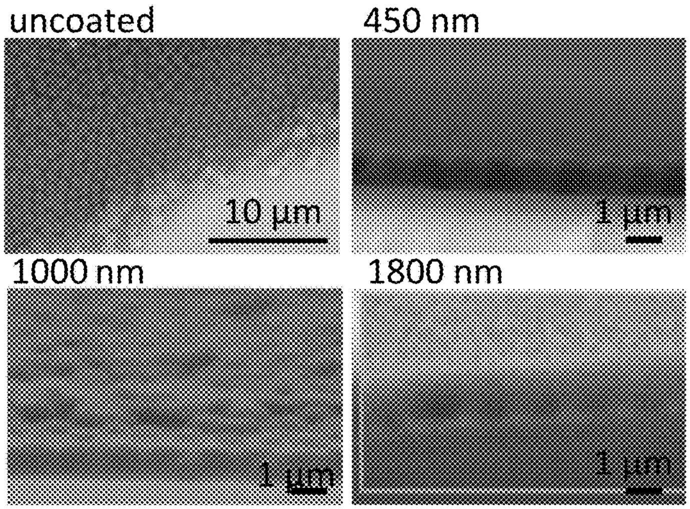
FIG. 4 depicts Scanning Electron Micrographs of cross-sections of uncoated and coated monolayers of microspheres (1 μm in diameter), wherein the polymeric coatings are of three different thicknesses.
Figure 20:
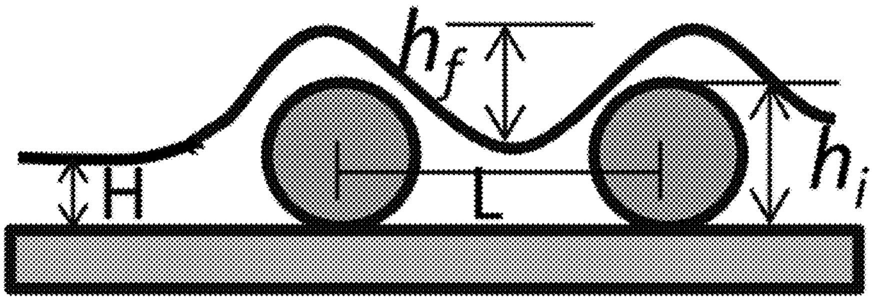
FIG. 20 depicts a schematic for $h_f$, the step height of the coating when deposited over a microsphere of initial height $h_i$.

With iPECVD we aimed to reproduce the liquid-like character of iCVD using conditions that strongly enhance the monomer adsorption on the surface (i.e., high pressure). We demonstrated the planarizing properties of the organosilicon polymer by depositing a coating over 1 μm diameter microspheres. FIG. 4 shows SEM images taken at different coating thicknesses. As the coating thickness increases, the surface becomes smoother. AFM investigations (not shown here) over substrate with low and high microsphere density allowed the calculation of the degree of planarization (DP) as $$DP_{\%} = 100\left(1 - \frac{h_f}{h_i}\right) \quad (1)$$

where $h_f$ is the step height of the coating when deposited over a microsphere of initial height $h_i$ (as shown in FIG. 20). (G. Rabilloud, in "High-performance polymers vol. 3" Editions TECHNIP, Paris, 2000, p. 275). The measurements taken on the coating deposited over high density of microspheres resulted in the degree of local planarization (DLP) (i.e., planarization over small area), while the measurements taken over samples with low microsphere density (1 microsphere over a 13 μm×13 μm area) gave the degree of global planarization (DGP).

Figure 5:
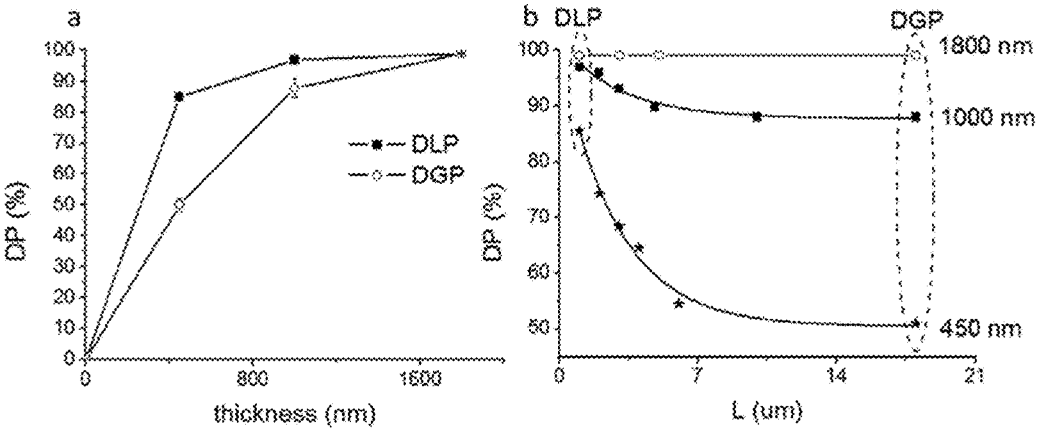
FIG. 5 depicts the degree of planarization (DP), locally (DLP), and globally (DGP) as a function of (a) the coating thickness, H, and (b) the distance between microspheres, L for H=0.45, 1, and 1.8 μm. (b) The data in (b) were fitted with an exponential decay equation.

FIG. 5 shows the calculated DP as a function of coating thickness. Increasing the thickness of a coating increases the DP, both locally and globally. The DLP increases much faster than the DGP. When the coating is 1 μm-thick, the DLP is already 99%. Global planarization is much more difficult to achieve, and a 1.8 μm-thick-coating was needed to reach a 99% degree of global planarization. Planarizing technologies have been extensively studied in the past for integrated circuits, but such a high degree of global planarization was difficult to achieve with polymeric coatings. (Rabilloud, 2000).

The remarkable planarization properties shown by the organosilicon polymers of the present invention when deposited by iPECVD might be due to the fact that the gaseous monomer vapor condenses on the substrate as a full-thickness liquid film covering all of the substrate surface features. The liquid film then interacts with the initiator radicals which initiate the radical polymerization on the surface. This explanation is in agreement with previous kinetic studies on the iCVD process which demonstrated that the polymerization takes place on the surface. Polymerization is governed by the parameter $P_M/P_{sat}$ (the ratio between the monomer partial pressure and the saturation pressure). (Lau K. K. S. and Gleason K. K., *Macromolecules,* 2006, 39, 3688; Lau K. K. S. and Gleason K. K., *Macromolecules,* 2006, 39, 3695). The parameter $P_M/P_{sat}$ gives a quantification of the amount of monomer absorbed on the surface.

One aspect of the present invention relates to the deposition of organosilicon and inorganic ($SiO_x$) polymeric layers with the purpose of depositing multilayer barrier coatings, wherein the layers are deposited in the same large-area deposition chamber, from the same organosilicon precursor and with relatively high deposition rates (30 nm/min for the organic and 80 nm/min for the inorganic layer). The organic layer was deposited by iPECVD, a process similar to iCVD but which uses gentle plasma power instead of a hot filament to break down the initiator molecule, while the inorganic layer was deposited by conventional PECVD in a high fragmentation regime. Organosilicon polymers deposited by iPECVD were demonstrated to preserve the organic content of the monomer structure. They also showed particularly good planarization properties. The smoothness and planarization properties of an organic layer are particularly important for optimizing the subsequent deposition of an inorganic layer (e.g., in the fabrication of multilayer barrier layers), minimizing or eliminating any defects in the surface of the substrate or an inorganic underlayer, thereby providing a microscopically flat surface for the deposition of a successive inorganic layer.

Figure 6:
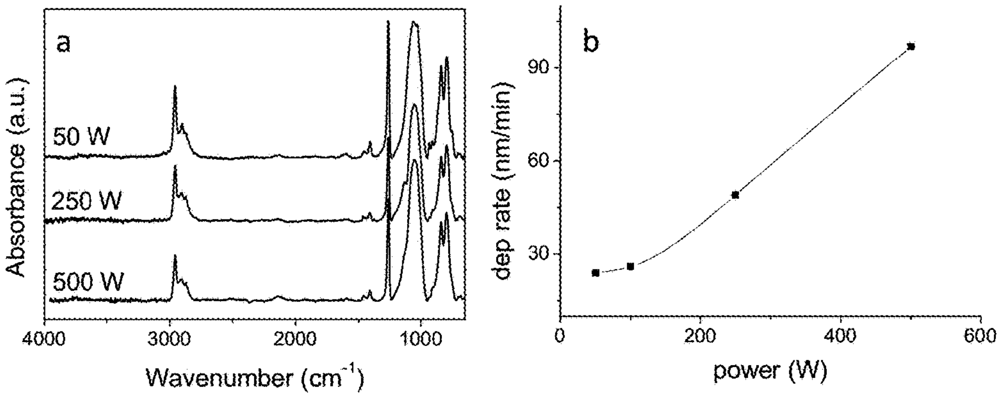
FIG. 6 depicts (a) FTIR spectra of polymeric organic coatings of the present invention as a function of the power used during deposition; and (b) the deposition rate for polymeric organic coatings of the present invention as a function of RF power.
Figure 7:
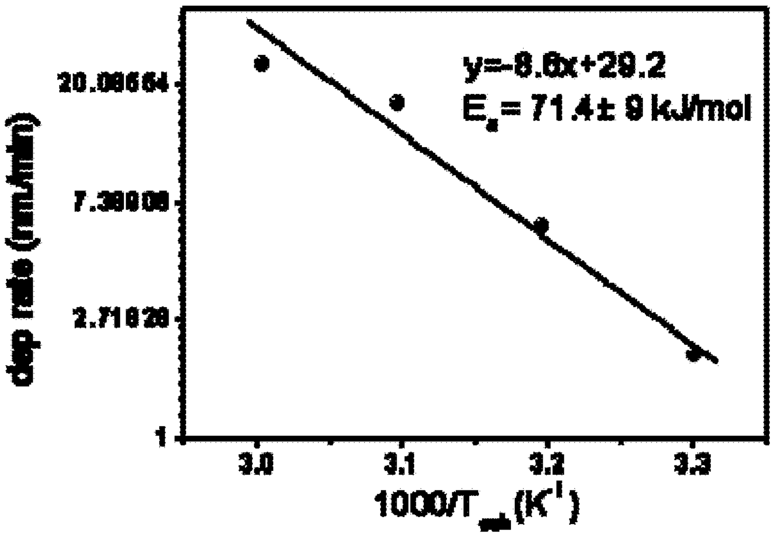
FIG. 7 depicts the deposition rate of polymeric organic coatings of the present invention as a function of the reciprocal of substrate temperature.

Various parameters can affect the deposition rate in the iPECVD method. FIG. 6*a* depicts FTIR spectra of polymers of the present invention as a function of power. FIG. 6*b* is a plot representing the effect on the deposition rate of increasing power for a polymeric coating of the present invention. FIG. 7 depicts the deposition rate of a polymeric coating of the present invention as a function of substrate temperature.

Figure 8:
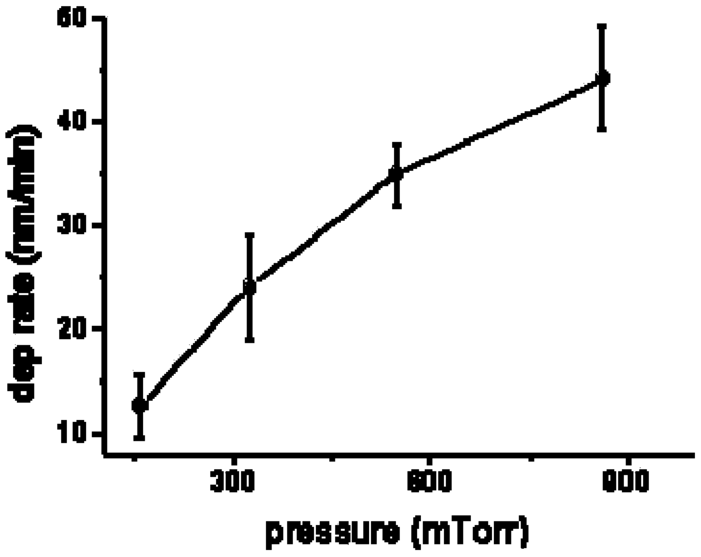
FIG. 8 depicts the deposition rate of polymeric organic coatings of the present invention as a function of pressure.
Figure 9:
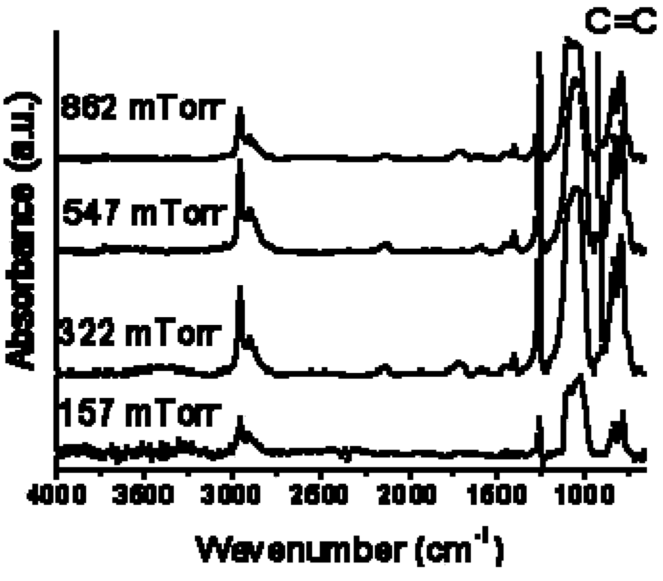
FIG. 9 depicts FTIR spectra of polymeric organic coatings of the present invention as a function of the pressure at which they were deposited.

FIG. 8 depicts the deposition rate of a polymer of the present invention as a function of pressure. The increase in pressure can increase the content of unreacted vinyl bonds causing outgasing of monomer molecules, thereby creating pinholes. FIG. 9 depicts FTIR spectra of polymeric coatings of the present invention as a function of pressure.

Figure 10A:
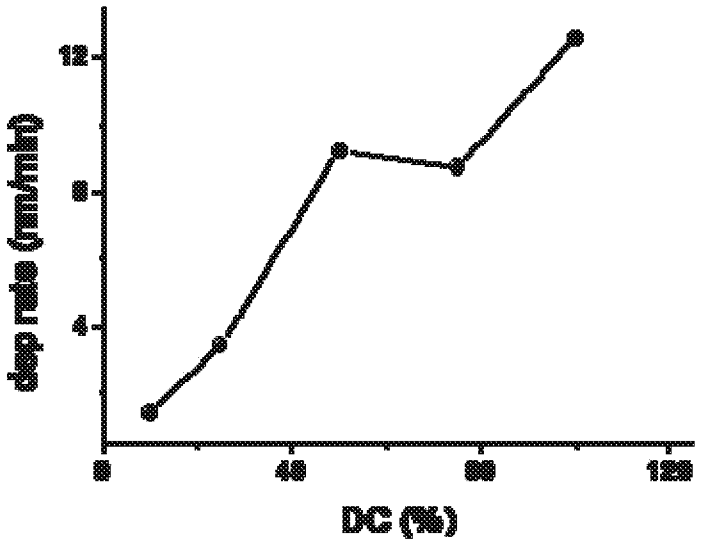
FIG. 10*a* plots the deposition rate of polymeric organic coatings of the present invention as a function of duty cycle (DC).
Figure 10B:
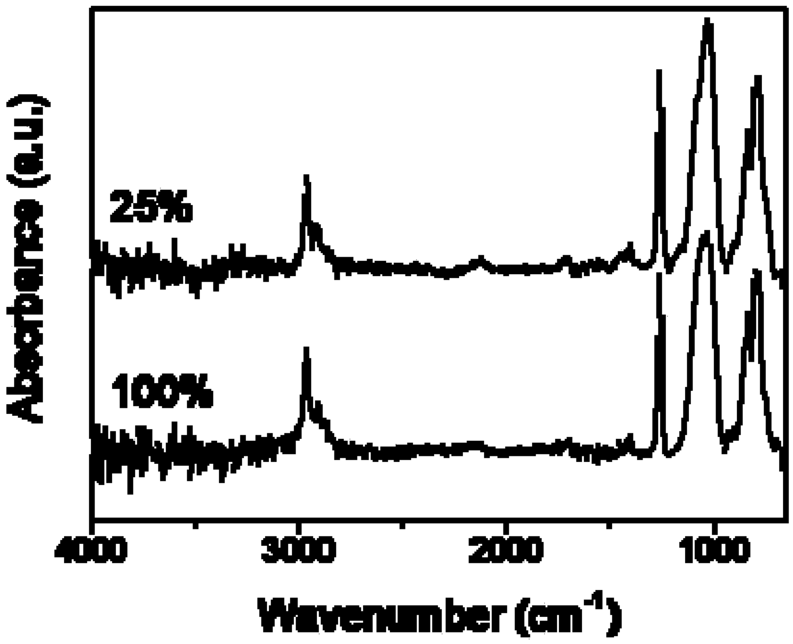
FIG. 10*b* depicts FTIR spectra of polymeric organic coatings of the present invention as a function of duty cycle (DC).

FIG. 10*a* shows the deposition rate as a function of the duty cycle (DC). It is worth noting that the deposition rate decreases linearly with the DC, and when the DC is reduced by a factor of ten (from 100% to 10%) the deposition rate is likewise reduced by a factor of ten (from 27 nm/min to 3 nm/min). This result is in line with the low fragmentation regime predicted for iPECVD—uptake of initiator radical is low during the $t_{OFF}$ period so little or no deposition occurs. FIG. 10*b* shows the IR spectra of the polymers deposited at DC=100% and DC=25%. The chemistry of the two films seems to be similar, showing that the monomer structure and the organic functionalities are largely preserved with a continuous discharge.

Figure 11:
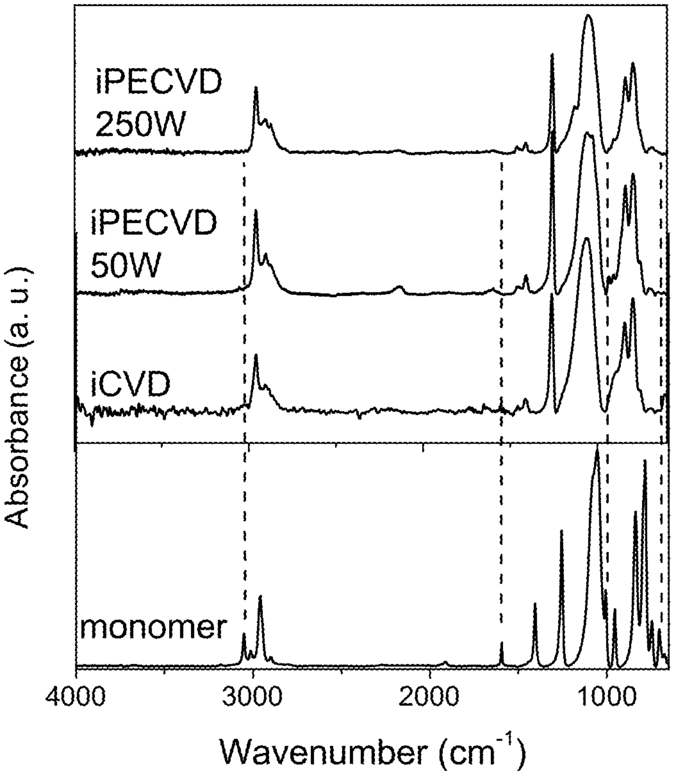
FIG. 11 depicts FTIR spectra of a monomer and polymeric organic coatings of the present invention deposited by iCVD and iPECVD (at 50 W and 250 W), where the dashed lines indicate absorptions associated with the vinyl group.

FIG. 11 shows the infrared spectra of organosilicon polymers obtained by iCVD and iPECVD at two input powers, 50 W and 250 W. The spectrum of the pure liquid monomer is included for comparison. The comparison between the three spectra shows the absorption of the vinyl bonds present in the monomer spectrum (e.g., $sp^2$-C—H stretching band at 3050-2950 $cm^{-1}$, $sp^2$-C—H bending at 1400 $cm^{-1}$ or wagging mode of Si—CH═$CH_2$ groups at 950 and 700 $cm^{-1}$), and evidenced with dashed lines in FIG. 11, are reduced in the polymer spectra, while all the other absorptions are largely preserved. The spectrum of the sample deposited at 250 W shows a lower organic content than the coating deposited at 50 W, demonstrating that low power helps to preserve the constituents of the monomer.

Figure 12A:
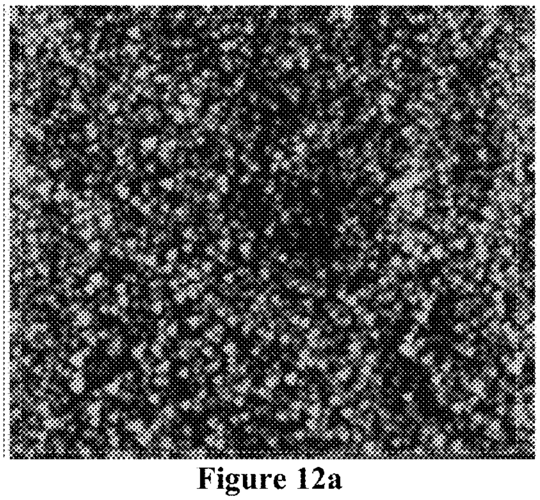
FIG. 12*a* depicts an AFM image of an inorganic single layer polymeric coating of the present invention on PET.
Figure 12B:
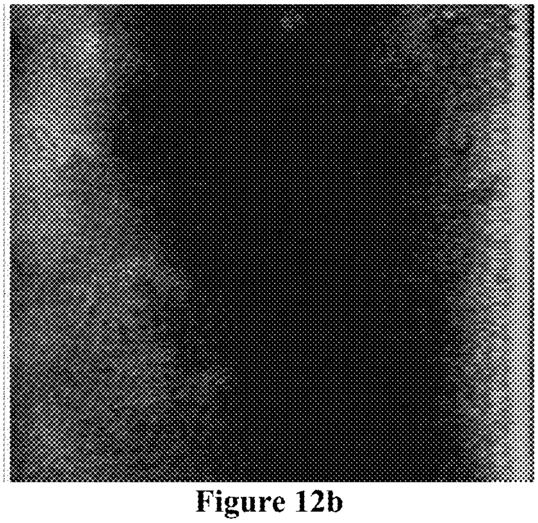
FIG. 12*b* depicts an AFM image of an organic single layer polymeric coating of the present invention on PET.
Figure 12C:
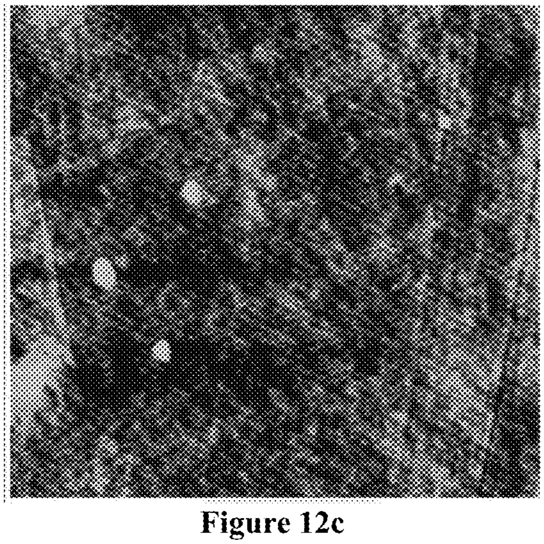
FIG. 12*c* depicts an AFM image of an uncoated PET surface.

The inorganic layer, organic layer, and bare PET substrate roughness and surface morphology were investigated by AFM. FIG. 12*a* depicts an AFM image of an inorganic single layer of the present invention on PET. FIG. 12*b* depicts an AFM image of an organic single layer of the present invention on PET. FIG. 12*c* depicts an AFM image of a bare PET surface. The PET substrate shows a roughness around 1.5 nm, and contains residual particles such as anti-blocking agent (30 nm height, white spots in FIG. 12*c*) related to its extrusion and bi-axial stretching production process. The organic polymeric coating deposited by iPECVD exhibits a very low RMS roughness of about 1.4 nm. The RMS roughness of the inorganic layer was about 2.2 nm. Granular structure growth has been observed by ALD, related to PECVD deposition. The granular growth is due to the presence of some gas phase reaction that causes the formation of particulates in the plasma sheath. The gas phase particles then drop on to the surface and form columns of dense $SiO_2$-like areas separated by less dense material. A reduction in the granular growth in the inorganic material may be achieved by pulsing the plasma discharge. The growth of the gas phase particles would be curtailed by turning the plasma off. Eliminating or limiting gas phase particle growth while favouring surface growth mechanisms is important for the deposition of a high quality inorganic barrier layer.

Since barrier performance strongly correlates with substrate surface smoothness, one embodiment of the invention relates to first depositing an organic iPECVD layer over the PET substrate, and then depositing a second organic layer on top of the inorganic layer.

Figure 13A:
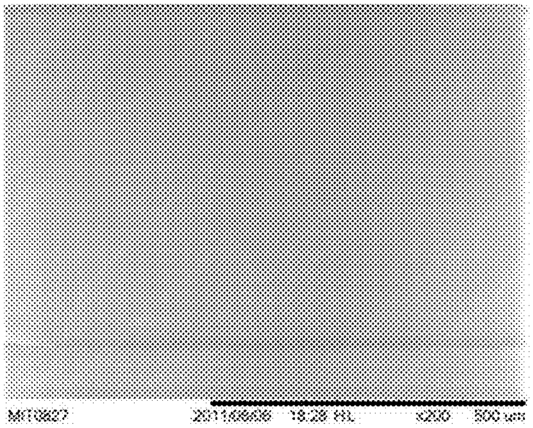
FIG. 13*a* depicts an SEM image of a 240 nm-thick inorganic coating of the present invention before bending.
Figure 13B:
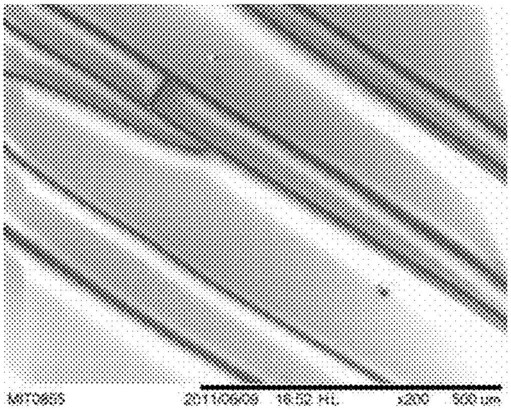
FIG. 13*b* depicts an SEM image of a 240 nm-thick inorganic coating of the present invention after bending.

Several inorganic layers were deposited on a PET substrate under similar conditions, as described herein, varying layer thickness from 25 nm to 250 nm in order to evaluate the flexibilities of the resulting inorganic single layers. FIG. 13*a* depicts an SEM image of a 240 nm-thick inorganic layer of the present invention before bending. FIG. 13*b* depicts an SEM image of a 240 nm-thick inorganic layer of the present invention after bending. The surface layer was studied before and after bending using AFM, SEM, and a profilometer. No defects or cracks after bending were noticed for thicknesses below 220 nm, as these layers remained flexible. However, as shown in FIG. 13*b*, the 250 nm thick inorganic layer exhibits micro-cracking before bending, which get deeper after bending. Thicker inorganic coatings tend to promote cracking. Micro-cracking before bending is related to the inorganic stress layer during growth caused by surface substrate particles (mostly anti-block agents). The cracks that appeared during growth expanded and became deeper during bending. There are, therefore, superior thicknesses for inorganic layers deposited on PET. One aspect of the invention is the deposition of an organic layer to reduce the stress in the inorganic layer in order to avoid the formation of cracks and enhance the flexibility of the resulting multilayer.

Figure 14A:
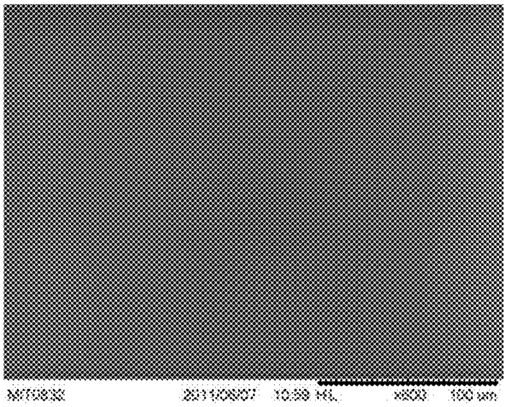
FIG. 14*a* depicts an SEM image of an organic polymeric coating of the present invention before bending.
Figure 14B:
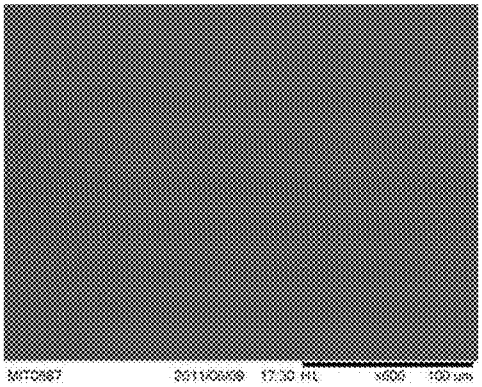
FIG. 14*b* depicts an SEM image of an organic polymeric coating of the present invention after bending.

The organic layer, $SiO_xC_yH_z$, exhibits very soft and flexible mechanical properties. The hardness and elastic modulus of such layers have been reported to be typically about 2 GPa and 10 GPa, respectively. Within the barrier film of the present invention, this layer is used for smoothing the surface substrate, filling inorganic defects, and enhancing the film flexibility. In one example, in order to fulfill these objectives, the organic layer was deposited with a thickness of about 1 μm. FIG. 14*a* depicts an SEM image of an organic surface layer of the present invention before bending. FIG. 14*b* depicts an SEM image of an organic surface layer of the present invention after bending. As shown in FIG. 14*b*, no cracking was observed after bending the 1 μm thick organic layer, which demonstrates a high degree of flexibility.

Figure 15A:
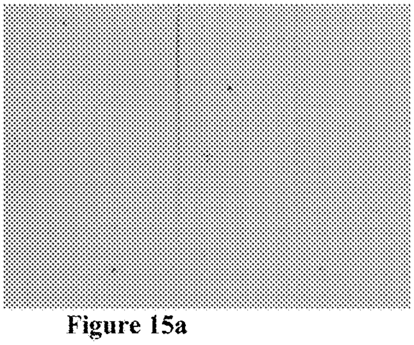
FIG. 15*a* depicts an image from an optical microscope (20×) of an inorganic coating of the present invention after nano scratching at 3 mN and 2 mN.
Figure 15B:
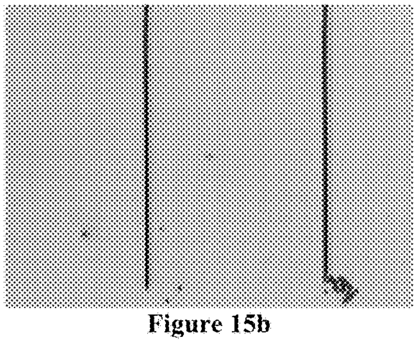
FIG. 15*b* depicts an image from an optical microscope (20×) of an organic polymeric layer of the present invention after nano scratching at 3 mN and 2 mN.
Figure 16A:
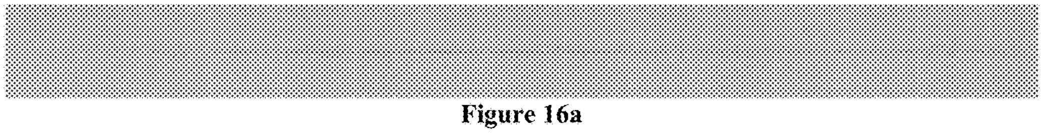
FIG. 16*a* depicts an image from an optical microscope (20×) of an inorganic layer of the present invention after nano scratching from 0 to 2 mN load.
Figure 16B:
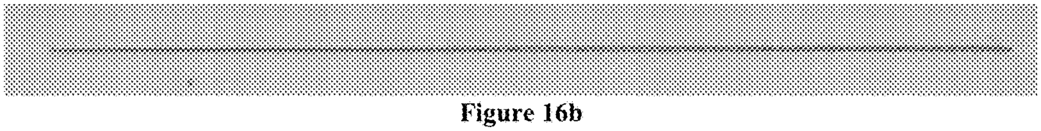
FIG. 16*b* depicts an image from an optical microscope (20×) of an organic polymeric layer of the present invention after nano scratching from 0 to 2 mN load.

Scratch resistance was compared for both the inorganic and the organic layers using the nano scratching testing apparatus. Progressive load was applied to each single layer separately, from 0 to 2 mN and from 0 to 3 mN, along 1 mm scratch length. FIG. 15*a* depicts an optical microscope (20×) image of nano scratching over an inorganic layer of the present invention, where the left scratch is at a 3 mN load, and the right scratch is at a 2 mN load. FIG. 15*b* depicts an optical microscope (20×) image of nano scratching over an organic layer of the present invention, where the left scratch is at a 3 mN load, and the right scratch is at a 2 mN load. FIG. 16*a* depicts an optical microscope (20×) image of nano scratching over an inorganic layer of the present invention, where the load is from 0 to 2 mN. FIG. 16*b* depicts an optical microscope (20×) image of nano scratching over an organic layer of the present invention, where the load is from 0 to 2 mN. These Figures demonstrate that the inorganic layer is highly-resistant to scratches compared to the organic layer which is softer. Regardless of the magnitude of the applied load between 0 and 3 mN the organic layer was easily scratched, and scratch width remained roughly constant.

Generally, inorganic $SiO_2$-like thin films exhibit high hardness (~10-12 GPa) and high elastic modulus (~80 GPa). (Yeon-Gil Jung and Brian R. Lawn Evaluation of elastic modulus and hardness of thin films by nanoindentaion *J. Mater. Res.*, Vol 19, No. 10, October 2004). A 1 μm-thick inorganic layer was deposited on silicon substrate for mechanical properties testing. Then, a 1.7 mN load was applied to the sample via the tip while keeping the indentation depth less than 100 nm. Sample creep was observed to cease after about 5 seconds. Table 1 below presents the obtained hardness and elastic modulus of the inorganic single layer and bare silicon substrate, respectively. Measuring mechanical properties within the first 100 nm avoided the silicon substrate effect. The inorganic layer exhibited very hard and rigid properties.

TABLE 1

| | Hardness (GPa) | Elastic Modulus (Gpa) |
|---|---|---|
| Inorganic Layer | 11.9 | 83.2 |
| Silicon Substrate | 15.3 | 217.0 |

Figure 17:
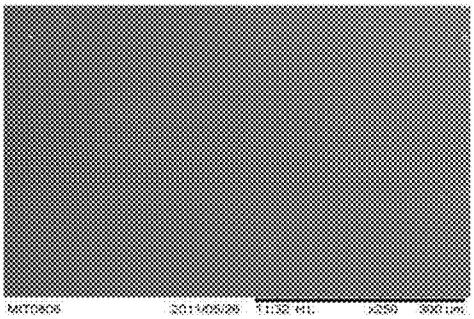
FIG. 17 depicts an SEM picture of an organic-inorganic bilayer coating of the present invention after bending.

A 1 μm-thick organic layer was deposited over the PET substrate for smoothing the surface and covering all the undesirable PET substrate particles. A smoother substrate surface significantly reduces the inorganic stress during the growth phase, thus avoiding cracks and other layer defects. Various thicknesses of the inorganic layers were deposited and studied over the 1 μm-thick organic layer, itself deposited on PET. The first bilayer had a 20 nm inorganic layer over the 1 μm organic layer. The second bilayer had a 100 nm inorganic layer deposited over the 1 μm organic layer. The third bilayer had a 400 nm inorganic layer deposited over the 1 μm organic layer. SEM and profilometer were used for investigating bilayer flexibility and surface morphology. As shown in FIG. 17, no cracking was noticed on either bilayer, even for the thickest inorganic layer (400 nm). FIG. 17 depicts an SEM image of the third bilayer of the present invention after bending. Compared to the 250 nm thick single inorganic layer deposited on PET substrate, the organic layer offers a better substrate surface. Moreover, since the organic layer is easily bent, distorted, and absorbs mechanical strain; the resulting barrier film acquires better flexibility by adding organic layers.

Figure 18:
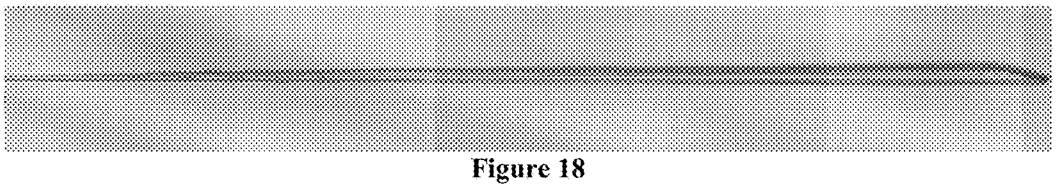
FIG. 18 depicts an image from an optical microscope (20×) of scratches carried out on an organic-inorganic bilayer coating of the present invention.

In addition to hardness and flexibility testing, bilayer adhesion on a PET substrate was studied using nano scratching. FIG. 18 depicts an optical microscope (20×) image of scratches carried out on the third bilayer of the present invention. No film delamination was seen along the scratch; the bilayer adhered well to the PET substrate.

Figure 19A:
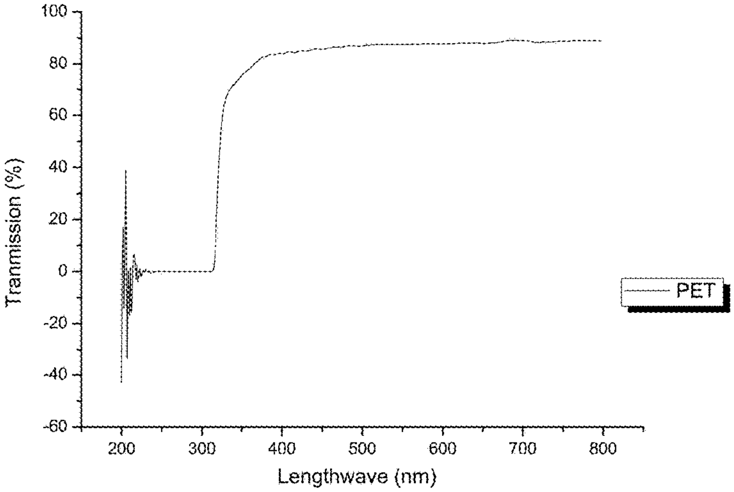
FIG. 19*a* depicts the UV-visible transmission spectrum of PET.
Figure 19B:
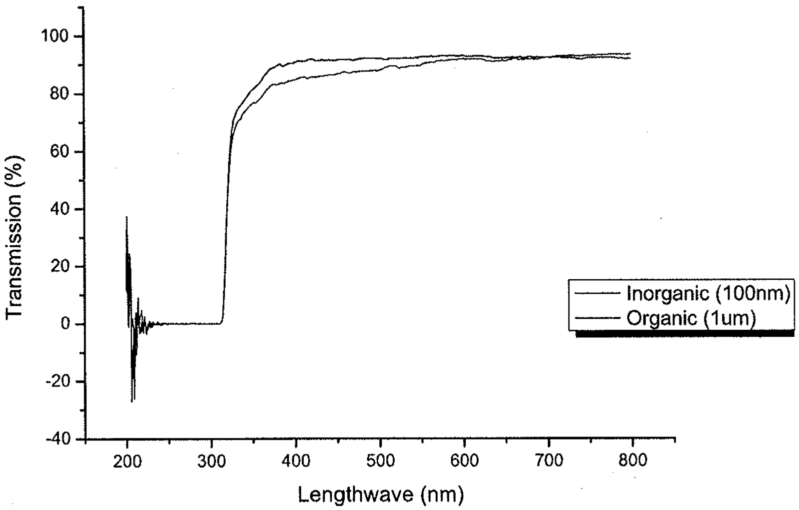
FIG. 19*b* depicts the UV-visible transmission spectra of exemplary single layer coatings of the present invention on a PET sample.
Figure 19C:
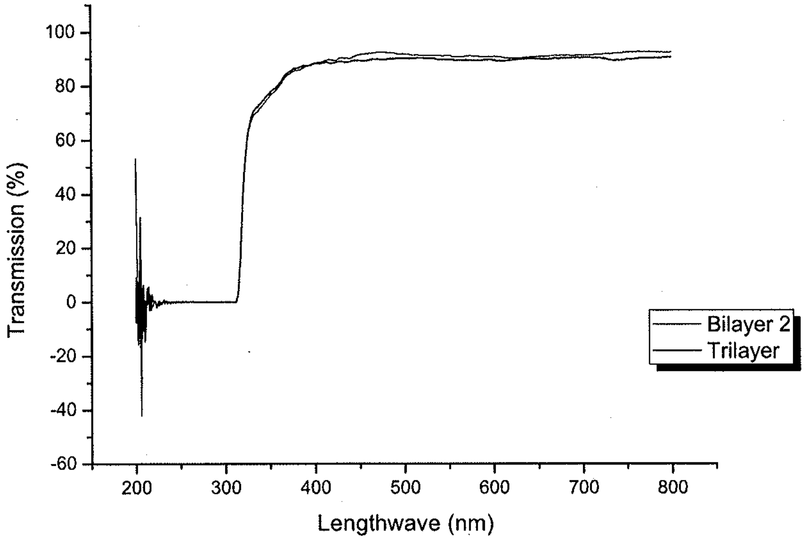
FIG. 19*c* depicts the UV-visible transmission spectra of exemplary organic-inorganic multi-layers of the present invention on a PET sample.

The transparency of various barriers of the present invention, deposited on PET, was investigated using a UV-visible spectrometer. Spectra of single layers, bilayers and tri-layers were studied in order to detect and assess any changes in transmittance. FIG. 19*a* depicts the UV-visible transmission spectra of bare PET. FIG. 19*b* depicts the UV-visible transmission spectra of PET bearing single layers of the present invention, both inorganic and organic. FIG. 19*c* depicts the UV-visible transmission spectra of PET bearing multi-layers of the present invention, both bilayers and tri-layers. As shown in FIGS. 19*a*-19*c*, all of the films of the present invention deposited on PET, whatever the thickness or the number of layers, have a transmittance comparable to the PET substrate. The highest transmittance was about 90% in the range of 400-800 nm and the % transmittance drops quickly to 0% above 350-400 nm. Therefore, the present barrier films do not affect OPV solar spectrum absorption.

The Water Vapour Transmission Rate (WVTR) was measured through single layers and bilayers based on calcium thin-film degradation. The 100 nm thick single inorganic layer exhibited a very low water vapour permeation rate. This value would be equal to $2.2\times10^{-2}$ $g/m^2/day^{-1}$ at 25° C./98% R. H. which is a significant single layer improvement compared to a bare PET layer (5 $g/m^2/day^1$ at 25° C./98% RH). The barrier properties of the first bilayer, where the inorganic layer was only 20 nm and the organic layer was 1 μm, exhibited even more remarkable results, as shown in Table 2. This demonstrates that when the inorganic layer is deposited on the top of a planarizing organic layer, the water vapour transmission rate is significantly low even at very small thicknesses (20 nm). The second bilayer shows slightly lower WVTR than the first bilayer due to the increased thickness of the inorganic layer (100 nm inorganic layer, and 1 μm organic layer). A promising structure seems to be alternating 1 μm thick organic layers and 20 nm thick inorganic layers. Therefore, another aspect of the invention relates to multi-dyad barriers with varying inorganic layer density to enhance barrier performance and approach a WVTR of about $10^{-4}$ $g/m^{-2}/day^{-1}$.

TABLE 2

| Layer | Inorganic Layer (nm) | Time of Failure (h) | Avg. WVTR ($gm^{-2}d^{-1}$) |
|---|---|---|---|
| Single Inorganic Layer | 100 | 37.8 | 0.225 |
| First Bilayer | 20 | 33.3 | 0.254 |
| Second Bilayer | 100 | 43.0 | 0.203 |

The iPECVD coating process can take place across a range of pressures, spanning greater than atmospheric pressure to low vacuum. The pressure of the deposition chamber can be selected to provide a suitable environment for coating extremely fine objects. In certain embodiments, the pressure of the deposition chamber is in the range of about 0.01 Torr to about 800 Torr. In certain embodiments, the pressure of the deposition chamber is in the range of about 0.05 Torr to about 600 Torr. In certain embodiments, the pressure of the deposition chamber is in the range of about 0.075 Torr to about 400 Torr. In certain embodiments, the pressure of the deposition chamber is in the range of about 0.1 Torr to about 200 Torr. In certain embodiments, the pressure of the deposition chamber is in the range of about 0.15 Torr to about 100 Torr. In certain embodiments, the pressure of the deposition chamber is in the range of about 0.2 Torr to about 0.9 Torr. In certain embodiments, the pressure of the deposition chamber is in the range of about 0.25 Torr to about 0.7 Torr. In certain embodiments, the pressure of the deposition chamber is in the range of about 0.3 Torr to about 0.5 Torr. In certain embodiments, the pressure of the deposition chamber is about 0.01 Torr, about 0.05 Torr, about 0.075 Torr, about 0.1 Torr, about 0.15 Torr, about 0.175 Torr, about 0.2 Torr, about 0.25 Torr, about 0.3 Torr, about 0.35 Torr, about 0.4 Torr, about 0.45 Torr, about 0.5 Torr, about 0.55 Torr, about 0.6 Torr, about 0.65 Torr, about 0.7 Torr, about 0.75 Torr, about 0.8 Torr, about 0.85 Torr, about 0.9 Torr, about 0.95 Torr, or about 1 Torr. In certain embodiments, the pressure of the deposition chamber is about 2 Torr, about 3 Torr, about 4 Torr, about 5 Torr, about 6 Torr, about 7 Torr, about 8 Torr, about 9 Torr, or about 10 Torr. In certain embodiments, the pressure of the deposition chamber is about 20 Torr, about 30 Torr, about 40 Torr, about 50 Torr, about 60 Torr, about 70 Torr, about 80 Torr, about 90 Torr, or about 100 Torr. In certain embodiments, the pressure of the deposition chamber is about 200 Torr, about 300 Torr, about 400 Torr, about 500 Torr, about 600 Torr, about 700 Torr, or about 800 Torr.

In certain embodiments, the first gaseous monomer is selected from the group consisting of acrylates, vinyl compounds, acetylenes, and organosilicons.

In certain embodiments, the first gaseous monomer is selected from the group consisting of acrylate, diacrylate, perfluorodecyl acrylate, methacrylic acid-co-ethyl acrylate, methacrylate, ethylene glycol dimethacrylate, dimethacrylate, methacrylic and acrylic acid, cyclohexyl methacrylate, glycidyl methacrylate, propargyl methacrylate, pentafluorophenyl methacrylate, furfuryl methacrylate, styrene and styrene derivatives, dimethylaminomethyl styrene, 4-aminostyrene, maleic anhydride-alt-styrene, divinylbenzene, p-divinylbenzene, vinylimidazole, vinyl pyrrolidone, divinyloxybutane, N-isopropylacrylamide, diethylene glycol divinyl ether, phenyl acetylene, and siloxane.

In certain embodiments, the second gaseous monomer is an organosilicon.

In certain embodiments, the second gaseous monomer is a siloxane.

The flow rate of the first monomer can be varied in the iPECVD method. In certain embodiments, the flow rate of the first monomer is about 10 sccm. In other embodiments, the flow rate is less than about 10 sccm. In certain embodiments, the flow rate of the first monomer is in the range of about 30 sccm to about 0.01 sccm. In certain embodiments, the flow rate of the first monomer is in the range of about 20 sccm to about 0.05 sccm. In certain embodiments, the flow rate of the first monomer is in the range of about 10 sccm to about 0.1 sccm. In certain embodiments, the flow rate of the first monomer is about 30 sccm, about 28 sccm, about 26 sccm, about 24 sccm, about 22 sccm, about 20 sccm, about 18 sccm, about 16 sccm, about 14 sccm, about 12 sccm, or about 10 sccm. In certain embodiments, the flow rate of the first monomer is about 9 sccm, about 8 sccm, about 7 sccm, about 6 sccm, about 5 sccm, about 4 sccm, about 3 sccm, about 2 sccm, or about 1 sccm. In certain embodiments, the flow rate of the first monomer is about 0.9 sccm, about 0.8 sccm, about 0.7 sccm, about 0.6 sccm, about 0.5 sccm, about 0.4 sccm, about 0.3 sccm, about 0.2 sccm, about 0.1 sccm, about 0.05 sccm, or about 0.01 sccm.

The flow rate of the second monomer can be varied in the iPECVD method. In certain embodiments, the flow rate of the second monomer is about 10 sccm. In other embodiments, the flow rate is less than about 10 sccm. In certain embodiments, the flow rate of the second monomer is in the range of about 30 sccm to about 0.01 sccm. In certain embodiments, the flow rate of the monomer is in the range of about 20 sccm to about 0.05 sccm. In certain embodiments, the flow rate of the second monomer is in the range of about 10 sccm to about 0.1 sccm. In certain embodiments, the flow rate of the second monomer is about 30 sccm, about 28 sccm, about 26 sccm, about 24 sccm, about 22 sccm, about 20 sccm, about 18 sccm, about 16 sccm, about 14 sccm, about 12 sccm, or about 10 sccm. In certain embodiments, the flow rate of the second monomer is about 9 sccm, about 8 sccm, about 7 sccm, about 6 sccm, about 5 sccm, about 4 sccm, about 3 sccm, about 2 sccm, or about 1 sccm. In certain embodiments, the flow rate of the second monomer is about 0.9 sccm, about 0.8 sccm, about 0.7 sccm, about 0.6 sccm, about 0.5 sccm, about 0.4 sccm, about 0.3 sccm, about 0.2 sccm, about 0.1 sccm, about 0.05 sccm, or about 0.01 sccm.

The flow rate of the initiator can be varied in the iPECVD method. In certain embodiments, the flow rate of the initiator is about 10 sccm. In other embodiments, the flow rate is less than about 10 sccm. In certain embodiments, the flow rate of the initiator is in the range of about 30 sccm to about 0.01 sccm. In certain embodiments, the flow rate of the initiator is in the range of about 20 sccm to about 0.05 sccm. In certain embodiments, the flow rate of the initiator is in the range of about 10 sccm to about 0.1 sccm. In certain embodiments, the flow rate of the initiator is about 30 sccm, about 28 sccm, about 26 sccm, about 24 sccm, about 22 sccm, about 20 sccm, about 18 sccm, about 16 sccm, about 14 sccm, about 12 sccm, or about 10 sccm. In certain embodiments, the flow rate of the initiator is about 9 sccm, about 8 sccm, about 7 sccm, about 6 sccm, about 5 sccm, about 4 sccm, about 3 sccm, about 2 sccm, or about 1 sccm. In certain embodiments, the flow rate of the initiator is about 0.9 sccm, about 0.8 sccm, about 0.7 sccm, about 0.6 sccm, about 0.5 sccm, about 0.4 sccm, about 0.3 sccm, about 0.2 sccm, about 0.1 sccm, about 0.05 sccm, or about 0.01 sccm.

The iPECVD coating process can take place at a range of temperatures. In certain embodiments, the temperature of the substrate is ambient temperature. In certain embodiments, the temperature is about −20° C. In certain embodiments, the temperature of the substrate is about −10° C. In certain embodiments, the temperature of the substrate is about 0° C. In certain embodiments, the temperature of the substrate is about 10° C. In certain embodiments, the temperature is about 20° C. In certain embodiments, the temperature of the substrate is about 30° C. In certain embodiments, the temperature of the substrate is about 40° C. In certain embodiments, the temperature of the substrate is about 50° C. In certain embodiments, the temperature of the substrate is about 60° C. In certain embodiments, the temperature of the substrate is about 70° C. In certain embodiments, the temperature of the substrate is about 80° C. In certain embodiments, the temperature of the substrate is about 90° C. In certain embodiments, the temperature of the substrate is about 100° C. In certain embodiments, the temperature of the substrate is about 110° C. In certain embodiments, the temperature of the substrate is in the range of about −20° C. to about 110° C. In certain embodiments, the temperature of the substrate is in the range of about 0° C. to about 80° C. In certain embodiments, the temperature of the substrate is in the range of about 20° C. to about 70° C. In certain embodiments, the temperature of the substrate is in the range of about 40° C. to about 60° C.

In iPECVD, the speed at which the substrate is moved through the reactor, via a moveable stage, can be varied. In certain embodiments, the speed of the moveable stage is between about 10 mm/min and about 100 mm/min. In certain embodiments, the speed of the moveable stage is between about 15 mm/min and about 80 mm/min. In certain embodiments, the speed of the moveable stage is between about 20 mm/min and about 60 mm/min. In certain embodiments, the speed of the moveable stage is about 10 mm/min, about 20 mm/min, about 30 mm/min, about 40 mm/min, about 50 mm/min, about 60 mm/min, about 70 mm/min, about 80 mm/min, about 90 mm/min or about 100 mm/min.

In certain embodiments, the substrate is silicon wafer, glass slides, poly(ethylene terephthalate) (PET) rolls, Melinex®, polyethylenenaphthalate (PEN) rolls, Teonex®, kapton rolls, paper rolls, polydimethylsiloxane rolls, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Goretex®, Marlex®, expanded polytetrafluoroethylene (e-PTFE), low density polyethylene (LDPE), high density polyethylene (HDPE), or polypropylene (PP).

In certain embodiments, the rate of polymer deposition of the first layer is between about 1 micron/minute and about 100 nm/minute. In certain embodiments, the rate of polymer deposition of the first layer is between about 10 micron/minute and about 100 nm/minute. In certain embodiments, the rate of polymer deposition of the first layer is between about 100 micron/minute and about 100 nm/minute. In certain embodiments, the rate of polymer deposition of the first layer is between about 1 nm/minute and about 100 nm/minute. In certain embodiments, the rate of polymer deposition of the first layer is between about 10 nm/minute and about 100 nm/minute. In certain embodiments, the rate of polymer deposition of the first layer is between about 20 nm/minute and about 90 nm/minute. In certain embodiments, rate of polymer deposition of the first layer is about 10 micron/minute, about 20 micron/minute, about 30 micron/minute, about 40 micron/minute, about 50 micron/minute, about 60 micron/minute, about 70 micron/minute, about 80 micron/minute, about 90 micron/minute, or about 100 micron/minute. In certain embodiments, rate of polymer deposition of the first layer is about 200 micron/minute, about 300 micron/minute, about 400 micron/minute, about 500 micron/minute, about 600 micron/minute, about 700 micron/minute, about 800 micron/minute, about 900 micron/minute, or about 1 nm/minute. In certain embodiments, rate of polymer deposition of the first layer is about 2 nm/minute, about 3 nm/minute, about 4 nm/minute, about 5 nm/minute, about 6 nm/minute, about 7 nm/minute, about 8 nm/minute, about 9 nm/minute, about 10 nm/minute, about 11 nm/minute, about 12 nm/minute, about 13 nm/minute, about 14 nm/minute, about 15 nm/minute, about 16 nm/minute, about 17 nm/minute, about 18 nm/minute, about 19 nm/minute, or about 20 nm/minute. In certain embodiments, rate of polymer deposition of the first layer is about 21 nm/minute, about 22 nm/minute, about 23 nm/minute, about 24 nm/minute, about 25 nm/minute, about 26 nm/minute, about 27 nm/minute, about 28 nm/minute, about 29 nm/minute, or about 30 nm/minute. In certain embodiments, the rate of polymer deposition of the first layer is about 32 nm/minute, about 34 nm/minute, about 36 nm/minute, about 38 nm/minute, about 40 nm/minute, about 42 nm/minute, about 44 nm/minute, about 46 nm/minute, about 48 nm/minute, or about 50 nm/minute. In certain embodiments, the rate of polymer deposition of the first layer is about 55 nm/minute, about 60 nm/minute, about 65 nm/minute, about 70 nm/minute, about 75 nm/minute, about 80 nm/minute, about 85 nm/minute, about 90 nm/minute, about 95 nm/minute, or about 100 nm/minute.

In certain embodiments, the rate of polymer deposition for the second layer is about 1 micron/minute. In certain embodiments, the rate of polymer deposition of the second layer is between about 1 micron/minute and about 100 nm/minute. In certain embodiments, the rate of polymer deposition of the second layer is between about 10 micron/minute and about 100 nm/minute. In certain embodiments, the rate of polymer deposition of the second layer is between about 100 micron/minute and about 100 nm/minute. In certain embodiments, the rate of polymer deposition of the second layer is between about 1 nm/minute and about 100 nm/minute. In certain embodiments, the rate of polymer deposition of the second layer is between about 10 nm/minute and about 100 nm/minute. In certain embodiments, the rate of polymer deposition of the second layer is between about 20 nm/minute and about 90 nm/minute. In certain embodiments, rate of polymer deposition of the second layer is about 10 micron/minute, about 20 micron/minute, about 30 micron/minute, about 40 micron/minute, about 50 micron/minute, about 60 micron/minute, about 70 micron/minute, about 80 micron/minute, about 90 micron/minute, or about 100 micron/minute. In certain embodiments, rate of polymer deposition of the second layer is about 200 micron/minute, about 300 micron/minute, about 400 micron/minute, about 500 micron/minute, about 600 micron/minute, about 700 micron/minute, about 800 micron/minute, about 900 micron/minute, or about 1 nm/minute. In certain embodiments, rate of polymer deposition of the second layer is about 2 nm/minute, about 3 nm/minute, about 4 nm/minute, about 5 nm/minute, about 6 nm/minute, about 7 nm/minute, about 8 nm/minute, about 9 nm/minute, about 10 nm/minute, about 11 nm/minute, about 12 nm/minute, about 13 nm/minute, about 14 nm/minute, about 15 nm/minute, about 16 nm/minute, about 17 nm/minute, about 18 nm/minute, about 19 nm/minute, or about 20 nm/minute. In certain embodiments, rate of polymer deposition of the second layer is about 21 nm/minute, about 22 nm/minute, about 23 nm/minute, about 24 nm/minute, about 25 nm/minute, about 26 nm/minute, about 27 nm/minute, about 28 nm/minute, about 29 nm/minute, or about 30 nm/minute. In certain embodiments, the rate of polymer deposition of the second layer is about 32 nm/minute, about 34 nm/minute, about 36 nm/minute, about 38 nm/minute, about 40 nm/minute, about 42 nm/minute, about 44 nm/minute, about 46 nm/minute, about 48 nm/minute, or about 50 nm/minute. In certain embodiments, the rate of polymer deposition of the second layer is about 55 nm/minute, about 60 nm/minute, about 65 nm/minute, about 70 nm/minute, about 75 nm/minute, about 80 nm/minute, about 85 nm/minute, about 90 nm/minute, about 95 nm/minute, or about 100 nm/minute.

An auxiliary gas may be used with the monomer source gases to facilitate the growth process. The auxiliary gas may comprise one or more gases, such as carrier gases, inert gases, reducing gases, dilution gases, oxidizing gases, or combinations thereof, for example. Some examples of auxiliary gases are oxygen, nitrogen, argon, hydrogen, water, ozone, helium, and ammonia.

The flow rate of auxiliary gases can be varied in the iPECVD method. In certain embodiments, the flow rate of the first auxiliary gas is in the range of about 1 sccm to about 1000 sccm. In certain embodiments, the flow rate of the first auxiliary gas is in the range of about 5 sccm to about 750 sccm. In certain embodiments, the flow rate of the first auxiliary gas is in the range of about 10 sccm to about 600 sccm. In certain embodiments, the flow rate of the first auxiliary gas is in the range of about 25 sccm to about 500 sccm. In certain embodiments, the flow rate of the first auxiliary gas is in the range of about 50 sccm to about 400 sccm. In certain embodiments, the flow rate of the first auxiliary gas is about 9 sccm, about 8 sccm, about 7 sccm, about 6 sccm, about 5 sccm, about 4 sccm, about 3 sccm, about 2 sccm, or about 1 sccm. In certain embodiments, the flow rate of the first auxiliary gas is about 10 sccm, about 20 sccm, about 30 sccm, about 40 sccm, about 50 sccm, about 60 sccm, about 70 sccm, about 80 sccm, about 90 sccm, or about 100 sccm. In certain embodiments, the flow rate of the first auxiliary gas is about 200 sccm, about 300 sccm, about 400 sccm, about 500 sccm, about 600 sccm, about 700 sccm, about 800 sccm, about 900 sccm, or about 1000 sccm.

In certain embodiments, the flow rate of the second auxiliary gas is in the range of about 1 sccm to about 1000 sccm. In certain embodiments, the flow rate of the second auxiliary gas is in the range of about 5 sccm to about 750 sccm. In certain embodiments, the flow rate of the second auxiliary gas is in the range of about 10 sccm to about 600 sccm. In certain embodiments, the flow rate of the second auxiliary gas is in the range of about 25 sccm to about 500 sccm. In certain embodiments, the flow rate of the second auxiliary gas is in the range of about 50 sccm to about 400 sccm. In certain embodiments, the flow rate of the second auxiliary gas is about 9 sccm, about 8 sccm, about 7 sccm, about 6 sccm, about 5 sccm, about 4 sccm, about 3 sccm, about 2 sccm, or about 1 sccm. In certain embodiments, the flow rate of the second auxiliary gas is about 10 sccm, about 20 sccm, about 30 sccm, about 40 sccm, about 50 sccm, about 60 sccm, about 70 sccm, about 80 sccm, about 90 sccm, or about 100 sccm. In certain embodiments, the flow rate of the second auxiliary gas is about 200 sccm, about 300 sccm, about 400 sccm, about 500 sccm, about 600 secm, about 700 sccm, about 800 sccm, about 900 sccm, or about 1000 sccm.

In certain embodiments, the flow rate of the third auxiliary gas is in the range of about 1 sccm to about 1000 sccm. In certain embodiments, the flow rate of the third auxiliary gas is in the range of about 5 sccm to about 750 sccm. In certain embodiments, the flow rate of the third auxiliary gas is in the range of about 10 sccm to about 600 sccm. In certain embodiments, the flow rate of the third auxiliary gas is in the range of about 25 sccm to about 500 sccm. In certain embodiments, the flow rate of the third auxiliary gas is in the range of about 50 sccm to about 400 sccm. In certain embodiments, the flow rate of the third auxiliary gas is about 9 sccm, about 8 sccm, about 7 sccm, about 6 sccm, about 5 sccm, about 4 sccm, about 3 sccm, about 2 sccm, or about 1 sccm. In certain embodiments, the flow rate of the third auxiliary gas is about 10 sccm, about 20 sccm, about 30 sccm, about 40 sccm, about 50 sccm, about 60 sccm, about 70 sccm, about 80 sccm, about 90 sccm, or about 100 sccm. In certain embodiments, the flow rate of the third auxiliary gas is about 200 sccm, about 300 sccm, about 400 sccm, about 500 sccm, about 600 sccm, about 700 sccm, about 800 sccm, about 900 sccm, or about 1000 sccm.

The growth time or "residence time" depends in part on the desired thickness of the polymer film, with longer growth times producing a thicker film. The growth time may range from about ten seconds to many hours, but more typically from about ten minutes to several hours.

The power can be varied in the iPECVD method. In certain embodiments, the first power is in the range of about 10 W to about 1000 W. In certain embodiments, the first power is in the range of about 10 W to about 900 W. In certain embodiments, the first power is in the range of about 10 W to about 800 W. In certain embodiments, the first power is in the range of about 10 W to about 700 W. In certain embodiments, the first power is in the range of about 10 W to about 600 W. In certain embodiments, the first power is in the range of about 10 W to about 500 W. In certain embodiments, the first power is in the range of about 10 W to about 400 W. In certain embodiments, the first power is in the range of about 10 W to about 300 W. In certain embodiments, the first power is in the range of about 10 W to about 200 W. In certain embodiments, the first power is in the range of about 10 W to about 100 W. In certain embodiments, the first power is in the range of about 25 W to about 75 W. In certain embodiments, the first power is about 10 W, about 20 W, about 30 W, about 40 W, about 50 W, about 60 W, about 70 W, about 80 W, about 90 W, and about 100 W. In certain embodiments, the first power is about 200 W, about 250 W, about 300 W, about 350 W, about 400 W, about 450 W, about 500 W, about 550 W, about 600 W, about 650 W, about 700 W, about 750 W, about 800 W, about 850 W, about 900 W, about 950 W, or about 1000 W.

In certain embodiments, the second power is in the range of about 10 W to about 1000 W. In certain embodiments, the second power is in the range of about 100 W to about 1000 W. In certain embodiments, the second power is in the range of about 200 W to about 1000 W. In certain embodiments, the second power is in the range of about 300 W to about 1000 W. In certain embodiments, the second power is in the range of about 400 W to about 1000 W. In certain embodiments, the second power is in the range of about 500 W to about 1000 W. In certain embodiments, the second power is in the range of about 600 W to about 1000 W. In certain embodiments, the second power is in the range of about 700 W to about 1000 W. In certain embodiments, the second power is in the range of about 800 W to about 1000 W. In certain embodiments, the second power is in the range of about 900 W to about 1000 W. In certain embodiments, the second power is in the range of about 25 W to about 75 W. In certain embodiments, the second power is about 10 W, about 20 W, about 30 W, about 40 W, about 50 W, about 60 W, about 70 W, about 80 W, about 90 W, and about 100 W. In certain embodiments, the second power is about 200 W, about 250 W, about 300 W, about 350 W, about 400 W, about 450 W, about 500 W, about 550 W, about 600 W, about 650

W, about 700 W, about 750 W, about 800 W, about 850 W, about 900 W, about 950 W, or about 1000 W.

Excitation frequencies can be varied in the iPECVD method. In certain embodiments, the excitation frequency can be in the range of about 1 kHz to about 5 GHz. In certain embodiments, the excitation frequency can be in the range of about 50 kHz to about 1 GHz. In certain embodiments, the excitation frequency can be in the range of about 100 kHz to about 500 MHz. In certain embodiments, the excitation frequency can be in the range of about 250 kHz to about 250 MHz. In certain embodiments, the excitation frequency can be in the range of about 500 kHz to about 100 MHz. In certain embodiments, the excitation frequency can be in the range of about 750 kHz to about 1 MHz. In certain embodiments, the excitation frequency is about 1 kHz, about 2 kHz, about 3 kHz, about 4 kHz, about 5 kHz, about 6 kHz, about 7 kHz, about 8 kHz, about 9 kHz or about 10 kHz. In certain embodiments, the excitation frequency is about 10 kHz, about 20 kHz, about 30 kHz, about 40 kHz, about 50 kHz, about 60 kHz, about 70 kHz, about 80 kHz, about 90 kHz or about 100 kHz. In certain embodiments, the excitation frequency is about 200 kHz, about 300 kHz, about 400 kHz, about 500 kHz, about 600 kHz, about 700 kHz, about 800 kHz, or about 900 kHz. In certain embodiments, the excitation frequency is about 1 MHz, about 2 MHz, about 3 MHz, about 4 MHz, about 5 MHz, about 6 MHz, about 7 MHz, about 8 MHz, or about 9 MHz. In certain embodiments, the excitation frequency is about 10 MHz, about 20 MHz, about 30 MHz, about 40 MHz, about 50 MHz, about 60 MHz, about 70 MHz, about 80 MHz, or about 90 MHz. In certain embodiments, the excitation frequency is about 100 MHz, about 200 MHz, about 300 MHz, about 400 MHz, about 500 MHz, about 600 MHz, about 700 MHz, about 800 MHz, or about 900 MHz. In certain embodiments, the excitation frequency is about 1 GHz, about 2 GHz, about 3 GHz, about 4 GHz, or about 5 GHz.

In iPECVD duty cycles can be varied. In certain embodiments, the duty cycle can be in the range of about 5% to about 95%. In certain embodiments, the duty cycle can be in the range of about 5% to about 80%. In certain embodiments, the duty cycle can be in the range of about 10% to about 60%. In certain embodiments, the duty cycle can be in the range of about 15% to about 40%. In certain embodiments, the duty cycle can be in the range of about 20% to about 30%. In certain embodiments, the duty cycle is about 5%, about 6%, about 7%, about 8%, about 9%, or about 10%. In certain embodiments, the duty cycle is about 15%, about 20%, about 25%, about 30%, about 35%, about 40%, about 45%, about 50%, or about 55%. In certain embodiments, the duty cycle is about 60%, about 65%, about 70%, about 75%, about 80%, about 85%, about 90%, about 95%, or 100%.

In certain embodiments, the time the discharge is active, $t_{ON}$, can be in the range of about 1 ns to about 10 s. In certain embodiments, the time the discharge is active, $t_{ON}$, can be in the range of about 500 ns to about 8 s. In certain embodiments, the time the discharge is active, $t_{ON}$, can be in the range of about 1 s to about 6 s. In certain embodiments, the time the discharge is active, $t_{ON}$, can be in the range of about 500 ρs to about 4 s. In certain embodiments, the time the discharge is active, $t_{ON}$, can be in the range of about 1 ms to about 2 s. In certain embodiments, the time the discharge is active, $t_{ON}$, can be in the range of about 500 ms to about 1 s. In certain embodiments, the time the discharge is active, $t_{ON}$, is about 1 ns, about 2 ns, about 3 ns, about 4 ns, about 5 ns, about 6 ns, about 7 ns, about 8 ns, about 9 ns, or about 10 ns. In certain embodiments, the time the discharge is active, $t_{ON}$, is about 20 ns, about 30 ns, about 40 ns, about 50 ns, about 60 ns, about 70 ns, about 80 ns, about 90 ns, or about 100 ns. In certain embodiments, the time the discharge is active, $t_{ON}$, is about 200 ns, about 300 ns, about 400 ns, about 500 ns, about 600 ns, about 700 ns, about 800 ns, or about 900 ns. In certain embodiments, the time the discharge is active, $t_{ON}$, is about 1 μs, about 2 μs, about 3 μs, about 4 μs, about 5 μs, about 6 μs, about 7 μs, about 8 μs, about 9 μs, or about 10 μs. In certain embodiments, the time the discharge is active, $t_{ON}$, is about 20 is, about 30 μs, about 40 μs, about 50 μs, about 60 s, about 70 μs, about 80 μs, about 90 μs, or about 100 μs. In certain embodiments, the time the discharge is active, $t_{ON}$, is about 200 μs, about 300 μs, about 400 μs, about 500 μs, about 600 μs, about 700 μs, about 800 μs, or about 900 μs. In certain embodiments, the time the discharge is active, $t_{ON}$, is about 1 ms, about 2 ms, about 3 ms, about 4 ms, about 5 ms, about 6 ms, about 7 ms, about 8 ms, about 9 ms, or about 10 ms. In certain embodiments, the time the discharge is active, $t_{ON}$, is about 20 ms, about 30 ms, about 40 ms, about 50 ms, about 60 ms, about 70 ms, about 80 ms, about 90 ms, or about 100 ms. In certain embodiments, the time the discharge is active, $t_{ON}$, is about 200 ms, about 300 ms, about 400 ms, about 500 ms, about 600 ms, about 700 ms, about 800 ms, or about 900 ms. In certain embodiments, the time the discharge is active, $t_{ON}$, is about 1 s, about 2 s, about 3 s, about 4 s, about 5 s, about 6 s, about 7 s, about 8 s, about 9 s, or about 10 s.

In certain embodiments, the present invention relates to an aforementioned method, wherein the coating comprises less than about ten inorganic layers; and the coating comprises less than about ten organic layers. In certain embodiments, the present invention relates to an aforementioned method, wherein the coating comprises less than about five inorganic layers; and the coating comprises less than about five organic layers. In certain embodiments, the present invention relates to an aforementioned method, wherein the coating comprises between five and ten inorganic layers; and the coating comprises between five and ten organic layers. In certain embodiments, the present invention relates to an aforementioned method, wherein the coating comprises between one and five organic layers. In certain embodiments, the present invention relates to an aforementioned method, wherein the coating comprises between one and five inorganic layers. In certain embodiments, the present invention relates to an aforementioned method, wherein the coating comprises, one, two, three, four, or five inorganic layers. In certain embodiments, the present invention relates to an aforementioned method, wherein the coating comprises, one, two, three, four, or five organic layers.

In certain embodiments, the inorganic layer can have a thickness in the range of about 10 nm to about 500 nm. In certain embodiments, the inorganic layer can have a thickness in the range of about 20 nm to about 400 nm. In certain embodiments, the inorganic layer can have a thickness in the range of about 30 nm to about 300 nm. In certain embodiments, the inorganic layer can have a thickness in the range of about 40 nm to about 200 nm. In certain embodiments, the inorganic layer can have a thickness in the range of about 50 nm to about 100 nm. In certain embodiments, the inorganic layer can have a thickness of about 10 nm, about 20 nm, about 30 nm, about 40 nm, about 50 nm, about 60 nm, about 70 nm, about 80 nm, about 90 nm, or about 100 nm. In certain embodiments, the inorganic layer can have a thickness of about 200 nm, about 250 nm, about 300 nm, about 350 nm, about 400 nm, about 450 nm, or about 500 nm.

In certain embodiments, the organic layer can have a thickness in the range of about 100 nm to about 2 tam. In certain embodiments, the organic layer can have a thickness in the range of about 500 nm to about 1.5 μm. In certain embodiments, the organic layer can have a thickness in the range of about 800 nm to about 1.25 μm. In certain embodiments, the organic layer can have a thickness of about 100 nm, about 200 nm, about 300 nm, about 400 nm, about 500 nm, about 600 nm, about 700 nm, about 800 nm, or about 900 nm. In certain embodiments, the organic layer can have a thickness of about 1 μm, about 1.1 μm, about 1.2 μm, about 1.3 μm, about 1.4 μm, about 1.5 μm, about 1.6 μm, about 1.7 μm, about 1.8 μm, about 1.9 μm, or about 2 μm.

In certain embodiments, the inorganic layer can have a % transmittance (wavelengths: 400-800 nm) in the range of about 70% to 100%. In certain embodiments, the inorganic layer can have a % transmittance (wavelengths: 400-800 nm) in the range of about 80% to 100%. In certain embodiments, the inorganic layer can have a % transmittance (wavelengths: 400-800 nm) in the range of about 90% to 100%. In certain embodiments, the inorganic layer can have a % transmittance (wavelengths: 400-800 nm) of about 70%, about 80%, about 90%, or 100%.

In certain embodiments, the organic layer can have a % transmittance (wavelengths: 400-800 nm) in the range of about 70% to 100%. In certain embodiments, the organic layer can have a % transmittance (wavelengths: 400-800 nm) in the range of about 80% to 100%. In certain embodiments, the organic layer can have a % transmittance (wavelengths: 400-800 nm) in the range of about 90% to 100%. In certain embodiments, the organic layer can have a % transmittance (wavelengths: 400-800 nm) of about 70%, about 80%, about 90%, or 100%.

In certain embodiments, the inorganic layer can have a water vapor transmission rate of less than 5 g $m^{-2}$ $d^{-1}$. In certain embodiments, the inorganic layer can have a water vapor transmission rate of less than 1 g $m^{-2}$ $d^{-1}$. In certain embodiments, the inorganic layer can have a water vapor transmission rate of less than $5*10^{-1}$ g $m^{-2}$ $d^{-1}$. In certain embodiments, the inorganic layer can have a water vapor transmission rate of less than $10^{-1}$ g $m^{-2}$ $d^{-1}$. In certain embodiments, the inorganic layer can have a water vapor transmission rate of less than $5*10^{-2}$ g $m^{-2}$ $d^{-1}$. In certain embodiments, the inorganic layer can have a water vapor transmission rate of less than $10^{-2}$ g $m^{-2}$ $d^{-1}$. In certain embodiments, the inorganic layer can have a water vapor transmission rate of less than $5*10^{-3}$ g $m^{2}$ $d^{-1}$. In certain embodiments, the inorganic layer can have a water vapor transmission rate of less than $10^{-3}$ g $m^{-2}$ $d^{-1}$. In certain embodiments, the inorganic layer can have a water vapor transmission rate of less than $5*10^{-4}$ g $m^{-2}$ $d^{-1}$. In certain embodiments, the inorganic layer can have a water vapor transmission rate of less than $10^{-4}$ g $m^{-2}$ $d^{-1}$.

In certain embodiments, the organic layer can have a water vapor transmission rate of less than 5 g $m^{-2}d^{-1}$. In certain embodiments, the organic layer can have a water vapor transmission rate of less than 1 g $m^{-2}$ $d^{-1}$. In certain embodiments, the organic layer can have a water vapor transmission rate of less than $5*10^{-1}$ g $m^{-2}$ $d^{-1}$. In certain embodiments, the organic layer can have a water vapor transmission rate of less than $10^{-1}$ g $m^{-2}$ $d^{-1}$. In certain embodiments, the organic layer can have a water vapor transmission rate of less than $5*10^{-2}$ g $m^{2}$ $d^{-1}$. In certain embodiments, the organic layer can have a water vapor transmission rate of less than $10^{-2}$ g-2 $d^{-1}$. In certain embodiments, the organic layer can have a water vapor transmission rate of less than $5*10^{-3}$ g $m^{-2}$ $d^{-1}$. In certain embodiments, the organic layer can have a water vapor transmission rate of less than $10^{-3}$ g $m^{-2}$ $d^{-1}$. In certain embodiments, the organic layer can have a water vapor transmission rate of less than $5*10^{-4}$ g $m^{-2}$ $d^{-1}$. In certain embodiments, the organic layer can have a water vapor transmission rate of less than $10^{-4}$ g $m^{2}$ $d^{-1}$.

In certain embodiments, the inorganic layer can have hardness in the range of about 1 GPa to about 20 GPa. In certain embodiments, the inorganic layer can have hardness in the range of about 5 GPa to about 15 GPa. In certain embodiments, the inorganic layer can have hardness in the range of about 10 GPa to about 15 GPa. In certain embodiments, the inorganic layer can have hardness of about 1 GPa, about 2 GPa, about 3 GPa, about 4 GPa, about 5 GPa, about 6 GPa, about 7 GPa, about 8 GPa, or about 9 GPa. In certain embodiments, the inorganic layer can have hardness of about 10 GPa, about 11 GPa, about 12 GPa, about 13 GPa, about 14 GPa, about 15 GPa, about 16 GPa, about 17 GPa, about 18 GPa, about 19 GPa, or about 20 GPa.

In certain embodiments, the organic layer can have hardness in the range of about 1 GPa to about 10 GPa. In certain embodiments, the organic layer can have hardness in the range of about 2 GPa to about 8 GPa. In certain embodiments, the organic layer can have hardness in the range of about 4 GPa to about 6 GPa. In certain embodiments, the organic layer can have hardness of about 1 GPa, about 2 GPa, about 3 GPa, about 4 GPa, about 5 GPa, about 6 GPa, about 7 GPa, about 8 GPa, about 9 GPa, or about 10 GPa.

In certain embodiments, the inorganic layer can have an elastic modulus in the range of about 1 GPa to about 100 GPa. In certain embodiments, the inorganic layer can have an elastic modulus in the range of about 10 GPa to about 90 GPa. In certain embodiments, the inorganic layer can have an elastic modulus in the range of about 20 GPa to about 80 GPa. In certain embodiments, the inorganic layer can have an elastic modulus of about 1 GPa, about 2 GPa, about 3 GPa, about 4 GPa, about 5 GPa, about 6 GPa, about 7 GPa, about 8 GPa, or about 9 GPa. In certain embodiments, the inorganic layer can have an elastic modulus of about 10 GPa, about 20 GPa, about 30 GPa, about 40 GPa, about 50 GPa, about 60 GPa, about 70 GPa, about 80 GPa, about 90 GPa, or about 100 GPa.

In certain embodiments, the organic layer can have an elastic modulus in the range of about 1 GPa to about 20 GPa. In certain embodiments, the organic layer can have an elastic modulus in the range of about 5 GPa to about 15 GPa. In certain embodiments, the organic layer can have an elastic modulus of about 1 GPa, about 2 GPa, about 3 GPa, about 4 GPa, about 5 GPa, about 6 GPa, about 7 GPa, about 8 GPa, about 9 GPa, or about 10 GPa. In certain embodiments, the organic layer can have an elastic modulus of about 11 GPa, about 12 GPa, about 13 GPa, about 14 GPa, about 15 GPa, about 16 GPa, about 17 GPa, about 18 GPa, about 19 GPa, or about 20 GPa.

One aspect of the inventions relates to a $SiO_2$-like (inorganic) layer deposited by PECVD using a MW plasma source (2.54 GHz) in high fragmentation regime (950 W) using the monomer tetravinylpentamethyltrisiloxane (TVTSO, Gelest, flow rate 4.8 sccm) strongly diluted in argon (50 sccm) and oxygen (400 sccm). The deposition takes place within a chamber pressure about 150 mTorr on a heated substrate (60° C.) at a rate about 70 nm/s. This layer is used predominantly in barrier applications.

One aspect of the invention relates to a $SiO_xC_yH_z$ layer deposited by iPECVD. The labile peroxide bonds of the initiator molecules (tert-butyl peroxide, TBPO, Sigma Aldrich, flow rate 6 sccm) are broken by gentle plasma at very low fragmentation regime (50 W) and the monomer molecules are provided to the chamber at a flow rate about 4.8 sccm. The substrate temperature is kept at 60° C. These layers are used alone and in barrier applications.

EXEMPLIFICATION

Example 1

One aspect of the invention is the use of organosilicon monomers, such as 1,3,5-trivinyl-1,1,3,5,5-pentamethyl-trisiloxane (TVTSO), to form multilayer coatings using iPECVD. The use of a linear monomer without $(Si—O)_n$ rings is favorable when densely packed polymeric chains are desired. For this purpose, we studied both standard plasma-free iCVD and a variation of iCVD: the initiated PECVD (iPECVD), trying to reproduce the iCVD reaction steps but using a gentle plasma discharge to break the initiator (instead of a hot filament) and slightly activate the monomer molecules.

In one embodiment, a microwave (MW) discharge was employed. The ion energy distribution function was analyzed previously for both RF and MW plasmas. (P. Reinke et al., *J. Appt. Phys.* 1995, 78, 4855). It was demonstrated that the maximum ion energy in the RF mode is more than twice as large as in the MW mode. Therefore MW plasma sccms to be even more suitable in order to achieve a quasi-selective fragmentation only of the labile peroxide bond of the initiator.

The effect of the substrate temperature and of the initiator flow rate on the deposition rate and on the chemistry of the coatings were studied in order to show some more insights into the iPECVD polymerization mechanism and to show differences and similarities with the iCVD process. Furthermore, the deposition from modulated discharge has been investigated as a tool to further reduce the monomer fragmentation.

The depositions were carried out in a 0.16 $m^3$ (PLASMAtech model V-160GK-RT). The setup of the reactor chamber is shown elsewhere. (M. Gupta, and K. K. Gleason, *Thin Solid Films,* 2006, 515, 1579). The reactor was pumped by a mechanical Fomblin pump (Leybold, Trivac) and the pressure was monitored with a MKS capacitive gauge. A vertical 35 cm by 43 cm stainless steel baffled heat exchanger was placed in front of the plasma power source to serve as chilling/heating sample holder. The distance between the microwave (MW) plasma power source (Fricke und Mallah, Model BVD 19, frequency 2.45 GHz, max power-1200 W, both continuous and pulse mode operation possible) and the heat exchanger was 5 cm. The radius of the MW plasma electrode was 15 cm.

The monomer and initiator gases were uniformly distributed across the entire width of the substrate using a distributor tube that was 20 cm long and has holes with a diameter of a fraction of a millimeter and spaced 3 cm. The 1,3,5-trivinyl-1,1,3,5,5-pentamethyltrisiloxane (TVTSO) monomer (95%, Gelest, Inc.) and the tert-butyl peroxide (TBPO) initiator (98%, Aldrich) were used without further purification. The monomer was heated to 80° C. and fed into the chamber through a heated line at a flow rate of 4.8 sccm. The initiator was kept at room temperature and fed into the chamber through another line. The labile peroxide bond of the initiator was broken by a gentle MW plasma source kept at 50 W over the 706 $cm^2$ substrate area. The initiator flow rate was varied between 0 and 30 sccm in order to study the effect of the initiator flow rate on the chemistry and the deposition rate. The reactor pressure was kept constant at 320 mTorr. To investigate the dependence of the kinetics on the substrate temperature the heat exchanger settings were varied to achieve a stage temperature for the substrate between 15 and 60° C. The substrates used for the deposition were silicon wafer and plastic substrate polyethylene terephthalate (PET, ST4). The sample surface was examined by optical microscopy (Zeiss, Model AxioSkop 2 MAT), to identify the presence of defects such as delamination, pinholes, and cracks.

Chemical characterization of the films was performed by Fourier transform infrared (FT-IR) spectroscopy through a Nexus 870 FTIR, Thermo Nicolet spectrometer equipped with a DTGS-TEC detector in transmission mode. The spectra were acquired from 4000 to 400 $cm^{-1}$ with a resolution of 4 $cm^{-1}$ repeating for 256 scans. The spectrum of a bare Si wafer was used as the background. In order to minimize the effects of water vapor and carbon dioxide absorption, the spectrometer was purged with nitrogen for 15 min between each measurement. To investigate the monomer structure retention, the C—H bending band (1300-1220 $cm^{-1}$) a non-linear least-squares regression was performed using two Gaussian components using the "Fit multi-peaks" procedure of OriginLab software.

The film thicknesses were measured by ex-situ variable angle spectroscopy ellipsometry (VASE, JA Woollam M-2000). The measurements were done at three different angles (65°, 70° and 75°) in the wavelength range of 200-1000 nm. The applied optical model consisted of three components: the silicon substrate, the native $SiO_2$ layer of 1.7 nm and the film bulk layer. The bulk components were modeled by the Cauchy function with Urbach tail. The model also incorporated possible thickness heterogeneity within the sampled area.

Elemental analysis was done using X-ray photoelectron spectroscopy (XPS). The XPS spectra were obtained using a SSX-100 X-probe (Surface Science Instruments) spectrometer equipped with a monochromatized Al $K^{\alpha}$ source, operated at 1486.8 eV. Survey scans were conducted at an X-ray incident angle of 55° with penetration depths of −10 nm. During the XPS analysis, the sample charge was compensated by a 1 eV electron beam at high neutralization current by means of a Flood Gun. The pass energy was 150 V for survey scans and 50 V for high-resolution scans. Pressure during analysis was kept under $2\times10^{-9}$ Torr. A 1 mm diameter beam was used in the analysis. CasaXPS software was used to fit the high-resolution spectra and the FWHM constraints were set at 2 eV. Samples were stored under vacuum overnight prior to analysis.

Initiated PECVD was used for the formation of organosilicon polymers with enhanced monomer structure retention compared to a conventional plasma deposition and faster deposition rate if compared to conventional iCVD processes from organosilicon monomer. The process is driven by the fragmentation of an initiator through a gentle plasma discharge (plasma power density of 0.07 $W/cm^2$), instead of using a hot filament molecule, as in iCVD processes. We demonstrate that a quasi-selective fragmentation of the initiator molecule occurs, while the monomer molecule remains substantially preserved. In fact, the C/Si ratio calculated from XPS data on the polymer was 4.3, close to the 3.7 C/Si elemental ratio of the monomer molecule.

The deposition of smoothening organic layers was demonstrated by depositing the coating on the top of a microsphere (1 μm in diameter) monolayer deposited over silicon wafers. As the thickness of the coating increases, so does the degree of planarization-(DP), both local (DLP) and global (DGP). The DLP increases much faster than the DGP. For example, when the coating was 1 μm-thick the DLP was already 99%, but to reach a DGP of 99%, a 1.8 μm-thick coating was needed.

The higher density of the inorganic layer and the smoothness and planarization properties of the organic layer make this approach particularly promising for the deposition of effective multilayer barrier coatings. Large-area deposition of low temperature inorganic CVD was driven on top of organic functionalized surfaces for barrier applications. The organic layers were deposited by initiated PECVD in very low fragmentation conditions, while the inorganic coatings were deposited by initiated PECVD at high power and high oxygen dilution.

The effectiveness of the deposition of smoothening organic layers was demonstrated by depositing an organic coating on the top of a monolayer of microspheres (1 μm in diameter) deposited over silicon wafers. Both cross sectional SEM and AFM demonstrated that when the organic layer was 1.8 μm thick the microspheres were completely covered and smoothened (RMS roughness<10 nm). The resultant degree of global planarization was 99%.

The silica-like layers were deposited using a MW plasma source (2.54 GHz) at high oxygen dilution in high fragmentation regime. The organosilicon layers were deposited through initiated PECVD (iPECVD), feeding the discharge with the monomer and the tert-butyl peroxide (TBPO) as initiator under low fragmentation conditions.

The chemical investigation was performed by Fourier transform infrared spectroscopy (FTIR) and X-ray photoelectron spectroscopy (XPS). Film thicknesses and refractive indices were measured ex-situ after deposition using variable angle spectroscopic ellipsometry (VASE, JA Woollam M-2000).

For the deposition of microspheres, all chemicals were used as received without further purification. Two solutions of monodisperse polystyrene nanoparticles, 2.5 wt % (1 μm, 200 nm, 80 nm nominal diameter, Polysciences) in water, were mixed 1:1 and 1:5 with a surfactant solution (Triton X-100:methanol/1:400 volume) (Fischer Scientific) and cast onto the silicon wafer substrate in discrete 2.0 μL droplets. The solvent was than evaporated by spin coating (Model WS-400E-6NPP-LITE, with a speed of 3000 rpm, a ramp of 1 s and a dwell time of 60 s). The solution 1:1 microsphere: surfactant was used to deposit a monolayer of microsphere; while the 1:5 solution was used to obtain a lower density of microsphere (around 1 microsphere over 100 $\mu m^2$ area).

To study the conformality of the iPECVD deposition process polymers were deposited on silicon substrates patterned with trenches supplied by Analog Devices. These trenches were 7 μm deep and 0.8 μm, 1.3 μm, 2.1 μm, and 5 μm wide, respectively.

Surface film morphology was investigated by Atomic Force Microscopy (AFM—Digital Instruments, D3100-1). Images were acquired in tapping mode using conical gold-coated silicon tips. Root mean square roughness was measured on 13×13 $\mu m^2$ surface areas.

Deposited trench wafers and coated microsphere samples were sputter-coated with 6 nm of gold (Denton Desk V), and SEM images were obtained by Scanning Electron Microscopy (Hitachi, TM 3000) with acceleration voltage of 15 kV.

Contact angles of the deposited films were measured using a goniometer equipped with an automated dispenser (Model 500, Rame-Hart). A 2 μL droplet of water was placed on the surface and the static angle was measured immediately. Angles values were averaged over five measurements.

The flexibility tests were carried out using a three point bending load scheme made of one fixed part holding the sample and one moveable part going back and forth. To test the flexibility, the sample was deposited on a PET substrate and bent 500 times at room temperature. The displacement from the center of the sample was about 5 mm and the estimated bending angle was about 25°.

Surface morphology and surface damage was examined before and after bending using Atomic Force Microscopy (AFM) and Scanning Electrons Microscopy (SEM), seeking surface cracks over the most stressed area during bending test. Surface investigation was also carried out using profilometer, moving a thin tip over the sample surface, perpendicularly to potential cracks direction.

Single layer mechanical properties such as Elastic Modulus (E) and Hardness (H), deposited on silicon substrate were measured using a nano indenter (from Nanovea) equipped with an Berkovich tip made of diamond (tree sided pyramid shape). The test was performed within the first 10% of layer thickness avoiding any silicon substrate effect. The hardness and elastic modulus were calculated by the software based on the load-displacement relation, applying load between 1 and 5 mN. The loading function consisted of four segments: the tip approaches the surface until it barely touches it (0.3 mN); the load is gradually applied via the tip to the surface at a loading rate twice the maximum rate (30 s loading curve); the tip maintains the maximum load between several seconds allowing the sample to creep and keep deforming, according to its visco-elasticity; the tip goes back up at the same velocity (30 s unloading curve). Measurements were repeated several times, moving the tip at least 0.2 mm between each indentation.

Scratch and friction single layer resistance were investigated using nanoscratching (from Nanovea), equipped with a conical tip and applying progressively a load about 2-3 mN along 1 mm. Stacks adherence was also investigated by nanoscratching, observing by microscope potential layer delamination along scratch.

Barrier film transparency was carried out using a UV-Visible spectrometer in the range of 200-800 nm, measuring the transmittance T (%).

Barrier performance such as water vapor transmission rate (WVTR) was performed using a custom-built electrical Ca-mirror testing apparatus at 65° C./85% R.H, measuring the Ca-film resistivity every 6 minutes via a 4 point probe.

Example 2—Global and Local Planarization of Surface Roughness Intro

The current methods adapts and combines features of two well established methods for CVD of organic layers, plasma enhancement (PECVD) and the specific use of an initiator species (iCVD). The novel, initiated plasma enhanced chemical vapor deposition (iPECVD) method achieves a far greater degree of planarization of flexible organic layer than either of its predecessors. Polystyrene microspheres serve as model defects and allow the degree of planarization to be quantitatively measured. Both cross-sectional scanning electron micrographs and atomic force micrographs demonstrate that when the iPECVD organic layer is 1.8 μm thick, the degree of global planarization is 99%. A model demonstrates that the planarization is achieved as a result of the coating viscosity and the surface tension. Finally, the water vapor barrier performance of a 20-nm-thick $SiO_x$ layer is two orders of magnitude improved when it is deposited on a planarized substrate.

By way of this example, a flexible planarizing layer is deposited by vacuum-based CVD techniques that can be easily implemented in the same reactor chamber used for the barrier layer deposition. The use of the same deposition chamber may allow the easier and cheaper roll-to-roll deposition, therefore developing vapor-based techniques to deposit planarizing layer is economically important. The similarity of the deposition methods for the planarizing and the barrier layer makes also these two processes perfectly compatible, without the need of hardening steps prior to the barrier layer deposition. The planarization is achieved by a single deposition process without the need of further reflow or post deposition treatments.

Deposition of Microspheres

All chemicals were used as received without further purification. Two solutions of monodisperse polystyrene microspheres, 2.5 wt % (1 μm, 200 nm, 80 nm nominal diameter, Polysciences) in water, were mixed 1:1 and 1:5 with a surfactant solution (Triton X-100:methanol/1:400 volume) (Fischer Scientific) and cast onto the silicon wafer substrate in discrete 2.0 μL droplets. The solvent was than evaporated by spin coating (Model WS-400 E-6NPP-LITE, with a speed of 3000 rpm, a ramp of 1 s, and a dwell time of 60 s). The solution 1:1 microsphere, surfactant was used to deposit a monolayer of microsphere; while the 1:5 solution was used to obtain a lower density of microspheres (around 1 microsphere over 169 $\mu m^2$ area).

iPECVD Film Deposition

The custom built iPECVD vacuum reactor configuration has previously been detailed. iPECVD deposition conditions were adopted from previously reported work. The monomer and initiator gases were uniformly distributed across the entire width of the substrate using a distributor tube that was 30 cm long and 1 cm in diameter with ten 1 mm holes. The 1,3,5-trivinyl-1,1,3,5,5-pentamethyltrisiloxane (TVTSO) monomer (95%, Gelest, Inc.) and the tert-butyl peroxide (TBPO) initiator (98%, Aldrich) were used without further purification. The monomer was heated to 80° C. and fed into the chamber through a heated line at a flow rate of 4.8 sccm. The initiator was kept at room temperature and fed into the chamber at a flow rate of 6 sccm. The labile peroxide bond of the initiator was broken by a gentle MW plasma source kept at 50 W over the 706 $cm^2$ substrate area. The reactor pressure was kept constant at 320 mTorr. To investigate the dependence of the plasma power on the planarization properties, the applied input power was varied between 50 and 500 W. To study the conformality of the iPECVD deposition process, we deposited also some polymers on silicon substrates patterned with trenches, supplied by Analog Devices. The trenches were 7 m deep and 0.8 μm, 1.3 m, 2.1 μm, and 5 μm wide, respectively.

Film Characterization

Film thicknesses were measured ex-situ after the deposition using variable angle spectroscopic ellipsometry (VASE, J A Woollam M-2000). For all samples, measurements were done at three different angles (65°, 70°, and 75°) in the wavelength range 200 nm to 1000 nm. A three-component optical model made of a silicon substrate, a native oxide layer, and a film bulk was used to describe the samples. The bulk components were modeled by the Cauchy function adding the Urbach tail for the absorption. The spot for the thickness measurement was taken far from the area of the sample where the microspheres were deposited.

Surface film morphology was investigated by Atomic Force Microscopy (AFM—Digital Instruments, D3100-1). Images were acquired in tapping mode using conical gold-coated silicon tips. Root—mean—square roughness was measured on 13×13 $\mu m^2$ surface areas.

Deposited trench wafers and coated microsphere samples were sputter-coated with 6 nm of gold (Denton Desk V), and images were obtained by Scanning Electron Microscopy (SEM, Hitachi, TM 3000) with acceleration voltage of 15 kV.

The barrier performances were tested for a 20-nm-thick $SiO_x$ layer when it was deposited over the bare poly(ethylene terephthalate) (PET, ST4) substrate and over the same PET substrate planarized by 1-μm-thick organosilicon layer. Water vapor transmission rates (WVTR) were measured on a 50 $cm^2$ sample area, at 25° C. and 85% of relative humidity (RH), in steady-state conditions using a MOCON Permatran-W. The $SiO_x$ layer was deposited sequentially in the same deposition chamber and with the same monomer as the organosilicon layer using a MW plasma at high input power (950 W), and high oxygen and argon dilution (400 and 50 sccm, respectively) while the TVTSO flow rate was kept constant at 4.8 sccm. The reactor pressure was 150 mTorr.

Results and Discussion

Very rough surfaces were intentionally created by spin coating a silicon wafer with microspheres with diameter of 1 μm in order to simulate the presence of dust, antiblocking, and filler particles on the substrate. These surfaces were than coated with an organosilicon polymer deposited by iPECVD using trivinyl-pentamethyl-trisiloxane (TVTSO) as monomer.

Figure 21:
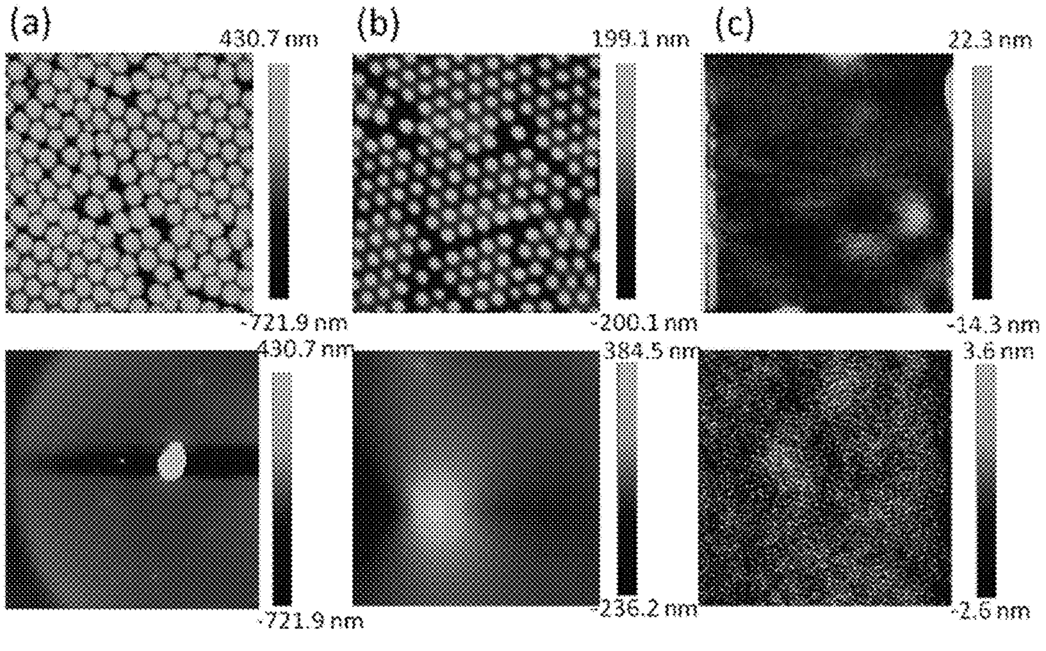
FIG. 21 depicts Atomic force micrographs (AFM) of the microspheres spin coated on the silicon substrate at high density (upper row) and at lower density (lower row). The first column (a) displays the uncoated microspheres, the second and the third columns have iPECVD organosilicon overlayers (b) 0.45 μm and (c) 1.8 μm thick, respectively.

FIG. 4 shows the cross sectional SEM images of the silicon wafer coated with the microspheres without and with a polymer deposited on them at different coating thicknesses. As the coating thickness increases the surface becomes smoother and smoother. AFM investigations (shown in FIG. 21) over substrate with high (top images) and low (bottom images) microsphere density allowed us to calculate the degree of planarization (DP) as in Equation (1) (above), where $h_f$ is the step height of the coating when deposited over a microsphere of initial height $h_i$ (as shown in FIG. 20).

As extensively demonstrated, DP depends on the particle size ($h_i$), the horizontal distance between the centers of two adjacent particles (L), by the layer thickness, H, and by the material properties of the layer. The DP calculated on the coating deposited over high density of microspheres (e.g., values of L comparable to the particle diameter) determines the degree of local planarization (DLP) (i.e., planarization over small area), while the calculations made over samples with low microsphere density (e.g., much larger values of L, corresponding to approximately 1 microsphere over a 13 m×13 μm area) gave the degree of global planarization (DGP). The DGP is likely to be the more important metric to consider for barrier applications, as the presence of dust or anti-blocking particles on the plastic substrates is typically at these relatively lower densities. FIG. 5 shows the calculated DP as a function of the coating thickness, H. Increasing the thickness of the coating causes the DP, both local and global, to increase. The DLP increases much faster than the DGP: when the coating is 1 μm-thick the DLP is already 99%. Global planarization was more difficult to achieve therefore a 1.8 μm-thick-coating is needed to reach the 99% DGP. Planarizing technologies have been extensively studied in the past for the integrated circuits, but such high degree of global planarization was difficult to achieve with polymeric coatings. A possible explanation for the planarization properties showed by the organosilicon polymer deposited by iPECVD might be related with the steps governing the film formation: the gas of the monomer vapor adsorbs on the substrate covering all of the substrate surface features. The adsorbed monomer film interacts then with the initiator radicals, which initiate the radical polymerization on the surface. This is in agreement with previous kinetic studied on the iCVD process, which demonstrated that the polymerization takes place on the surface, in fact it is governed by the parameter $P_M/P_{sat}$ (the ratio between the monomer partial pressure and the saturation pressure). The parameter $P_M/P_{sat}$ gives a quantification of the amount of monomer adsorbed on the surface. When the $P_M/P_{sat}$ is in the range 0.1-0.8, it is expected that a multilayer of adsorbed monomer is created on the surface. It is important to notice that $P_M/P_{sat}$ close to 1 imply the formation of a full-thickness liquid film on the surface because of the condensation of the monomer. The actual $P_M/P_{sat}$ used for this work was 0.2, as typically used in vapor-based processes.

FIG. 5(*b*) shows DP as a function of the particle distance (L) at each coating thickness. When two identical spheres touch, the center to center distance L equals the particle diameter which in this case is 1 μm. At this minimum experimentally achievable value of L, we will define DP as equal to the DPL. When L tends to infinity, DP is the DGP, as by definition. Although not physically realistic, when L tends to zero, FIG. 5(*b*) reveals that at this limit, DP should be 100%. Indeed, consider that L=0 μm means that the two particle centers are overlapped, therefore $h_f$=0 μm. Considering these constrains we built an empirical model of dependence of DP by the particle distance. The best fitting function is reported as Eq. (2)

$$DP(L)=DGP+(100-DGP)*e[(-L/h_i)*Oh] \quad (2)$$

with $h_i$ being the particle size (in this case 1 μm) and Oh the dimensionless Ohnesorge number, defined by Eq. (3)

$$Oh=\mu/[(\rho\sigma l)^{0.5}] \quad (3)$$

where μ is the film viscosity, σ is the surface tension, ρ is the density, and l a characteristic length scale. Larger Ohnesorge numbers indicate a greater influence of the viscosity. For a given coating thickness, planarization achieved by spin coating from liquid-phase is determined by the balance between three major forces acting on the coating during spinning: centrifugal force, capillary force, and viscous force. Centrifugal force is a conformal force tending to result in a uniform coating thickness. Capillary force is related to the coating surface tension. Surface tension causes leveling and viscous force balances the capillary and the centrifugal force. The Ohnesorge number has been added to Eq. (2) to take into account the balance between surface tension and the viscous force that acts on the adsorbed monomer layer and affects its planarization properties. Oh is often used in spray technology to model the atomization process: the conversion of a bulk smooth liquid surface into a dispersion of small droplets. The planarization process may be considered as the reverse of the atomization process.

Fitting the measured DP at different particle distances with the model of Eq. (2) resulted in Oh=3, for the all the three coating thicknesses, as expectable considering that changing the thickness both the viscosity and the surface tension of the film are supposed to remain constant.

Figure 22:
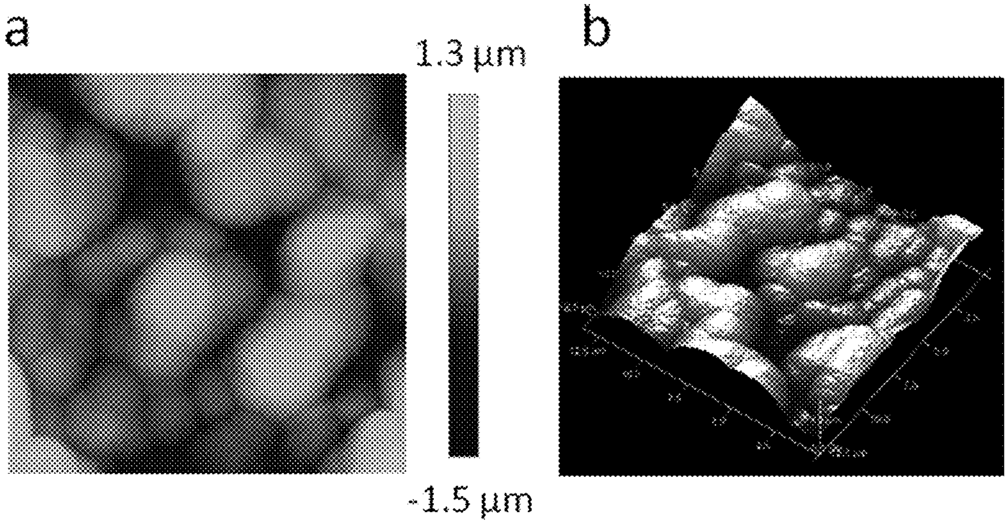
FIG. 22 depicts AFM images of the organosilicon coating deposited at higher power (500 W) onto a microsphere monolayer. The images are displayed both in 2-D (a) and 3-D (b) in order to appreciate the roughening effect of the coating deposited at 500 W over the microsphere monolayer.
Figure 23:
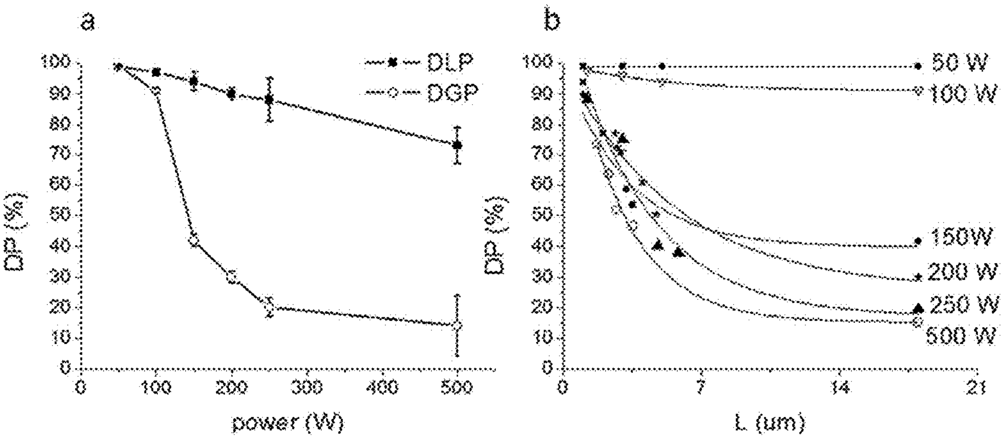
FIG. 23 depicts degree of planarization data plotted as a function of the input power (a) and of the microsphere distance, L, for the different input power conditions (b). The data in (b) were fitted with an exponential decay equation.

To further understand the effect of the deposition conditions on the planarization properties and on the steps governing the film formation, we performed some depositions on the microspheres using higher input power and keeping constant all the other deposition parameters. The final thickness of the coating was fixed at 1.8 μm. FIG. 22 shows two AFM images 2-D (a) and 3-D (b) for the coating deposited at 500 W over a monolayer of microspheres. The peak to valley height was 2976 nm, which is a much higher value than the original diameter of the microsphere (1000 nm). Apparently, at high power, the high features keep growing much faster than the low ones, therefore the roughness increases instead of decreasing as for the coating deposited at 50 W. This is typical of plasma processes in high ion bombardment conditions: since the surface is bombarded by active species that hit and bond, the highest features are more exposed than the valley and keep growing faster. FIG. 23(*a*) shows the DP variation as a function of the input power. Both DLP and DGP decrease when the input power increases. Particularly strong is the decrease in the global planarization performance with the power increase. The DGP drops from 90% to 41% when the power increases from 100 to 150 W. FIG. 23(*b*) shows DP exponential dependence as a function of the particle distance (L) for the coating deposited at the different power. In this case the Oh number increases from 3 to 5.5 when increasing the power, which may be related with an increase in the effect of the viscosity that adversely affects the planarization properties. This result suggests a change in the steps driving the film formation: at low input power the leveling effect of the surface tension in the adsorbed monomer layer dominates, similarly to what happens when the planarization is achieved by liquid-phase.

Therefore we can say that at low power the adsorbed monomer is in a liquid-like regime. At high input power the viscosity plays a greater role as typical of a plasma assisted deposition. Also it has been shown that films that provide long-range planarization have low viscosity, which allows them to flow over surface topography during deposition. In particular, they obtained planar films when the degree of dissociation in the gas phase and the amount of cross-linking in the film were minimized (i.e., at low power), hypothesizing that under these conditions, the deposited films is expected to have properties similar to those of the precursor gases.

Figure 24:
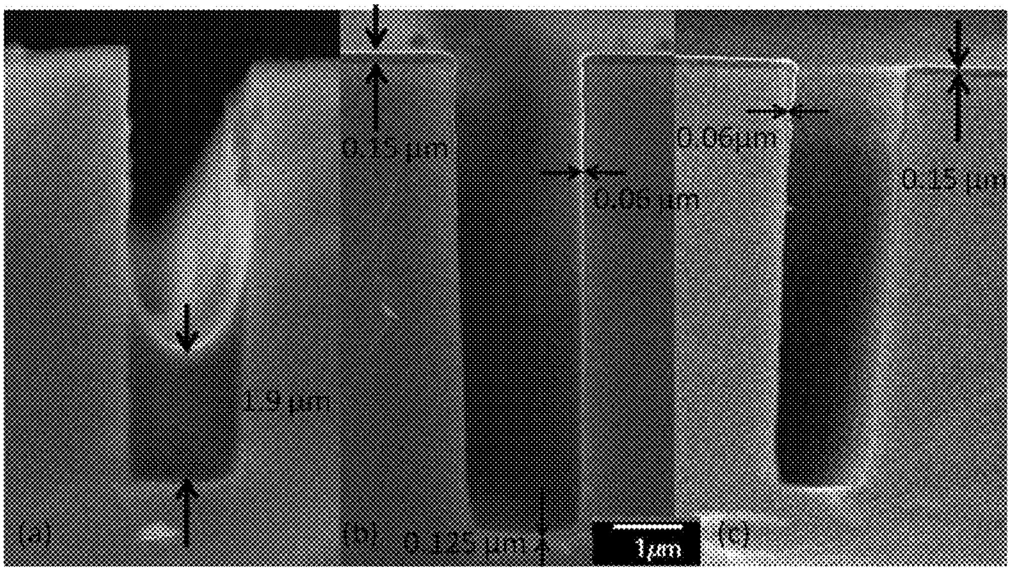
FIG. 24 depicts films deposited by iPECVD at (a) 50 W, (b) 250 W, and (c) 500 W. The meniscus shape of the 50 W film clearly shows the effects of surface tension, while the different profiles obtained at 250 W and 500 W suggest a change in the steps governing the deposition toward a more conventional PECVD glow discharge.

FIG. 24 reports the cross sectional SEM images taken for the coating deposited at 50 W, 250 W, and 500 W on trenches. The coating profiles obtained in these three cases are largely different. At 50 W the film has little or no coverage on the sidewalls but a thick deposition layer at the trench bottom with a meniscus-like shape. The meniscus formation was observed also for spin-coated film due to the effects of solvent and of the surface tension.

Generally a vapor-phase process, such as iCVD or PECVD, eliminates the effects of surface tension. The presence of the meniscus corroborates even more the hypothesis of a liquid-like regime in the iPECVD process at 50 W, dominated by the leveling effect of the surface tension (low Oh number). Increasing the power, the coating profile changes sensibly. It is almost uniform over the top, wall, and bottom of the trench when the coating is deposited at 250 W. Finally at 500 W the film exhibits high thickness at the top of the trench, which becomes thinner and thinner going from the wall to the bottom of the trench, resulting in poor step coverage. The step coverage is governed by the sticking probability of the reactive species to the surface. If the sticking probability is high the film growth at the top of the trenches is much faster than at the bottom, if the sticking probability is low, the species have time to diffuse resulting in better step coverage. For typical iCVD deposition conditions (i.e., plasma free iCVD), the monomers are near their saturation pressures and operating in this regime leads to high sticking probabilities for monomers; therefore under typical iCVD conditions the monomer sticking coefficient becomes less important in determining the step coverage, and the rate limiting step becomes the chemisorptions (adsorption and reaction with the monomer vinyl bonds) of the radicals. Higher values of radical sticking coefficient obtained for acrylate compared to methacrylate were related to the higher reactivity rates of the acrylate vinyl bonds compared to methacrylates or to the direct relation between the radical sticking coefficient and the surface vinyl bond concentration. Due to the low reactivity of the organosilicon vinyl bonds, it is reasonable to assume that the chemisorptions of the initiator radical is so low at 50 W that the monomer has the time to diffuse on the surface like a liquid layer and fulfill all the valley to minimize the surface energy. Increasing the plasma power, there are two possible effects that can contribute to the faster chemisorption of the radicals: (i) more initiator radicals are created, (ii) also the monomer molecules are fragmented, and therefore the polymerization does not take part anymore like a conventional radical polymerization of the monomer vinyl bond but following the fragmentation and recombination mechanisms of the plasma polymerization. As the power increases, the depletion of radicals inside the trench increases due to faster consumption at the opening of the trench, which thus results in deterioration of the step coverage.

Figure 25:
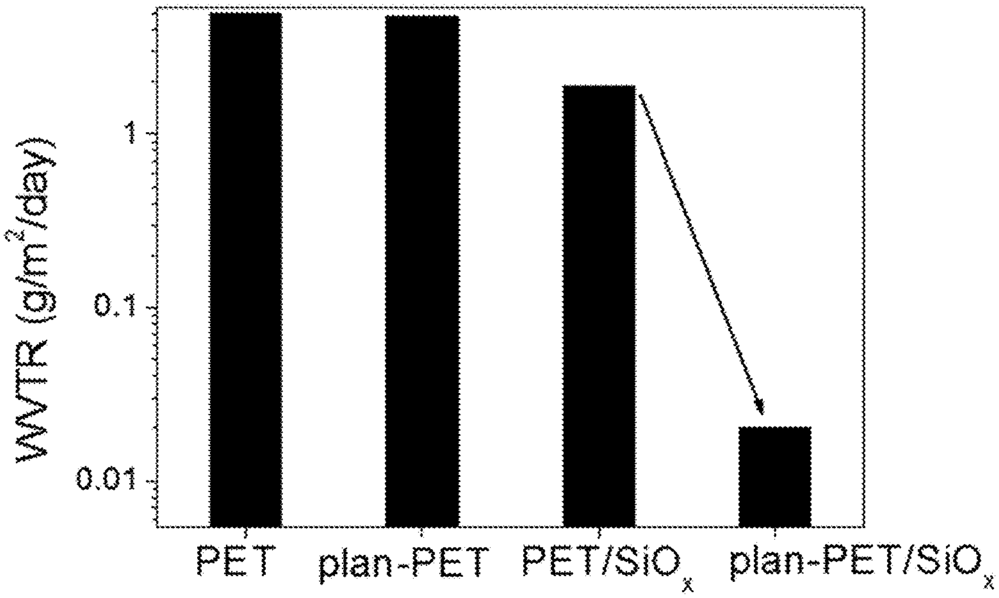
FIG. 25 depicts water vapor transmission rate (WVTR) measured at 25° C. and 85% relative humidity for the bare PET substrate, the PET substrate planarized with a 1-μm-thick organosilicon layer (plan-PET) and then 20-nm-thick $SiO_x$ layer deposited on the bare PET substrate and on the plan-PET. The organosilicon planarizing layer has no intrinsic barrier properties but allows us to obtain better barrier properties if deposited on the substrate prior to the deposition of the inorganic layer.

Finally, the usefulness of applying a planarizing organosilicon coating on the substrate surface was demonstrated on real barrier coatings. FIG. 25 shows the water vapor transmission rate (WVTR) measured at 25° C. and 85% RH for a 20-nm-thick $SiO_x$ layer deposited over the bare PET substrate and over the substrate planarized by 1-μm-thick organosilicon planarizing layer (plan-PET). Both the deposition processes of the SiOx and of the organosilicon layer were done from the same monomer sequentially in the same chamber without breaking vacuum. This represents a big economical advantage of the current approach over the Barix™ structure made of sputtered $AlO_x$ alternated with UV cured liquid acrylate monomer. The intrinsic nature of the sputtering process and of the deposition from liquid phase creates a poor adhesion between the inorganic and the organic layers since the interface between them is sharp and the layers are weakly bonded. In the current approach, instead, since the composition of the planarizing layer and of the inorganic barrier layer are similar and they are grown sequentially, the adhesion at the interface was excellent. The improvement in barrier performances is evident: for the $SiO_x$ layer deposited over the bare substrate the WVTR is 1.88 $g/m_2$/day. When the same layer is deposited over a planarized substrate (plan-PET), the WVTR becomes 0.02 $g/m_2$/day. The organosilicon planarizing layer has not intrinsic barrier properties (plan-PET has the same WVTR of bare PET) but allows us to obtain better barrier properties if it is deposited on the substrate prior to the deposition of the inorganic layer. The reason for such improvement is that when the $SiO_x$ layer is deposited on a microscopically flat surface, it contains less defects, therefore better barrier properties can be achieved, regardless of the very low thickness of the $SiO_x$ barrier layer (i.e., 20 nm). Two orders of magnitude barrier improvement compared to the bare substrate PET substrate is a very promising barrier value that has never been reported in literature from a 20 nm $SiO_x$ layer deposited by MW plasmas.

Conclusions iPECVD of a planarizing organosilicon layer. The smoothness and planarization properties of the organic layer are crucial for the deposition of multilayer barrier layer in order to fulfill the defect of the inorganic underlayer and offer a microscopically flat surface for the deposition of the successive inorganic layer.

The novelty of this contribution consists in the demonstration of good planarization properties by a single vapor-based process. Previously, the same properties were achieved only by liquid phase deposition and post-deposition treatments (i.e., etchback, reflow, and mechanical polishing). Vacuum-based processes are advantageous because they can be more easily implemented with the processes used to deposit semiconductors or barrier layers.

The planarizing properties of the organosilicon polymer deposited by iPECVD were investigated by monitoring the coating profile over microspheres (1 μm in diameter) used as model defects (e.g., presence of dust, antiblocking, and filler particles on the substrate). These surfaces were than coated with an organosilicon polymer at different coating thicknesses. We showed that a degree of planarization of 99% was achieved with a 1.8 μm-thick-coating deposited at 50 W, both locally and globally. Typically CVD polymers tend to follow more or less conformally the profile of non-planar surfaces, while iPECVD showed a completely different coating characteristic. The reason for such good planarization properties was hypothesized to be due to the low reactivity of the organosilicon vinyl bonds, therefore the monomer had the time to adsorb and diffuse on the surface as a liquid-like layer trying to minimize the surface tension. This hypothesis was confirmed by (i) a model proposed in this study to fit the DP data as a function of the particle distance, which demonstrated the importance of the surface tension at low input power and (ii) by the observation of a meniscus-shaped profile when the coating was deposited on microtrenches.

Finally, we demonstrate that the deposition process of the planarizing layer was perfectly compatible with the deposition of a barrier inorganic layer and that the presence of a planarizing layer deposited over the substrate decreased the WVTR of a 20-nm-thick $SiO_x$ layer of two orders of magnitude, due to the creation of a microscopically flat surface on which better barrier layer can be deposited. Such barrier improvement with a 20-nm-thick $SiO_x$ layer deposited by MW plasma has never been reported before in literature.

The smooth organic surface obtained by iPECVD may also find application as low reflectivity optical coatings, as a support layer for fabricating devices using processes that do not tolerate surface roughness, or for surface in contact with living cells, to control cell adhesion and differentiation.

Example 3—Enhancement of Monomer Structure Retention

Overview

The objective of this study was to extend the library of organosilicon monomer available for iCVD to include 1,3,5-trivinyl-1,1,3,5,5-pentamethyltrisiloxane (TVTSO). The use of a linear monomer without $(Si—O)_n$ rings is favorable when densely packed polymeric chains are desired.

For this purpose, we studied both standard plasma-free iCVD and a variation of iCVD: the initiated PECVD (iPECVD), trying to reproduce the iCVD reaction steps but using a gentle plasma discharge to break the initiator (instead of a hot filament) and slightly activate the monomer molecules. Previously, iPECVD was demonstrated to deposit poly-2-hydroxyethyl methacrylate (pHEMA) with results comparable with pHEMA deposited by iCVD: high functional group retention due to the low plasma power (20 W) involved and to the initiator chemistry. For the iPECVD of pHEMA, a capacitively coupled radio frequency plasma (RF) was used. In this example, a microwave (MW) discharge will be employed. MW plasma sccms to be more suitable than RF in order to achieve a quasi-selective fragmentation only of the labile peroxide bond of the initiator. The objective of the initiator addition to the plasma feed is to obtain a relatively high deposition rate in extremely low monomer fragmentation regime. For this purposes, the input power used was 50 W over a large area electrode (706 $cm^2$), resulting in a plasma density as low as 0.07 W $cm^{-2}$ while conventional PECVD processes in low fragmentation regime generally work at plasma density higher than 0.2 W $cm^{-2}$.

The effect of the substrate temperature and of the initiator flow rate on the deposition rate and on the chemistry of the coatings are studied in order to show some more insights into the iPECVD polymerization mechanism and to show differences and similarities with the iCVD process. Furthermore the deposition from modulated discharge has been investigated as a tool for further reduce the monomer fragmentation. iPECVD polymerization has been demonstrated also on plastic substrate to show that this process is compatible and effective also on "real-world" substrate.

Experimental

The depositions were carried out in a 0.16 $m^3$ (PLASMAtech model V-160GK-RT). The setup of the reactor chamber is shown elsewhere. The reactor was pumped by a mechanical Fomblinpump (Leybold, Trivac) and the pressure was monitored with a MKS capacitive gauge. A vertical 35 cm by 43 cm stainless steel baffled heat exchanger was placed in front of the plasma power source to serve as ciller/heating sample holder. The distance between the microwave (MW) plasma power source (Fricke und Mallah, Model BVD 19, frequency 2.45 GHz, max power-1 200 W, both continuous and pulse mode operation possible) and the heat exchanger was 5 cm. The radius of the MW plasma electrode was 15 cm.

The monomer and initiator gases were uniformly distributed across the entire width of the substrate using a distributor tube that was 30 cm long and 1 cm in diameter with ten 1 mm holes. The 1,3,5-trivinyl-1,1,3,5,5-pentamethyltrisiloxane (TVTSO) monomer (95%, Gelest, Inc.) and the tert-butyl peroxide (TBPO) initiator (98%, Aldrich) were used without further purification. The monomer was heated to 80° C. and fed into the chamber through a heated line at flow rates in the range 4.8-18 sccm. The initiator was kept at room temperature and fed into the chamber through another line. The initiator flow rate was varied between 0 and 30 sccm in order to study the effect of the initiator flow rate on the chemistry and the deposition rate. The labile peroxide bond of the initiator was broken by a gentle MW plasma source kept at 50 W over the 706 $cm^2$ substrate area. The reactor pressure was kept constant at 320 mTorr. To investigate the dependence of the kinetics on the substrate temperature the heat exchanger settings were varied to achieve a stage temperature for the substrate between 15 and 60° C. The substrates used for the deposition were silicon wafer and plastic substrate polyethylene terephthalate (PET, ST4). The sample surface was examined by optical microscopy (Zeiss, Model AxioSkop 2 MAT), to identify the presence of defects such as delamination, pinholes or cracks. The effect of pulsing the plasma power applied during the iPECVD process was also evaluated. The discharge was periodically switched on ($t_{ON}$) and off ($t_{OFF}$). The period ($t_{ON}$+$t_{OFF}$) was kept on 100 ms, while the duty cycle (percent of ON time) was varied in the 10-100% range. The deposition conditions are summarized in FIG. 26. All the samples were grown up to a thickness of 200±10 nm.

Chemical characterization of the films was performed by Fourier transform infrared (FT-IR) spectroscopy through a Nexus 870 FTIR, Thermo Nicolet spectrometer equipped with a DTGS-TEC detector in transmission mode. The spectra were acquired from 4 000 to 400 $cm^{-1}$ with a resolution of 4 $cm^{-1}$ repeating 256 scans. The spectrum of a bare Si wafer was used as the background. In order to minimize the effects of water vapor and carbon dioxide absorption, the spectrometer was purged with nitrogen for 15 min between each measurement. The vertical scale is always the same for all the IR spectra reported. To investigate the monomer structure retention, the C—H bending band (1 300-1 220 $cm^{-1}$) a non-linear least-squares regression was performed using two Gaussian components using the "Fit multi-peaks" procedure of OriginLab software.

The film thicknesses were measured by ex situ variable angle spectroscopy ellipsometry (VASE, JA Woollam M-2000). The measurements were done at three different angles (65°, 70° and 75°) in the wavelength range of 200-1 000 nm. The applied optical model consisted of three components: the silicon substrate, the native $SiO_2$ layer of 1.7 nm and the film bulk layer. The bulk components were modeled by the Cauchy function with Urbach tail. The model also incorporated possible thickness inhomogeneity within the sampled area.

The elemental analysis was done using X-ray photoelectron spectroscopy (XPS). The XPS spectra were obtained using a SSX-100 X-probe (Surface Science Instruments) spectrometer equipped with a monochromatized Al $K^{\alpha}$ source, operated at 1 486.8 eV. Survey scans were conducted at an X-ray incident angle of 558 with penetration depths of ~10 nm. During the XPS analysis, the sample charge was compensated by a 1 eV electron beam at high neutralization current by means of a Flood Gun. The pass energy was 150 V for survey scans and 50 V for high-resolution scans. Pressure during analysis was kept under $2\times10^{-9}$ Torr. A 1 mm diameter beam was used in the analysis. CasaXPS software was used to fit the high-resolution spectra and the FWHM constraints were set at 2 eV. Samples were stored under vacuum overnight prior to analysis.

Results and Discussion

Figures 26, 27:
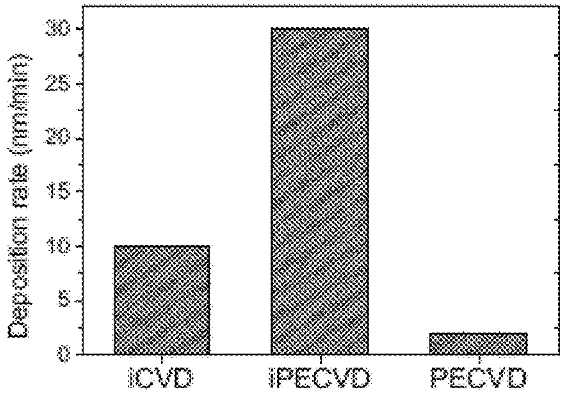
FIG. 26 tabulates deposition conditions for the iPECVD process used to study the effect of the TBPO flow rate.
FIG. 27 depicts deposition rate of the plasma-free iCVD process, of the iPECVD and of the conventional PECVD process without initiator using the same deposition conditions as reported in FIG. 28.
Figures 28, 29:
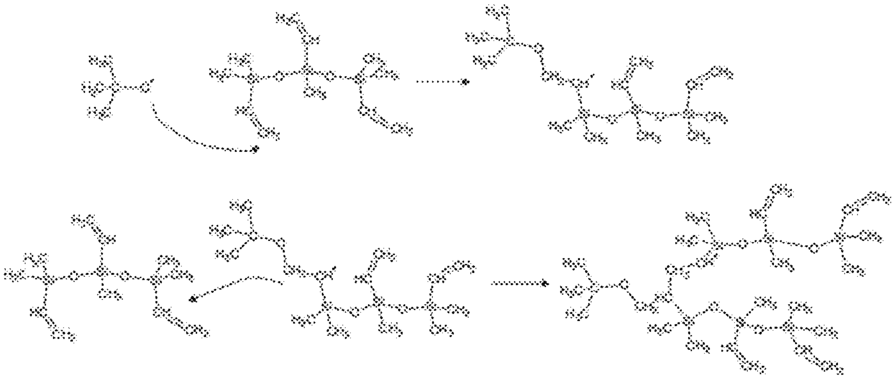
FIG. 28 depicts deposition conditions for the plasma-free iCVD process, the iPECVD and the conventional PECVD without initiator.
FIG. 29 depicts an initiation mechanism in conventional plasma-free iCVD.

Herein, two polymerization techniques are compared, iCVD and iPECVD, for the formation of organosilicon polymer using the TVTSO as monomer. FIG. 27 shows a bar graph of the deposition rates obtained by iCVD, iPECVD and PECVD in the condition reported in FIG. 28. iCVD from TVTSO resulted in low deposition rates (10 nm $min^{-1}$) and after aging the sample in air, some pinholes appeared on the surface. We hypothesize that as in related studies, the visible pinholes are created by the outgassing of unreacted monomer molecules (M) or the reaction product of the initiator fragment with monomer (IM*) from the surface. iPECVD with a input plasma power as low as 0.07 W $cm^{-2}$ resulted in higher deposition rates (30 nm $min^{-1}$) and no pinhole formation was observed after aging. Conventional PECVD without any initiator at the same input plasma power density was also tested in order to investigate the effect of the initiator addition to the plasma feed. Without initiator a deposition rate as low as 2.5 nm $min^{-1}$ was obtained. The marked increase in the deposition rate registered in correspondence of the initiator addition (iPECVD), clearly shows that the very low plasma power density involved in the process is not enough to create active monomer radicals when the plasma is fed exclusively with the monomer while it is enough to break the labile peroxide bond of the TBPO molecule. It is also very important pointing out that the plasma discharge fed only with TBPO (in the conditions 6 sccm TBPO, 320 mTorr, 50 W) did not result in any deposition. The very low plasma power density used in iPECVD is probably not enough to create active sites (e.g., dangling bonds) on the substrate surface, therefore the TBPO radicals when hit the surface more likely desorb back into the vapor phase. We hypothesize the initiator fragmentation to be the initiation step in iPECVD, similarly to the conventional plasma-free iCVD whose initiation mechanism is reported in FIG. 29. Polymerization is initiated when the TBPO radicals attack the vinyl bonds of the monomer species adsorbed onto the surface, creating monomer radicals and the latter propagate resulting in a polymer layer. Further evidences of the quasi-selective fragmentation of the TBPO will be given in the following paragraphs. Though low, the deposition rate of the initiator-free PECVD process is not null, meaning that a slight fragmentation of the monomer molecules still occurs and few active radicals are created by direct fragmentation of the monomer molecules. This is probably responsible for the higher deposition rate achievable by iPECVD than with plasma-free iCVD and for the absence of unreacted monomer molecules or lightweight fragment which create pinholes after aging of the sample.

Figure 30:
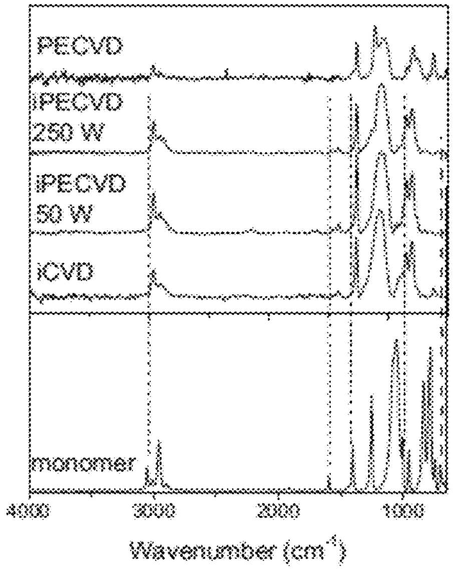
FIG. 30 depicts FT-IR spectra of TVTSO monomer and polymers deposited by plasma-free iCVD, iPECVD at 50 and 250 W, and conventional PECVD without initiator using the deposition conditions reported in FIG. 28. The dashed lines indicate the absorptions of the vinyl groups. The polymer spectra are normalized by the measured thickness.

FIG. 30 shows the infrared spectra of the organosilicon polymers obtained by iCVD, initiator-free PECVD, and iPECVD at two input power 50 and 250 W. The spectrum of the pure liquid monomer is included for comparison. A list of the most intense signal absorptions is given in FIG. 31. The comparison between the three polymer spectra clearly shows that the absorption of the vinyl bonds present in the monomer spectrum (e.g., sp2-C—H stretching band at 3 050-2 950 $cm^{-1}$, sp2-C—H bending at 1 400 $cm^{-1}$ or wagging mode of Si—CH═$CH_2$ groups at 950 and 700 $cm^{-1}$), and evidenced with dashed lines in FIG. 30, are sensibly reduced in the polymer spectra, while all the other absorptions are mostly preserved. As previously demonstrated, in plasma free iCVD, the polymerization undergoes through the saturation of the vinyl bonds of the monomer, creating polymeric methylene chains. New bands, related with methylene bridges, appear, in fact, in the iCVD and iPECVD polymer spectra (e.g., sp3-C—H stretching band at 2 950-2 856 $cm^{-1}$, sp3-C—H asymmetric stretch at 1 456 $cm^{-1}$). The spectrum of the sample deposited by iPECVD at 250 W clearly shows a lower organic content than the coating deposited at 50 W, demonstrating that low power is essential to retain the monomer structure. The conventional PECVD of the pure monomer resulted in loss of carbon in fact the bands at 3 000 and 1 260 $cm^{-1}$ have small intensities. A strong component at 1 105 $cm^{-1}$ assignable to C—O bonds overlaps the Si—O band at 1 060 $cm^{-1}$. It is evident that in this case the monomer structure has been fragmented and then recombined in a polymer layer as typical in PECVD.

Figures 33, 34:
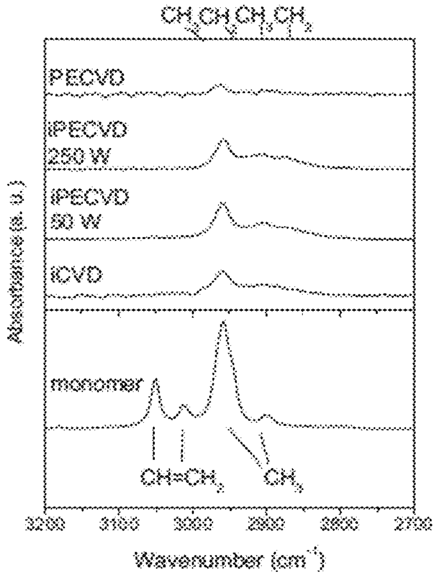
FIG. 33 depicts enlargement of the C—H stretching area (3 100-2 700 $cm^{-1}$) of the FT-IR spectra of TVTSO monomer and polymers deposited by iCVD, iPECVD at 50 and 250 W, and conventional PECVD.
FIG. 34 depicts XPS C/Si and O/Si elemental ratios for the polymers deposited by plasma free iCVD, iPECVD at 50 and 250 W. The elemental ratios calculated considering the monomer formula are also included for comparison.

The absence of the vinyl bond absorptions and the presence of bands due to methylene groups appears evident from the expansion of the C—H stretching FT-IR region between 3 200 and 2 700 cm-1 in FIG. 33. The band related to sp3-CH bonds between 3 000 and 2 800 $cm^{-1}$ is more intense in the case of the iPECVD polymer deposited at 50 W compared to the iCVD polymer which indicates a larger amount of saturated chains. The C—H stretching band of the sample deposited at 250 W is broader than the band of the polymer deposited at lower power indicating that probably at this power the polymerization process undergoes through the monomer fragmentation and surface recombination typical of the plasma discharge. Finally the band of the polymer deposited by conventional PECVD is much less intense than all the others meaning that conventional PECVD even at low power results in carbon loss to some extent.

XPS data confirms that the iPECVD polymer deposited at 50 W has high organic content. FIG. 34 shows the C/Si and the O/Si elemental ratio for the polymer deposited by plasma-free iCVD, and by iPECVD at 50 W and 250 W. The elemental ratios calculated considering the monomer structure are also included for comparison. The C/Si ratio calculated from XPS data for the iPECVD polymer deposited at 50 W is 4.3, close to the 4.7 C/Si elemental ratio of the iCVD polymer. The observed carbon-to-silicon ratios in these two polymers are higher than the one calculated considering the monomer formula (C/Si/¼3.7). Similarly, the oxygen-to-silicon ratio 1.1 is higher than 0.7 in the monomer. The high surface concentration of carbon and oxygen can be due to the initiation and termination reactions which result in the inclusion of tert-butoxy terminating groups in the polymer chains as well as to carbon contamination of the sample surface. The C/Si ratio for the coating deposited at 250 W is much lower than the one of the sample deposited by iPECVD at 50 W and it is also lower than the C/Si ratio in the monomer formula. This confirms that at high power the monomer fragmentation reactions and the ion bombardment typical of the plasma discharge take place, reducing the organic content of the coating.

Figure 35:
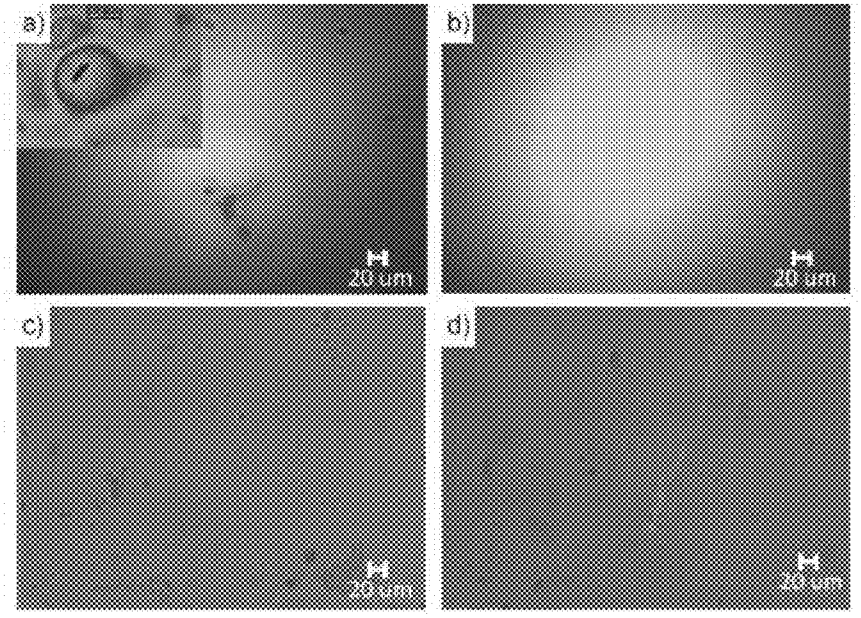
FIG. 35 depicts optical microscope images of the polymer surface when deposited on PET substrate. Labels (a) and (b) refer to the polymer deposited by iPECVD, in particular (a) shows the surface when no end-capping reaction occurs. Label (b) shows the surface after 30 s of end-capping with TBPO. The end-capping reduces the number of pinholes on the surface. Labels (c) and (d) are micrographs of the polymers deposited by iCVD without end-capping (a) and after 30 s end-capping (b). In this case also after end-capping some pinholes are still visible on the surface.

We performed the deposition of an organosilicon polymer also on plastic substrate to show that the iPECVD process is compatible with "real world" and flexible substrate. FIG. 35 shows the optical micrographs of TVTSO polymer deposited on PET by iPECVD and iCVD. The image 4a shows an irregular surface with a lot of pinholes whose enlarged image is also reported in the inset of FIG. 35*a*. Those pinholes are due to a not efficient heat transfer between the sample holder and the polymer substrate and therefore are due to the degassing of unreacted monomer molecules or short polymer chains after sample exposure to the atmosphere. To reduce the amount of unreacted monomer molecules and avoid the formation of pinholes for the outgassing we increased the end-capping reaction time by flowing just TBPO for the last 30 s of the deposition. The image of the polymer surface after the longer endcapping is reported in FIG. 35*b*. No pinholes can be observed in this case. Conventional iCVD resulted in polymers containing a lot of pinholes both without (FIG. 35*c*) and with (FIG. 35*d*) TBPO end-capping, demonstrating the difficulty to obtain a regular surface by iCVD from TVTSO.

Effect of the TBPO Flow Rate

The thermal decomposition of TBPO over a heated filament has been demonstrated to occur through two possible pathways depending on the filament temperature (FIG. 32).

Reaction of either initiator radical, tertbutoxy radical (product of reaction 1) or the methyl radical (product of reaction 2), with a vinyl bond of a monomer species such as TVTSO is the expected to be the first step of the polymerization process. In this first step, the initiator radical, either tertbutoxy or methyl, will be incorporated as an endgroup in the solid polymer film. The concentration of initiating radicals, will be the product of the concentration of the initiator, TBPO, with the degree of fragmentation by the corresponding pathway. Thus, a higher methyl group concentration in the film corresponds to a higher degree of initiator radical incorporation. To gain a better understanding of the initiator fragmentation as initiation step of the iPECVD processes, we performed some depositions changing the TBPO flow rate (set of experiments A as reported in FIG. 26). However, in a plasma process, changing total flow rate would also require a proportional change in power, W, so as to preserve a constant fragmentation efficiency per molecule. The latter can be quantified through the ratio W/F where F is the total flow rate of the plasma feed. However, W can only be varied over a small range in order to avoid the appearance of new reactive species produced from further monomer fragmentation. To compare polymers obtained with the same W/F ratio, we deposited a polymer in condition B as reported in FIG. 26.

Figure 36:
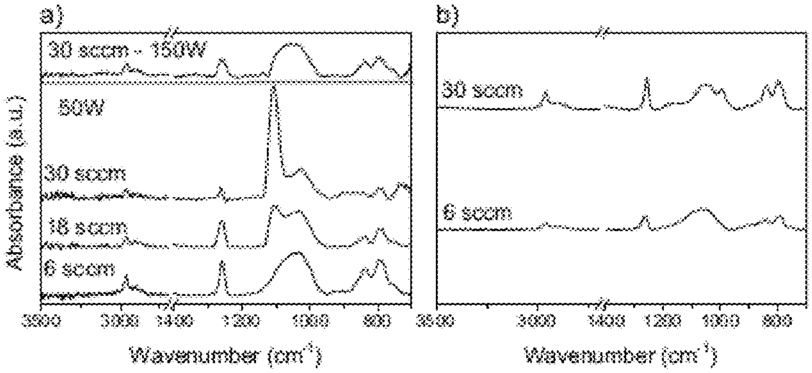
FIG. 36 depicts FT-IR spectra of the polymers deposited at different TBPO flow rates. Label (a) shows the spectra of the polymers deposited by iPECVD at 50 Watt TBPO flow rates of 6, 18 and 30 sccm and the spectrum of the polymer deposited at 150 W with TBPO flow rate of 30 sccm to compare the polymer structure keeping the ratio W/F constant. Label (b) shows the spectra of the polymers deposited by iCVD at the TBPO flow rate of 6 and 30 sccm. The spectra are all normalized by the measured thickness.

The FTIR spectra of the polymers deposited at different TBPO flow rates by iPECVD and iCVD are shown in FIG. 36. It is expectable that at higher initiator flow rate more initiator fragments would be included in the polymer structure. Both fragmentation pathways (reaction 1 and 2) would result in an increase of the methyl content in the polymer if more initiator fragments were included. Indeed this is what happens when depositing from conventional plasma-free iCVD. As can be seen from the spectra reported in FIG. 36*b*, at higher TBPO flow rate the polymer deposited by iCVD contains more intense $CH_3$ (3 000 and 1 260 $cm^{-1}$) and C—O (1 105 $cm^{-1}$) absorptions. The first three spectra of FIG. 36*a* are relative to the polymers deposited by iPECVD keeping the power constant and changing just the TBPO flow rate from 6 to 30 sccm. The absorption of the C—O bond at 1 105 $cm^{-1}$ grows in intensity with increasing initiator flow rate, while the methyl group concentration (around 3 000 $cm^{-1}$) decreases. XPS elemental analysis confirmed the decrease in the organic content for the film deposited at higher TBPO flow rate: the C/Si ratio goes from 4.3 to 3 when the TBPO flow rate goes from 6 to 30 sccm. From the lack of $CH_3$ adsorption (3 000 $cm^{-1}$) in the IR spectra and the decrease of the C/Si ratio in the XPS analysis of the polymers deposited by iPECVD it is evident that at high initiator flow rate the number of either $OC(CH_3)_3$ radicals and methyl ones embodied in the polymer matrix is very low. A possible explanation for this may be that since the TBPO makes up a significant fraction of the overall flow, F, increasing the initiator flow rate results in a lower initiator fragmentation efficacy (the W/F ratio decreases from 4.6 to 1.4 when the TBPO flow rate goes from 6 to 30 sccm). In this case the increase in the O—C bond IR absorption would be related to the reaction between uncapped surface radicals and the oxygen upon atmospheric exposure of the samples or to surface rearrangement.

The spectrum of the polymer deposited at 150 W with TBPO flow rate of 30 sccm shows that keeping the ratio W/F to 4.3 produces significant difference in the polymer structure. The organic content (C—H band around 3 000 $cm^{-1}$ and $Si(CH_3)_x$ band at 1 260 $cm^{-1}$) in this case is not as low as for the polymer deposited at 50 W with the same TBPO flow rate. Also the C—O band is not as intense as the corresponding polymer deposited at 50 W. However, it is worth noticing that the absorptions are broader in this case than the ones of the polymers deposited at 50 W from 6 sccm of TBPO, though the W/F is the same, indicating that as expected the higher power input resulted in enhanced fragmentation and recombination reactions. From these results, it is not immediately obvious which radical, t-butoxy or methyl, is actively initiating the polymerization in the iPECVD process. On the contrary, it is evident that t-butoxy radical are included in the polymer deposited by iCVD, even if the inclusion of also methyl radicals cannot be excluded.

Kinetics of the iPECVD Varying the Substrate Temperature

The following section is aimed to investigate if the iPECVD follow the same kinetic rules of the iCVD process. In iCVD it has been demonstrated that the deposition rate ($r_{dep}$) follows a second order dependency in respect to the adsorbed monomer concentration ($[M]_{ads}$) and first order respect to the radical concentration [I]:

$$r_{dep} \sim k_{dep}[I^-][M]_{ads}^2 \quad (4)$$

where $k_{dep}$ is the deposition rate constant. For high monomer flow rate the deposition rate depends only on the radical concentration and the deposition rate constant:

$$r_{dep} \sim k_{dep}[I^-] \quad (5)$$

where $k_{dep} \approx \exp(-E_a/kT_{sub})$. Considering the initiator decomposition reaction, characterized by a reaction rate constant:

$$I_2 \xrightarrow{k_{decomp}} I^-$$

the radical concentration is given by:

$$\frac{d[I]}{dt} \approx k_{decomp}[I_2] \quad (6)$$

where $[I_2]$ is the initiator concentration. In iCVD, $k_{decomp}$ depends on the filament temperature, while in iPECVD process the decomposition of the initiator (and therefore kdecomp) depends on the W/F ratio as demonstrated by the previous experiments increasing the TBPO flow rate.

By substituting $[I^-]$ taken from Equation (6) in Equation (5), the deposition rate becomes:

$$r_{dep} \sim \left(\exp\left(\frac{-E_a}{kT_{subs}}\right)\right) \cdot \{k_{decomp}[I_2]\} \quad (7)$$

Considering Equation (4), the dependence of the deposition rate by the substrate temperature can be studied keeping $[I_2]$ and $k_{decomp}$ constant.

Figure 37:
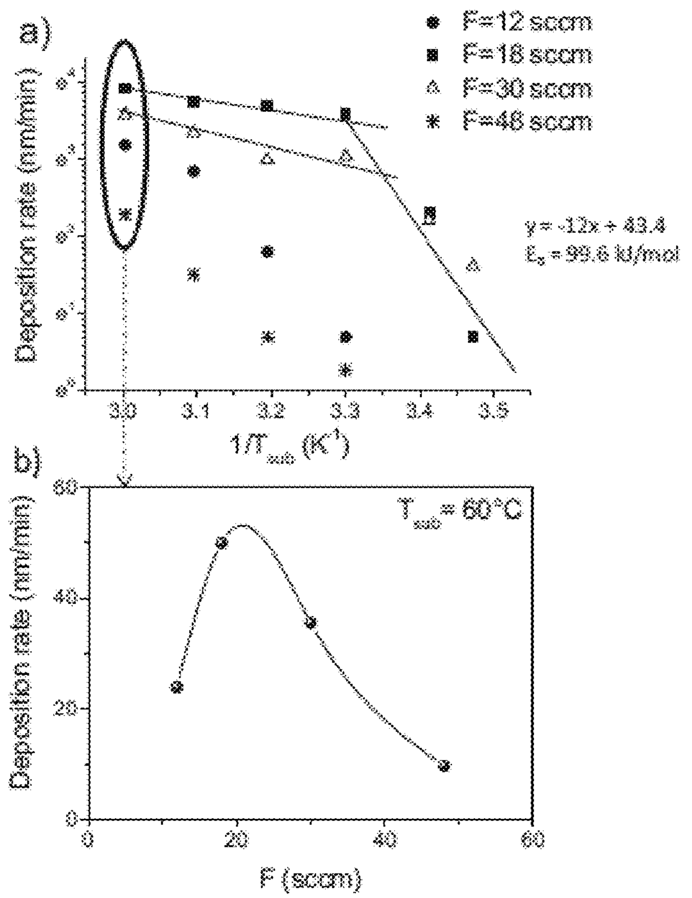
FIG. 37 depicts (a) Arrhenius plot of the deposition rate data as function of the substrate temperature for four different total flow rates (monomer+initiator) conditions C—F as reported in FIG. 26. (b) Deposition rate data as a function of the total flow rate.

The deposition conditions for this kinetic study are reported in FIG. 26 as set C—F. We used four different sets of conditions, for each of them [12] and W/F are constants. Since we want $r_{dep}$ to depend only on $T_{sub}$, the vapor concentration needs to be large enough to do not limit the kinetics and thus the Arrhenius plots for different flow rates should fall on the same curve. FIG. 37*a* reports the semilog plot of the deposition rate as a function of inverse substrate temperature according to the Arrhenius law at different total flow rates. Total flow rate (F) between 18 and 30 sccm fall on the same curve and the deposition rate increases strongly when the substrate temperature is between 15 and 30 OC. Using the least-squares linear regression to the data, an apparent activation energy of 99.6 kJ $mol^{-1}$ for the deposition is calculated from the slope of the regressed line. Increasing the substrate temperature, the quantity of monomer adsorbed on the surface decreases but the rate of the propagation reactions taking part on surface increases. This kind of behavior is referred as reaction kinetics limited regime. In this temperature range, the kinetics of the deposition is limited by the rate of the surface reactions. Therefore a positive apparent activation energy indicates that the rate limiting step for the iPECVD process is the slow kinetics of vinyl bond reaction rather than adsorption of the monomer on the surface. Similarly, a positive apparent activation energy of 53.8 kJ $mol^{-1}$ was detected for the iCVD polymerization of the HVDSO. A slightly higher apparent activation energy is expectable for the TVTSO polymerization because of the lower number of vinyl bonds in the monomer structure. Conventional iCVD from TVTSO in the same conditions resulted in activation energy of 44 kJ $mol^{-1}$. The fact that both iCVD and iPECVD show positive activation energy means that both processes are limited by the rate of the surface reactions. The activation energy calculated from iCVD is lower because of the thickness loss due to the degassing of unreacted molecules, which affected the deposition rate calculations.

However, slower rates are observed for F=12 and 48 sccm. At lower flow rates, the decrease in the deposition rates is due to a loading effect which is observed when the vapor supplied is insufficient to keep $[I_2]$ constant and thus the approximation that the deposition rate depends only on the substrate temperature is no longer valid. As the vapors travel from the feeding port to the substrate surface, a decrease in the concentration is observed due to the consumption of the vapors in film formation before they reach the substrate. At high F, the energy fragmentation efficacy per molecule (W/F) decreases resulting in a low fragmentation rate of the initiator molecule and therefore in a low initiation yield. FIG. 37*b* reports the deposition rate data as a function of the total flow rate at a fixed substrate temperature. The trend has a maximum at around F=18 sccm but then decreases for higher flow rates due to the decrease in initiator fragmentation efficacy.

Pulsed iPECVD

Figure 38:
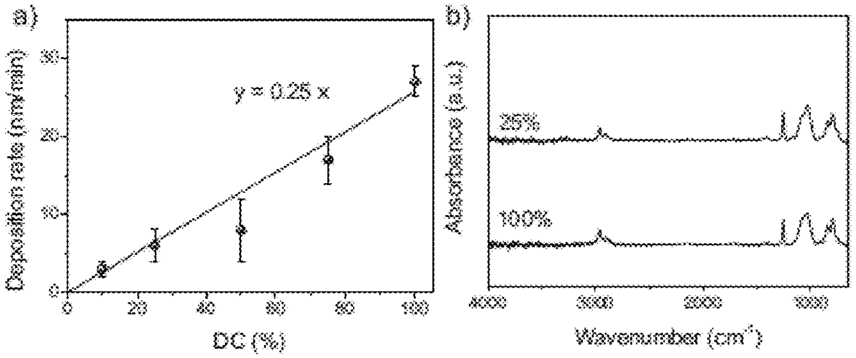
FIG. 38 depicts deposition rate (a) and FT-IR spectra (b) of the polymers deposited by iPECVD at different duty cycles (DC), conditions G of FIG. 26.

In an effort to further reduce any plasma fragmentation of the monomer, we also explored pulsed discharge. In modulated discharges, the input power is delivered periodically to the reactor. Pulsing a plasma discharge may induce alterations of the discharge chemistry, which depend on the time the discharge is active, $t_{ON}$, the time it is unlit, $t_{OFF}$, and the duty cycle $DC=t_{ON}/(t_{OFF}+t_{ON})$, where $(t_{ON}+t_{OFF})$ is the period. A film deposited by pulsed plasma can have significant different properties than one deposited by continuous plasma as largely demonstrated in the literature. In PECVD processes with high fragmentation regimes, during the ON-time the polymer growth is fast and the film is subject to positive ion bombardment, UV-radiation and to the interactions with many unstable species and fragments. The OFF-time, which is generally longer than the time ON, allows a slow growth of the polymer due to the long lived radicals. Previous studies showed that the deposition rate during the OFF-time may not be null but that follows an exponential decay. FIG. 38*a* shows the deposition rate as a function of the DC, following the deposition condition G reported in FIG. 26. It is worthy to notice that the deposition rate decreases linearly with the DC and when the DC is ten times reduced (from 100 to 10%) the deposition rate is ten-times reduced, too (from 27 to 3 nm $min^{-1}$). This is in line with the very low fragmentation regime hypothesized for iPECVD, so that the initiator radical uptake is so low that during the $t_{OFF}$ no deposition occurs. FIG. 38*b* shows the IR spectra of the polymers deposited at DC=100% and DC=25%. The chemistry of the two films seems to be not very different, showing that the monomer structure and the organic content are largely preserved also with a continuous discharge.

Conclusion

This example shows a new deposition method: the initiated-PECVD (iPECVD) as an alternative to iCVD and PECVD, especially for the monomers that are not easily polymerizable by iCVD but where a certain structure retention is needed. The key-concept of iPECVD was to use very low plasma power density (0.07 W $cm^{-2}$) enough just to break the labile bonds of the initiator and have a quasi-selective fragmentation of the initiator molecule more than of the monomer molecule. We also demonstrated that a certain end-capping reaction time with initiator radicals after the deposition is needed to deposit iPECVD polymers on plastic substrates where the heat exchange efficiency is not as high as on silicon wafers.

Chemical analysis performed by both FT-IR and XPS confirmed that the polymer obtained by iPECVD fully retained the carbon content of the monomer structure. The presence of the initiator was demonstrated to be critical in order to obtain reasonable deposition rates. The absence of the initiator resulted in deposition rate as low as 2.5 nm $min^{-1}$ and to a certain carbon loss. On the other hand, adding the TBPO, the formation of initiator fragments strongly enhances the polymer growth, similarly to the iCVD processes.

Kinetics analysis of the polymer growth rate as a function of the substrate temperature further demonstrated that the iPECVD is following the same kinetics rules as iCVD. In fact a positive activation energy of 99.6 kJ $mol^{-1}$ was calculated by the Arrhenius plot of the natural logarithm of the deposition rate as a function of the inverse of the substrate temperature. iCVD from TVTSO and from other organosilicon polymers showed positive activation energy of the same order of magnitude as the one calculated for iPECVD.

The very low fragmentation regime was also demonstrated by pulsing the plasma discharge. Generally this allows to further reduce the monomer fragmentation and obtain higher monomer functionality retention in the polymer structure. In this case, instead the chemical composition of the films was largely similar for continuous and pulsed discharge even at very low duty cycles.

Example 4—Mechanically Robust Silica-Like Coatings Deposited by Microwave Plasmas for Barrier Applications Overview We investigate also the use of pulsed PECVD as a route to enhance barrier coating morphology, structure and performance. Pulsing plasma discharges opens up promising perspectives in the control of particle and film growth kinetics. Indeed, short plasma glow pulsation leads to smaller atom agglomerates in the gas phase reducing granule size and columnar coating feature (nanopores and channels) in the coating.

Coating mechanical properties (hardness, elasticity, crack initiation and propagation), morphology and barrier properties are investigated as a function of the duty cycle and film thickness in order to assess the durability and robustness of our microwave (MW)-plasma deposited $SiO_x$ coatings.

Experimental $SiO_x$ thin films were deposited by Plasma Enhanced Chemical Vapor Deposition (PECVD). The depositions were carried out in a commercial reactor chamber (Plasmatech, Model V-160GKRT) of volume 0.16 $m^3$ which has previously been detailed. The 1,3,5-trivinyl-1,1,3,5,5-pentamethyltrisiloxane (TVTSO, 95%, Gelest, Inc.) was used as a monomer without further purification. The monomer was heated to 80° C. and fed into the chamber through a heated line at a flow rate of 4.8 sccm. The monomer vapors were uniformly distributed across the entire width of the substrate using a distributor tube that was 30 cm long and 1 cm in diameter with ten 1 mm holes. The monomer was highly diluted in Oxygen (400 sccm) and Argon (50 sccm) which were introduced in the chamber from a different port. The plasma was produced in a magnetron microwave (MW) plasma power source (Fricke und Mallah, Model BVD 19, frequency 2.45 GHz, max power-1200 W, both continuous and pulse mode operation possible) and then it was irradiated through a quartz window to the substrate surface. The distance between the plasma source and the substrate for the deposition was 5 cm. The applied power was 950 W. The deposition were also carried out in pulsed mode at different duty cycles (95%-50%) by decreasing the ton (from 2000 ms to 100 ms), while the $t_{OFF}$ was fixed at 100 ms. The deposition rate obtained when pulsing the discharge was the same as for the continuous mode deposition: 85±5 nm/min. The reactor pressure was kept constant at 150 mTorr. The substrates used for the deposition were silicon wafer and plastic substrate polyethylene terephthalate (PET, ST4, 125 μm, heat stabilized and pretreated on one side to promote adhesion).

Film thicknesses and refractive indexes were measured ex-situ after the deposition using variable angle spectroscopic ellipsometry (VASE, J A Woollam M-2000). For all samples, measurements were done at three different angles (65°, 70° and 75°) in the wavelength range of 200 nm to 1000 nm. A three-component optical model made of a silicon substrate, a native oxide layer and a film bulk, was used to describe the samples. The bulk components were modeled by the Cauchy function adding the Urbach tail for the absorption. The refractive index values were in the range 1.45±0.01 and no significant differences were evidenced among the different coatings either deposited in pulsed and in continuous mode.

Coating elastic modulus, hardness and creep were measured by nanoindentation (Nanovea) when the coating was deposited on the silicon substrate. Nanoindentation was carried out within the first 10% of coating thickness (1 μm for this study) in order to avoid substrate effect. The tip used was a Berkovich type with radius<10 nm. The elastic moduli were calculated from the slope of the unloading curve of the load-displacement graph, while the hardness values were calculated from the ratio between the depth at maximum load by the indent area as the tip penetrate into the coating knowing the exact tip shape. A Poisson's ratio of 0.22 was used for all materials in the modulus evaluations. Coating scratch resistance and adhesion were studied by nanoscratching using a conical tip. Each coating was scratched increasing progressively the tip load from 0 to 10 mN at a rate of 5 mN/minute. Each scratch was 3 mm long. Coating failure such as appearance of cracks and delamination was then investigated along the scratch using optical microscope (Zeiss, Model AxioSkop 2 MAT) and Scanning Electron Microscopy (SEM, Hitachi, TM 3000). The scratch test was repeated three times with spacing about 0.1 mm.

Investigation of coating flexibility was carried out on a mechanical tester device (ADMET Micro EP Universal Testing Machine). The coating was held between two clamps while initial clamps spacing (2L) was reduced by half so that an accurate radius of curvature (R) was applied to the coating (R=L/4). The coating was placed either on the inner or outer face of the bending curvature, in view to apply a compression or tension strain, respectively. The radii of curvature applied ranged from 1 to 12 mm. After strain releasing, the crack profile was acquired using a profilometer (Tencor P 16).

Uniaxial fragmentation test was carried out on a micro mechanical tensile tester. Silica-like layer deposited on PET was cut into about $10\times50$ mm$^2$ in width and length and then uniaxial stretched controlling clamps spacing with a resolution about 0.01 mm. Maximum strain was held during 30 s before releasing mechanical strain. Crack density as a function of the strain was measured over a length of 200 μm. The cracks were observed by Scanning Electron Microscope (SEM, Hitachi, TM 3000) with acceleration voltage of 15 kV after releasing the strain. The samples that were stretched up to 10% were then sputter-coated ex-situ with 10 nm of gold (Denton Desk V) to prevent the charging effect. On the contrary charging effect was not occurring on the samples stretched at higher strain.

Surface film morphology was investigated by Atomic Force Microscopy (AFM—Digital Instruments, D3100-1). Images were acquired in tapping mode using conical gold-coated silicon tips. Root—mean—square roughness was measured on $13\times13$ μm$^2$ surface areas.

Barrier performance such as Water Vapor Transmission Rate (WVTR) was measured on a 50 cm$^2$ sample area, at 25° C. and 85% of relative humidity (RH), in steady-state conditions using a MOCON Permatran-W. Measurements were done in duplicate and the values reported are averaged results with standard deviations as low as 0.004 g/m$^2$/day.

Results and Discussion

Hardness, Elasticity and Scratch Resistance

Coating elastic modulus (E) and hardness (H) were measured by nanoindentation for the $SiO_x$ coatings deposited in continuous and pulsed mode by MW-PECVD as a function of the duty cycle (DC). Significant differences are distinguishable in the depths measured at the maximum load (1.5 mN). The depth at maximum load increases from 105 to 135 nm when the DC decreases. This depth is related to the hardness of the $SiO_x$ coating, which, as expectable, decreases from 13.2 to 6.3 GPa when decreasing the DC. On the contrary, coating elasticity is improved by reducing the plasma duty cycle in fact the elastic moduli go from 89.9 to 74.2 GPa. The values of H and E for dense thermal deposited $SiO_x$ coatings are about 12 GPa and 80 Gpa, respectively. The comparison of the latter values with the ones obtained in this study shows that the mechanical properties of our MW-PECVD films at DC=100% and 75% are very good. The hardness values are comparable with the hardness of the $Al_2O_3$ films deposited by Atomic Layer Deposition (ALD) while the elastic moduli are lower than $Al_2O_3$. Lower elastic moduli (i.e. higher elasticity) are advantageous for flexible barrier coatings: it helps the crack recovery and the cohesion of the coating. The curves of the coatings deposited at DC=100% and 75% are characteristic of ceramic films: applying a constant load the creep depth arrives to a maximum of 3-4 nm after about 10 s. The profile obtained instead by the coating deposited at 50% DC shows a certain viscoelastic behavior in fact the depth increases to almost 12 nm at constant applied load. It is interesting noticing that the chemical analysis of the coatings performed by FT-IR (data not shown) does not show any significant difference changing the DC. This excludes the possibility that the different viscoelastic behavior at 50% DC is due to the presence of carbon in the coating. The creep displacement obtained for $SiO_x$ coatings deposited by sputtering was 7 nm.

Scratch resistance and adhesion strength of the $SiO_x$ coatings deposited on silicon wafer were investigated by nanoscratching applying a progressively increasing load from 0 to 10 mN at a rate of 5 mN/min (data not shown). The scratches of the $SiO_x$ deposited at DC=50% are wider than the ones of the film deposited in continuous mode, as expected for a softer coating. The first delaminations on the edge of the scratch for the film deposited in pulsed mode appear roughly at 7 mN while the coating deposited continuously shows some delaminations already at 3 mN. The fact that delaminations occur at higher load for the film deposited at DC=50% indicates a better adhesion strength of the interface $SiO_x$/Si compared to the one deposited in continuous mode, as expected for a softer coating. Fracture toughness test by nanoindentation resulted in failure of the layer deposited by continuous mode at 20 mN, while no failures were induced on the coatings deposited by pulsed discharge even at higher load. The better mechanical properties showed by the layer deposited in pulsed mode can be ascribed to the modification of the active species formation kinetics that happens in the alternation between time ON and OFF. It is very interesting noticing that the deposition rate was not influenced by the duty cycle suggesting that the deposition proceeded also during the off time, as found also by other authors. The species that are responsible of the deposition during the time off are long-lived species (radicals, atoms) whose lifetime is probably higher or in the order of the duration of the time OFF (100 ms) while electrons and ions decay is much faster. The deposition in absence of highly reactive species (i.e. electrons and ions) may result in a more relaxed microstructural network and hence better mechanical properties.

Critical Tensile and Compressive Strains for Cracking

The cohesion and the adhesion of our MW-PECVD coatings to PET substrate were assessed by tensile fragmentation tests coating. Crack density (CD) evolution as a function of tensile strain represents a good assessment of thin ceramic barrier film mechanical durability and robustness. The test consists in studying the crack initiation and propagation when applying uniaxial tensile strain to the material. The degradation process is based on three distinct steps: (i) cracks first initiate from a flaw at a strain usually named "crack onset strain" or "critical strain". This strain leads to an irreversible structure degradation which does not necessarily affect significantly coating barrier performance, depending on coating crack elastic recovery. According to both substrate and coating elastic modulus and then elasticity behavior of coating/substrate system, the coating can elastically recover its own shape by closing cracks even after being stretched to a strain up of several percent. (ii) the next step is activated by the reduction of the fragment size (crack spacing) and the appearance of transverse buckling failure in the coating. Fragment stress reaches a maximum value which leads to a reduction of the fragmentation rate. In the meantime, plastic deformation occurs followed by crack expansion that significantly damages coating barrier properties. (iii) The third step is related to delamination of the coating while the fragmentation rate virtually stops.

Both interfacial adhesion of substrate/coating system and coating cohesion can be evaluated analyzing the trends of crack onset strain, delamination strain and crack density values as a function of coating thickness. The fragmentation test was performed on coating deposited in continuous and pulsed mode at DC=50%, with thickness ranging from 30 to 100 nm. The first observed cracks of a 100-nm-thick $SiO_x$ coating deposited in a continuous mode by MW-PECVD appeared perpendicularly to the direction in which the tension was applied (at 1% tensile strain), while parallel cracks and buckles appeared at strain around 15%. For thicknesses lower than 100 nm (e.g. 30-40 nm) we observe the first cracks at strain of 4% instead of 1% but on the contrary the crack density for the larger thicknesses is smaller than the crack density at smaller thicknesses. However, cracks formed in thin coating showed relatively smaller geometry than the ones formed within thicker coatings. The data can be fit using an exponential equation that allows the estimation of the saturation crack density, which is the crack density when the coating delaminates from the substrate, and the critical tensile strain. The evolution of the critical tensile strain as a function of the coating thickness can be fitted fitted with the Laws and Dvorak shear lag model:

$$\sigma_c = \frac{C}{\sqrt{h(h_s + h)}} \tag{8}$$

where h is the coating thickness, $h_s$ is the substrate thickness, ac is the critical tensile strain and C is a parameter that takes into account the substrate thickness, and the mechanical properties of the material (Young moduli, critical energy release, etc.). Since, $h_s$>>h, $\sigma_c$ is proportional to $1/h^{1/2}$. The good agreement between the model and the experimental data demonstrate the reliability of the critical strain measurements. The model of Eq. 8 works on the hypothesis that the internal stress of the coating is small relative to the critical tensile strain required for cracking the $SiO_x$ coating. We calculate the internal stress of the $SiO_x$ coating and the values obtained were lower than 120 MPa in tension, therefore the hypothesis is verified.

The calculated critical strain and saturation crack density values are also summarized in FIG. 40. It is interesting to note that the coating deposited with approximately the same thickness but at different DC have similar saturation crack density. The critical tensile strain values are slightly higher in the case of the layer deposited at DC=50% than the values calculated for the case DC=100%. The critical tensile strains obtained (3.4-1%) are comparable to the results obtained on $SiO_x$ films deposited by RF plasmas but more desirable when compared to the values reported in literature for $Al_2O_3$ ALD coatings of the same thicknesses. The coatings deposited in this study exhibit also a high saturation crack density (0.74-0.49 $\mu m^{-1}$), which can be explained hypothesizing that at the high input power used in this study the active species in the plasma discharge are energetic enough to interact with the PET substrate to a certain extent and lead to the formation of a broad interface with the coating which enhances the adhesion. Critical tensile strains in the range of 1.0% were obtained by Bieder at al. on $SiO_x$ films deposited by RF plasmas with thicknesses of 260 nm. The fragmentation test on ALD $AlO_x$ coating resulted in lower values of critical tensile strains (range 1.16-0.52%) and lower saturation crack density (0.3-0.22 $\mu m^{-1}$) for the coating thicknesses in the range 30-100 nm. Therefore, we can conclude that our MW-PECVD coatings show better cohesion and adhesion which results in higher resistance to the crack formation.

The critical bending radii (i.e. the radius at which the first cracks appear) of the $SiO_x$ coatings can be indirectly calculated from tensile strain studies, in fact the bending results in tensile and compression stresses on the material (data not shown) which induce the crack formation. The critical bending radius ($R_c$) is related to the critical tensile strain (ac) by the Eq. 9:

$$\sigma_c = \left(\frac{h + h_s}{2R_c}\right) \tag{9}$$

where $h_s$ is the substrate thickness and h the coating thickness. FIG. 40 shows the critical bending radius calculated by the fragmentation test. As expected, thinner coatings have smaller critical bending radius. The coatings deposited by pulsed plasma discharge showed a slightly better flexibility.

$AlO_x$ ALD films show $R_c$ of 3.86 mm at 10 nm while the critical bending radii of our coatings are in the range 1.6-4.4 mm for thicknesses between 30 and 100 nm.

The critical bending radius calculated by Eq. 9 were found very close to the ones obtained directly observing the cracks formed upon bending in tensile mode (outer side of the bending curvature, data not shown). Reversing the formula in Eq. 9 we calculated the critical tensile strain from the bending tests and again there was good agreement with the values obtained by fragmentation test. This means that bending as well as tensile fragmentation tests is a reliable strategy to determine the critical radius and the critical strain. We investigated the coating compression failure through bending test by placing the coating on the inner side of the bending curvature (data not shown). The obtained results for the coating deposited in continuous mode are shown in FIG. 41. The cracks are more evident for the thicker film thicknesses and in fact the critical compression strain decreases with the thickness. Silica-like layer exhibits a high resistance under compression strain even for a thickness about 100 nm. No significant difference between coatings deposited by pulsed and continuous plasma was observed. The high critical tension and compression stress values obtained show that the silica-like layer deposited are very resistant and therefore can handle significant change in temperature while deposited on polymer film even with relatively high coefficient of thermal expansion (CTE).

Regarding crack recovery after failure, silica-like layer was found to be able to recover its own shape by closing cracks when the applied strain was near the region of the crack onset strain. The depth and width of the residual cracks for the sample deposited by pulsed plasma are lower: the silica layer deposited at DC=50% can recover better from cracking than the coating deposited in continuous plasma because of its higher elasticity.

Morphology

Another important factor that influences the barrier properties is the surface morphology. A high surface roughness leads to defects and flaws due to shadowing effects. Defects and flaws result in stress peaks and thus weak spots. Coating roughness decreases significantly by pulsing the plasma at DC=50% (data not shown). This is speculated to happen because in continuous discharge or when the DC is high the rate of the gas phase polymerization reactions is high. Gas phase polymerization results in high molecular weight species and powder which collapse on the substrate. During a pulsed discharge, instead, the formation of the high molecular weight species is limited by the alternation between ON and OFF time. It is also important to notice that the RMS roughness slightly decreases with the thickness when the inorganic coating is deposited at DC=50%. The reason for such trend can be probably ascribed to an enhancement of the surface reactions over the gas-phase reactions, especially during the $t_{OFF}$ when the active species have the time to diffuse on the surface, resulting in a smoother film. Generally, RF plasma-deposited $SiO_2$ films show an increase in surface roughness with thickness while in absolute surface-driven growth mechanism (e.g. $Al_2O_3$ ALD coating) there is negligible evolution of roughness with thickness variation.

Barrier Properties

The barrier properties of the $SiO_x$ coatings deposited in continuous and pulsed (DC=50%) mode as a function of the thickness were investigated (data not shown). The WVTR of the bare PET substrate is 5 $g/m^2$/day at 25° C. and 85% RH. As shown in literature, the WVTR first decreases very quickly when increasing the coating thickness to a certain value named the critical thickness and then remains essentially constant. This same trend can be observed for our $SiO_x$ coatings. Coatings as thin as 50 nm already show a barrier improvement of one order of magnitude compared to the bare substrate which is a very good barrier performance compared to other $SiO_x$ coating, especially the ones deposited by MW plasmas. The coating deposited by continuous discharge shows a minimum in the WVTR (0.02 $g/m^2$/day) at around 100 nm, and then the WVTR slightly increases to 0.05 $g/m^2$/day at 400 nm. The increase in the WVTR at high $SiO_x$ thickness can be attributed to the formation of internal cracks or delamination due to internal stress and poor flexibility (low critical strain). In the case of the pulsed deposition, instead the WVTR quickly decreases to 0.1 $g/m^2$/day in the range 0-50 nm and then it keeps decreasing with a lower slope up to a value of 0.05 $g/m^2$/day corresponding to the 400-nm-thick-film.

Conclusion

In this example we demonstrate the deposition of mechanically robust and effective barrier layer made of silica-like and deposited by microwave plasmas. Microwave plasmas in downstream conditions are generally characterized by low ion bombardment which results in porous inorganic material with poor barrier properties. To overcome this inconvenient we used very high plasma power input and high oxygen dilution.

The coating hardness was found to be largely comparable with thermal deposited silicon dioxide coatings as well as with atomic layer deposited $Al_2O_3$ which are known to be characterized by very good barrier properties. Moreover, the high critical tension and compression stress values obtained show that the silica-like layer deposited are very resistant and therefore can handle significant change in temperature while deposited on polymer film even with relatively high coefficient of thermal expansion (CTE). The barrier properties are also very good compared with other $SiO_x$ coatings deposited by PECVD in fact we reach a two orders of magnitude improvement over the water vapor transmission rate of the bare PET substrate.

Another interesting aspect is the comparison between mechanical, morphological and barrier properties of the coating deposited by continuous and pulsed discharge. The alternation between time ON and OFF brings to the modification of the active species formation kinetics which affects the performances of the coatings. $SiO_x$ layers deposited by pulsed plasmas were found to have better elasticity and lower hardness, therefore lower scratch resistance but higher adhesion and faster crack recovery compared to the ones deposited by continuous discharge. The RMS roughness was also much lower for the case DC=50% than the case DC=100%.

Both the coatings deposited by pulsed and continuous plasmas showed WVTR of 0.1 $g/m^2$/day at a thickness of 50 nm. At this thickness the critical tensile strain of the coatings is relatively high. Inorganic layers as thin as 50 nm can be preferred in multilayered structure especially if the number of layers is high, in order to minimize the total thickness of the stack.

The 100-nm-thick coating deposited by continuous discharge showed very good barrier properties (WVTR=0.02 $g/m^2$/day) but it was characterized by a low critical tensile strain, meaning that it tends to easily fail when deposited on flexible substrate. A possible strategy that will be investigated to enhance its flexibility is to sandwich it between two polymeric layers.

INCORPORATION BY REFERENCE

All of the cited U.S. Patents, U.S. patent application publications, and PCT patent application publications designating the U.S., are hereby incorporated by reference in their entirety.

EQUIVALENTS

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed.

What is claimed is:

1. A method of coating a substrate, comprising:

(a) introducing into a partially evacuated vessel containing the substrate a gaseous initiator at a first flow rate, and a first gaseous monomer at a second flow rate, thereby forming a first mixture;

(b) introducing energy from a microwave plasma power source into said first mixture at a first power, wherein the first power is about 10 W to about 100 W, thereby depositing a first layer on the substrate at a first deposition rate, wherein the first layer is organic;

(c) introducing into the vessel a first auxiliary gas at a third flow rate, and a second gaseous monomer at a fourth flow rate, thereby forming a second mixture; and (d) introducing energy into said second mixture at a second power, wherein the second power is about 800 W to about 1000 W, thereby depositing a second layer over the first layer at a second deposition rate, wherein the second layer is inorganic, to form a multi-layered coating on the substrate;

wherein the vessel further comprises a variable plasma source, a stage for holding the substrate, and the substrate positioned on said stage;

the first gaseous monomer is a siloxane;

the second gaseous monomer is a siloxane;

the gaseous initiator is selected from a group consisting of peroxides, aryl ketones, and alkyl azo compounds;

the first layer is deposited on the substrate by initiated plasma enhanced chemical vapor deposition (iPECVD); and a pressure in the partially evacuated vessel is in the range of about 0.01 Torr to about 0.45 Torr.

2. The method of claim 1, further comprising repeating steps (a)-(d), wherein the multi-layer coating comprises alternating organic and inorganic layers.

3. The method of claim 1, wherein the number of layers of the multi-layered coating is from about 2 to about 8.

4. The method of claim 1, wherein the first gaseous monomer is 1,3,5-trivinyl-1,1,3,5,5-pentamethyltrisiloxane or trivinyltrimethyl cyclotrisiloxane.

5. The method of claim 1, wherein the second gaseous monomer is 1,3,5-trivinyl-1,1,3,5,5-pentamethyltrisiloxane or trivinyltrimethyl cyclotrisiloxane.

6. The method of claim 1, wherein the gaseous initiator is a peroxide.

7. The method of claim 1, wherein the pressure in the partially evacuated vessel is from about 0.05 Torr to about 0.4 Torr.

8. The method of claim 1, wherein the first flow rate is from about 30 sccm to about 0.01 sccm.

9. The method of claim 1, wherein the second flow rate is from about 30 sccm to about 0.01 sccm.

10. The method of claim 1, wherein the third flow rate is from about 5 sccm to about 750 sccm.

11. The method of claim 1, wherein the fourth flow rate is from about 30 sccm to about 0.01 sccm.

12. The method of claim 1, further comprising adjusting a temperature of the stage.

13. The method of claim 1, wherein the stage is moveable.

14. The method of claim 1, further comprising discharging in timed pulses the energy introduced into the first mixture at the first power, thereby creating a duty cycle.

15. The method of claim 14, wherein each of the timed pulses $t_{ON}$, is from about 1 ns to about 10 s.

16. The method of claim 1, wherein the first deposition rate is from about 1 nm/minute to about 100 nm/minute.

17. The method of claim 1, wherein the second deposition rate is from about 1 nm/minute to about 100 nm/minute.

18. The method of claim 1, wherein the energy introduced into said second mixture is from a microwave power source.

19. The method of claim 1, wherein the first gaseous monomer is 1,3,5-trivinyl-1,1,3,5,5-pentamethyltrisiloxane.

20. The method of claim 1, wherein the second gaseous monomer is 1,3,5-trivinyl-1,1,3,5,5-pentamethyltrisiloxane.

21. The method of claim 1, wherein the gaseous initiator is tert-butyl peroxide (TBPO).

22. The method of claim 1, wherein the first gaseous monomer is 1,3,5-trivinyl-1,1,3,5,5-pentamethyltrisiloxane; the second gaseous monomer is 1,3,5-trivinyl-1,1,3,5,5-pentamethyltrisiloxane; and the gaseous initiator is tert-butyl peroxide (TBPO).

23. The method of claim 1, further comprising discharging in timed pulses the energy introduced into the second mixture at the second power, thereby creating a duty cycle.

24. The method of claim 23, wherein each of the timed pulses, $t_{ON}$, is from about 1 ns to about 10 s.

* * * * *